(12) United States Patent
Norisada et al.

(10) Patent No.: US 10,924,024 B2
(45) Date of Patent: *Feb. 16, 2021

(54) REGENERATIVE POWER CONVERSION SYSTEM WITH INVERTER AND CONVERTER

(71) Applicant: PANASONIC INTELLECTUAL PROPERTY MANAGEMENT CO., LTD., Osaka (JP)

(72) Inventors: Takaaki Norisada, Osaka (JP); Keiji Akamatsu, Hyogo (JP); Fumito Kusama, Osaka (JP); Go Yamada, Osaka (JP); Yutaka Kamon, Kyoto (JP); Makoto Ozone, Osaka (JP)

(73) Assignee: PANASONIC INTELLECTUAL PROPERTY MANAGEMENT CO, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/329,554

(22) PCT Filed: Aug. 28, 2017

(86) PCT No.: PCT/JP2017/030654
§ 371 (c)(1),
(2) Date: Feb. 28, 2019

(87) PCT Pub. No.: WO2018/043367
PCT Pub. Date: Mar. 8, 2018

(65) Prior Publication Data
US 2019/0207527 A1 Jul. 4, 2019

(30) Foreign Application Priority Data

Sep. 2, 2016 (JP) .............................. JP2016-171680
Feb. 16, 2017 (JP) .............................. JP2017-027254

(51) Int. Cl.
*H02M 5/293* (2006.01)
*H02M 7/797* (2006.01)
(Continued)

(52) U.S. Cl.
CPC ........... *H02M 5/293* (2013.01); *H02M 5/297* (2013.01); *H02M 7/797* (2013.01); *H02M 2001/0058* (2013.01)

(58) Field of Classification Search
CPC ................ H02M 5/02–5/38; H02M 7/66–7/98
See application file for complete search history.

(56) References Cited

U.S. PATENT DOCUMENTS

2016/0141972 A1  5/2016 Yamada et al.
2017/0279364 A1* 9/2017 Yuzurihara ............. H02M 7/48
2018/0233943 A1* 8/2018 Koizumi ................. B60L 58/20

FOREIGN PATENT DOCUMENTS

JP  H08-228488 A  9/1996
JP  2016-103970 A  6/2016

OTHER PUBLICATIONS

M. Matsui, T. Kitano, S. Ohba and D. Xu, "New space vector modulation scheme based high-frequency link soft-switching converter for AC system line interface," Proceedings of the Power Conversion Conference-Osaka 2002 (Cat. No. 02TH8579), Osaka, Japan, 2002, pp. 478-485 vol. 2. (Year: 2002).*

(Continued)

Primary Examiner — Peter M Novak
(74) Attorney, Agent, or Firm — McDermott Will and Emery LLP

(57) ABSTRACT

A control unit controls an inverter circuit such that a positive voltage and a negative voltage are alternately applied to a primary winding. The control unit controls a cycloconverter so as to allow no power to be transmitted between the cycloconverter and the inverter circuit in a first period (Continued)

including an inversion period during which a voltage of the primary winding has its polarity inverted. The control unit also controls the cycloconverter so as to allow power to be transmitted either in a first direction from the cycloconverter toward the inverter circuit, or in a second direction opposite from the first direction, in a second period different from the first period.

15 Claims, 22 Drawing Sheets

(51) Int. Cl.
    *H02M 5/297*   (2006.01)
    *H02M 1/00*    (2006.01)

(56) References Cited

OTHER PUBLICATIONS

Sha, Deshang. et al., 'A Digitally Controlled Three-Phase Cycloconverter Type High Frequency AC Link Inverter Using Space Vector Modulation', Journal of Power Electronics, Jan. 2011, vol. 11, No. 1, p. 28-36.
Matsui, M. et al., 'High-Frequency Link DC/AC Converter with Suppressed Voltage Clamp Circuits—Naturally Commutated Phase Angle Control with Self Turn-Off Devices', IEEE Transaction on Industry Applications. Mar./Apr. 1996; vol. 32, No. 2, p. 293-300.
International Search Report and Written Opinion issued in International Patent Application No. PCT/JP2017/030654, dated Sep. 26, 2017; with partial English translation.

\* cited by examiner

| Power Supply Mode | |
|---|---|
| S1~S4: Drive Signal |  |
| Transformer Voltage V1 |  |
| Transformer Current i1 |  |
| S5P,S5N,S6P,S6N: Drive Signal (U) |  |
| Output Voltage (U) |  |
| S7P,S7N,S8P,S8N: Drive Signal (V) |  |
| Output Voltage (V) |  |
| S9P,S9N,S10P,S10N: Drive Signal (W) |  |
| Output Voltage (W) |  |

Time(s)

Power Regeneration Mode

S1~S4: Drive Signal

Transformer Voltage V1

Transformer Current i1

S5P,S5N,S6P,S6N:
Drive Signal (U)

Output Voltage (U)

S7P,S7N,S8P,S8N:
Drive Signal (V)

Output Voltage (V)

S9P,S9N,S10P,S10N:
Drive Signal (W)

Output Voltage (W)

Time(s)

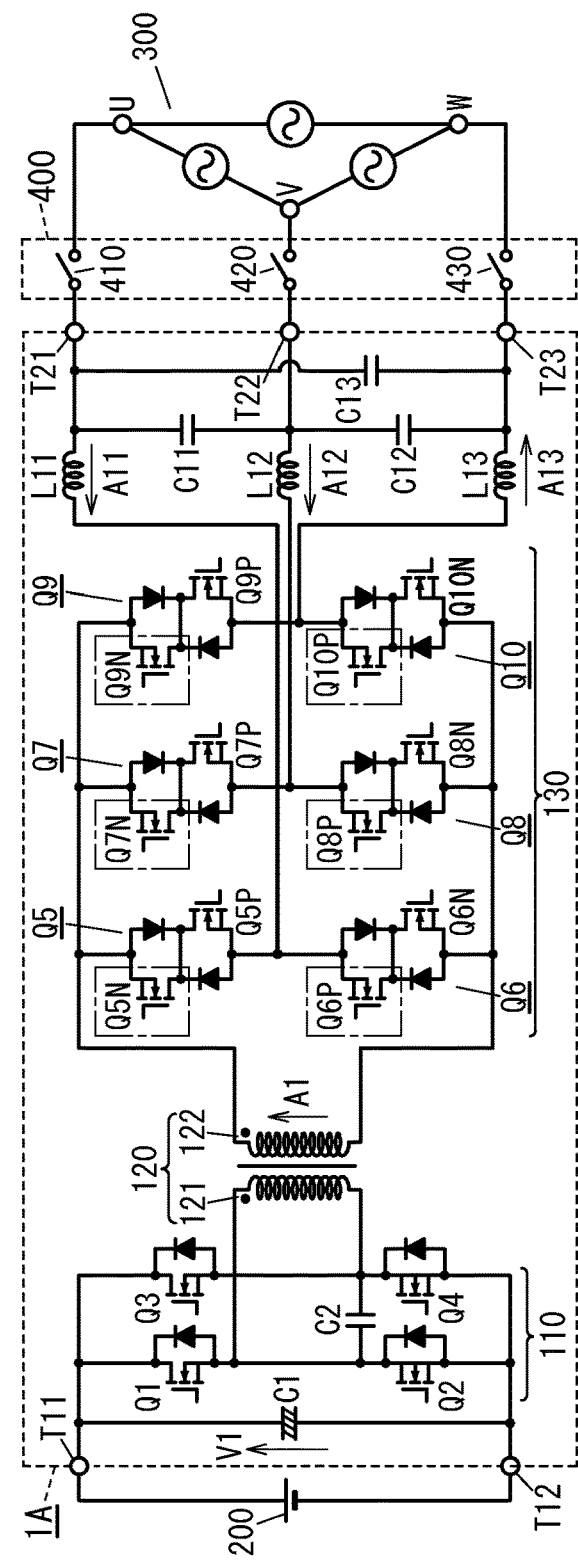
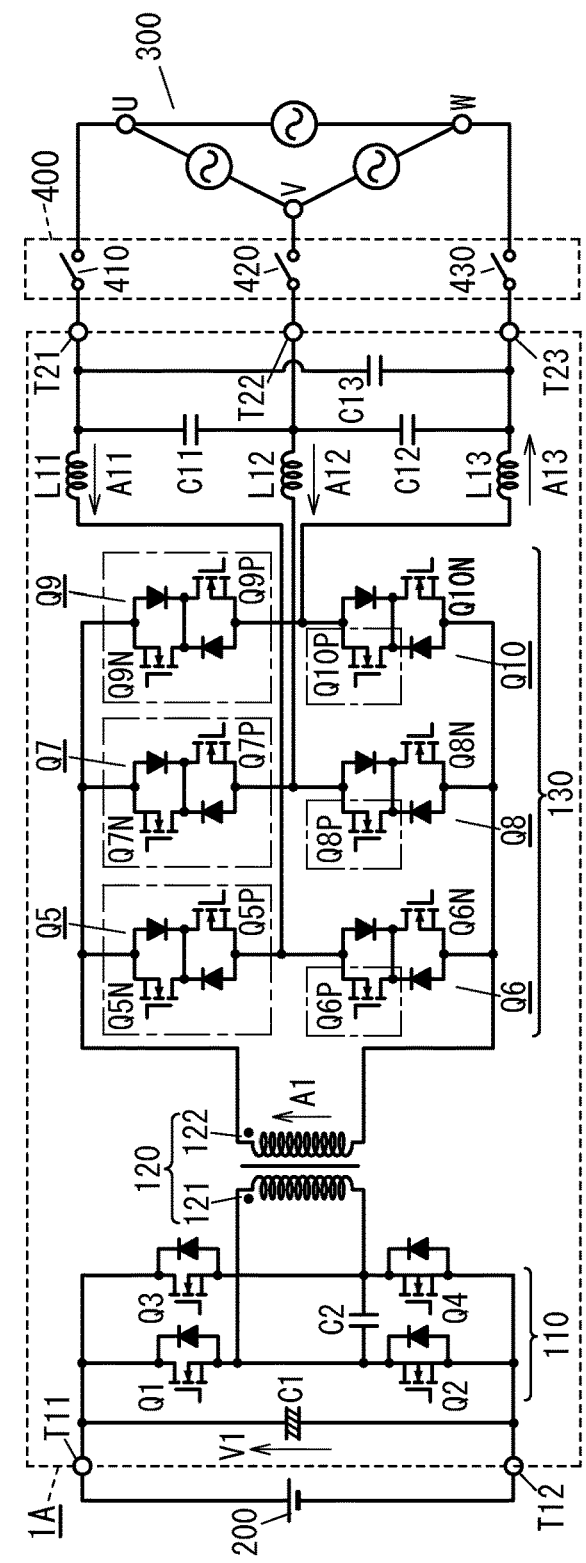
FIG. 23A
FIG. 23B

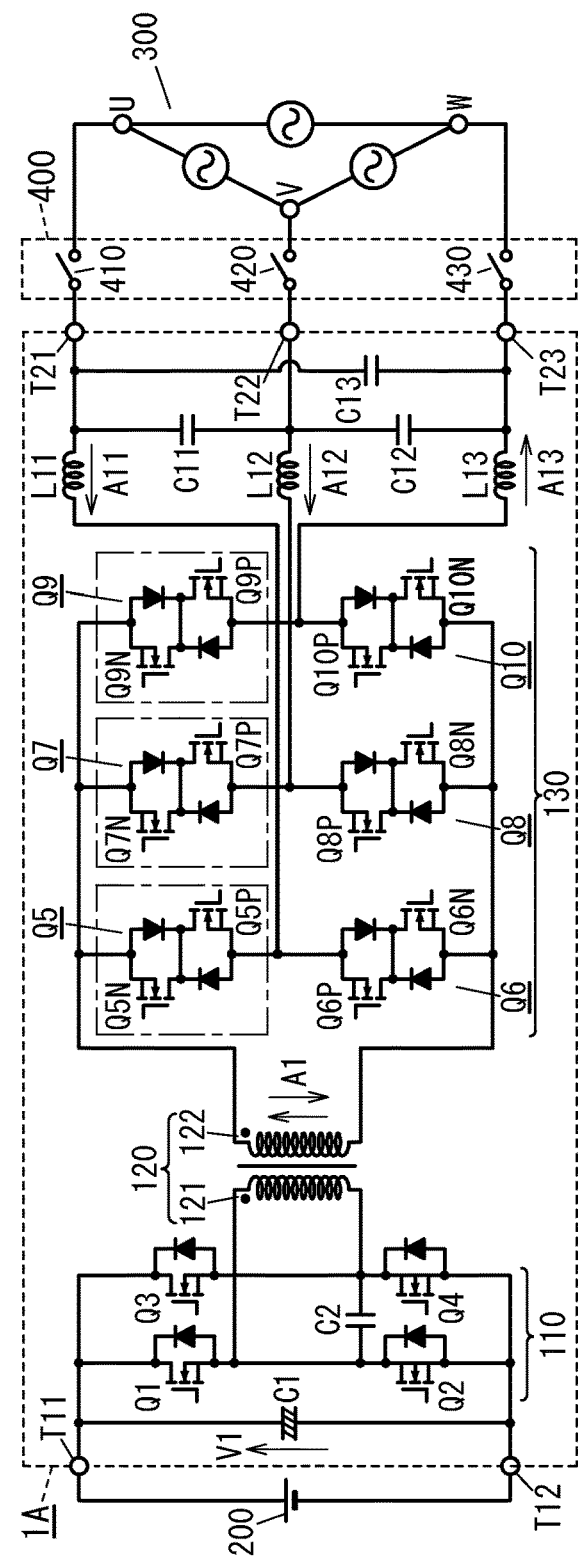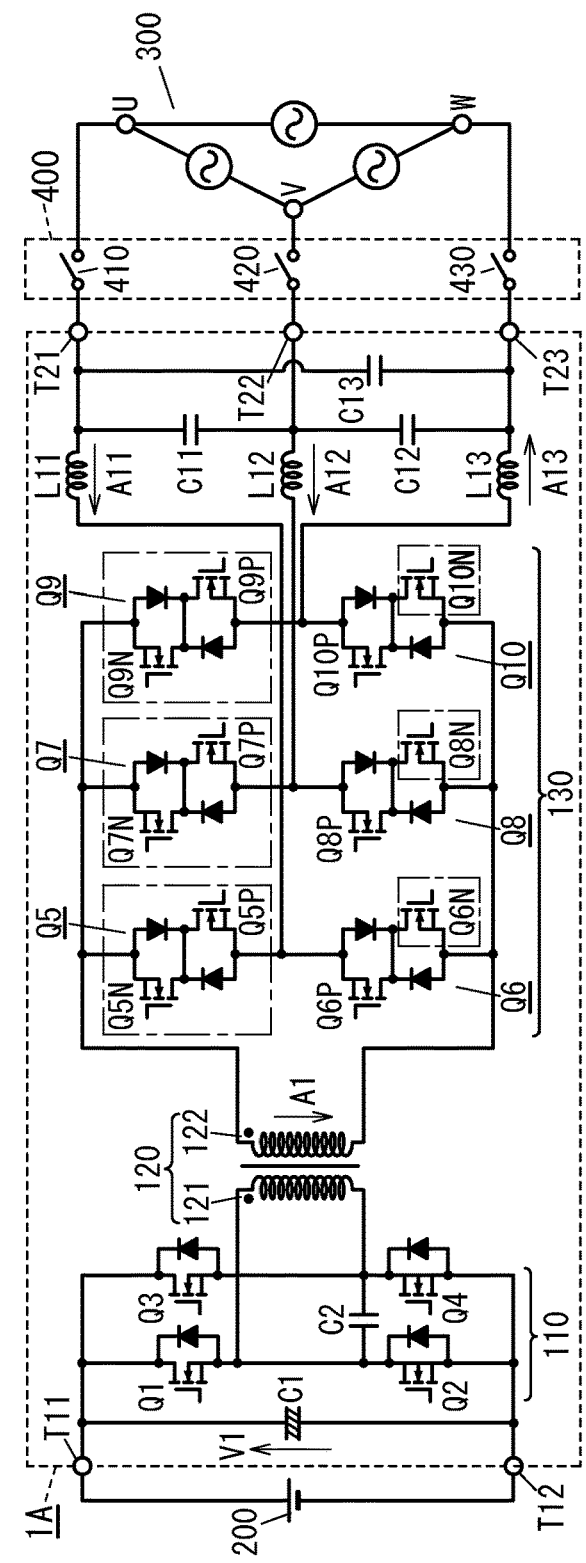
FIG. 24A
FIG. 24B

REGENERATIVE POWER CONVERSION SYSTEM WITH INVERTER AND CONVERTER

CROSS-REFERENCE OF RELATED APPLICATIONS

This application is the U.S. National Phase under 35 U.S.C. § 371 of International Patent Application No. PCT/JP2017/030654, filed on Aug. 28, 2017, which in turn claims the benefit of Japanese Application No. 2016-171680, filed on Sep. 2, 2016 and Japanese Application No. 2017-027254, filed on Feb. 16, 2017, the entire disclosures of which Applications are incorporated by reference herein.

TECHNICAL FIELD

The present disclose relates to a power conversion system, and more particularly relates to a power conversion system configured to transmit power either unidirectionally or bidirectionally.

BACKGROUND ART

A power conversion system for transmitting power bidirectionally between a DC power supply and a device has recently been proposed (see, for example, Patent Literature 1).

Patent Literature 1 discloses a DC/AC converter including an inverter unit, an RF transformer, a cycloconverter unit, and an AC filter.

In this DC/AC converter, the inverter unit alternately applies a positive voltage and a negative voltage to a primary winding of the RF transformer. Then, the cycloconverter converts RF power, input via the RF transformer, into power with a commercial frequency and outputs AC power with the commercial frequency.

In such a DC/AC converter, the power loss caused by switching of a switching element (bidirectional switch unit) causes a decline in power conversion efficiency.

CITATION LIST

Patent Literature

Patent Literature 1: JP H8-228488 A

SUMMARY OF INVENTION

It is therefore an object of the present disclosure to provide a power conversion system with the ability to cut down the power loss caused by switching.

A power conversion system according to an aspect of the present disclosure includes a first connection terminal, a second connection terminal, a primary winding, a secondary winding, an inverter circuit, a converter circuit, and a control circuit. A first connection target is connected to the first connection terminal. A second connection target is connected to the second connection terminal. The secondary winding is magnetically coupled to the primary winding. The inverter circuit is connected between the first connection terminal and the primary winding to perform power conversion. The converter circuit includes a plurality of bidirectional switch units, which are bridge-connected between both terminals of the secondary winding. The control circuit controls the inverter circuit such that a positive voltage and a negative voltage are alternately applied to the primary winding. The control circuit controls the converter circuit so as to allow no power to be transmitted between the converter circuit and the inverter circuit in a first period including an inversion period during which a voltage of the primary winding has its polarity inverted. The control circuit also controls the converter circuit so as to allow power to be transmitted either in a first direction from the converter circuit toward the inverter circuit, or in a second direction opposite from the first direction, in a second period different from the first period.

BRIEF DESCRIPTION OF DRAWINGS

FIG. 19 illustrates a relationship between a current flowing around the transformer and the circuit of a power converter according to an embodiment in a period in which the switching elements S1, S4 of the power conversion system are ON;

FIG. 23A is a circuit diagram illustrating how the power conversion system operates in a regeneration period;

FIG. 23B is a circuit diagram illustrating how the power conversion system operates in a freewheeling switching period;

FIG. 24A is a circuit diagram illustrating how the power conversion system operates in a freewheeling period;

FIG. 24B is a circuit diagram illustrating how the power conversion system operates in a regeneration switching period;

DESCRIPTION OF EMBODIMENTS (1) Overview

Figure 1:
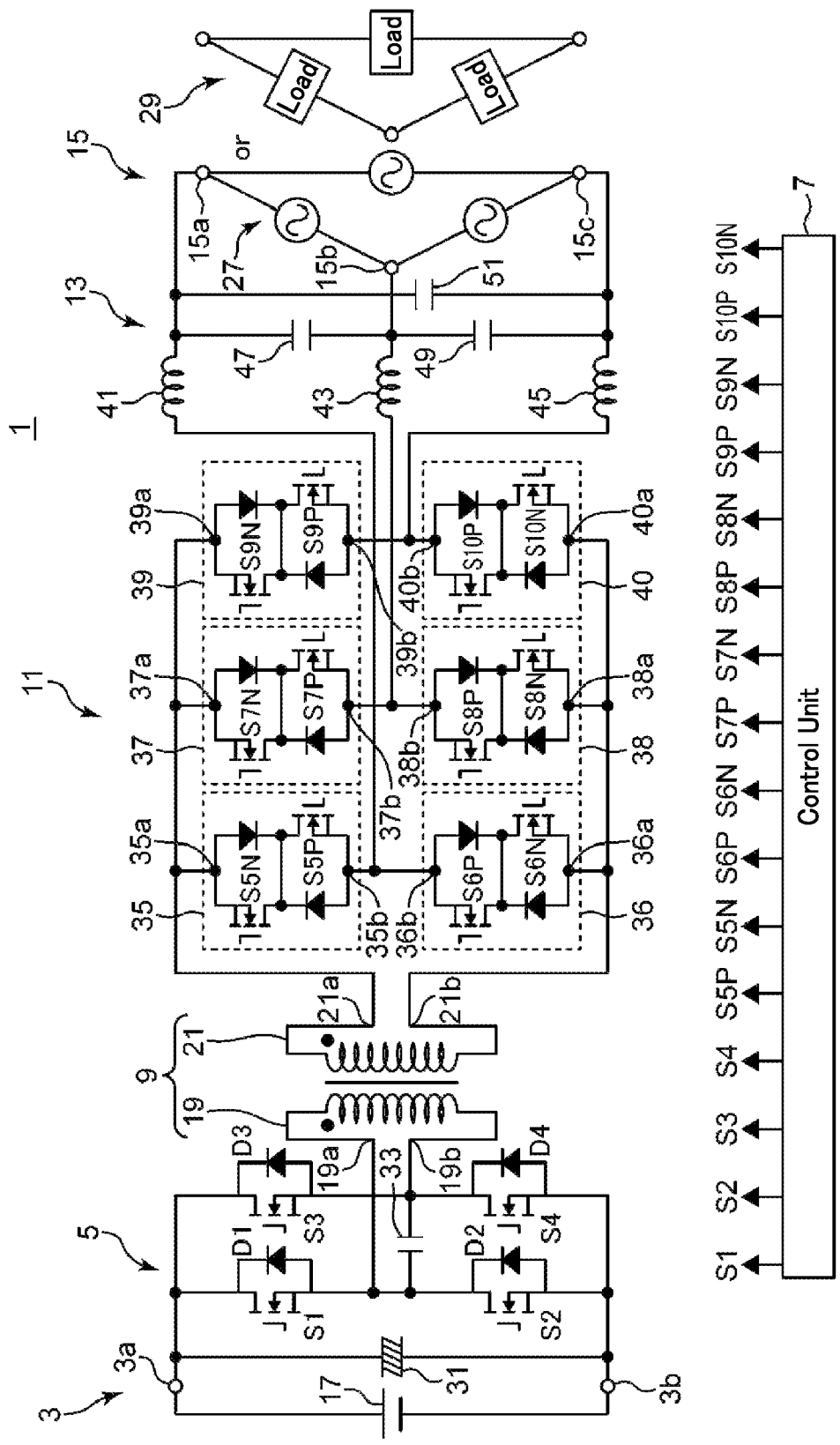
FIG. 1 is a circuit diagram of a power conversion system according to a first embodiment of the present disclosure.

A power conversion system 1 according to an aspect includes: a connection unit 3 serving as a first connection terminal; a connection unit 15 serving as a second connection terminal; a primary winding 19; a secondary winding 21; an inverter circuit 5; a converter circuit (cycloconverter 11); and a control unit 7 serving as a control circuit (see FIG. 1). A DC power supply 17 is connected as a first connection target to the connection unit 3. A commercial power grid 27 is connected as a second connection target to the connection unit 15. The secondary winding 21 is magnetically coupled to the primary winding 19. The inverter circuit 5 is connected between the connection unit 3 and the primary winding 19 to perform power conversion. The cycloconverter 11 includes a plurality of bidirectional switch units 35-40, which are bridge-connected between both terminals of the secondary winding 21. The control unit 7 controls the inverter circuit 5 such that a positive voltage and a negative voltage are alternately applied to the primary winding 19. The control unit 7 controls the cycloconverter 11 so as to allow no power to be transmitted between the cycloconverter 11 and the inverter circuit 5 in a first period including an inversion period during which a voltage of the primary winding 19 has its polarity inverted. The control unit 7 also controls the cycloconverter 11 so as to allow power to be transmitted either in a first direction from the cycloconverter 11 toward the inverter circuit 5, or in a second direction opposite from the first direction, in a second period different from the first period.

In a power conversion system 1 according to this aspect, the cycloconverter 11 is controlled such that no power is transmitted between the cycloconverter 11 and the inverter circuit 5 in a first period including an inversion period during which the voltage of the primary winding 19 has its polarity inverted. This allows the voltage applied to the primary winding 19 to be inverted with stability, thus cutting down the power loss caused by switching of the bidirectional switch units 35-40. Consequently, the power conversion efficiency of the power conversion system 1 is improvable. As used herein, the "connection" refers to connection in an electrically conductive state, and includes not only direct connection but also indirect connection via a conductor such as an electric wire, as well.

(2) First Embodiment

A power conversion system (power converter) according to a first embodiment will be described.

If an inverter circuit arranged on the primary side of the power converter is implemented to have a full-bridge configuration, the voltage output from the secondary side of the power converter is allowed to have its amplitude controlled by controlling the timings to turn ON and OFF the four switching elements thereof. In that case, however, in a period during which no power is output from the secondary side of the power converter, a circulating current is generated in the inverter circuit to cause loss of the power. Thus, the present inventors conceived a configuration for preventing a circulating current from being generated in the inverter circuit on the primary side as a main idea of the present disclosure.

(2.1) Overview

As shown in FIG. 1, a power conversion system (power converter) 1 according to an aspect of the present disclosure includes a transformer 9, an inverter circuit 5, a three-phase AC connection unit 15 (second connection terminal), first bidirectional switch units (including bidirectional switch units 35, 37, 39), second bidirectional switch units (including bidirectional switch units 36, 38, 40), and a control unit (control circuit) 7.

Figure 3:
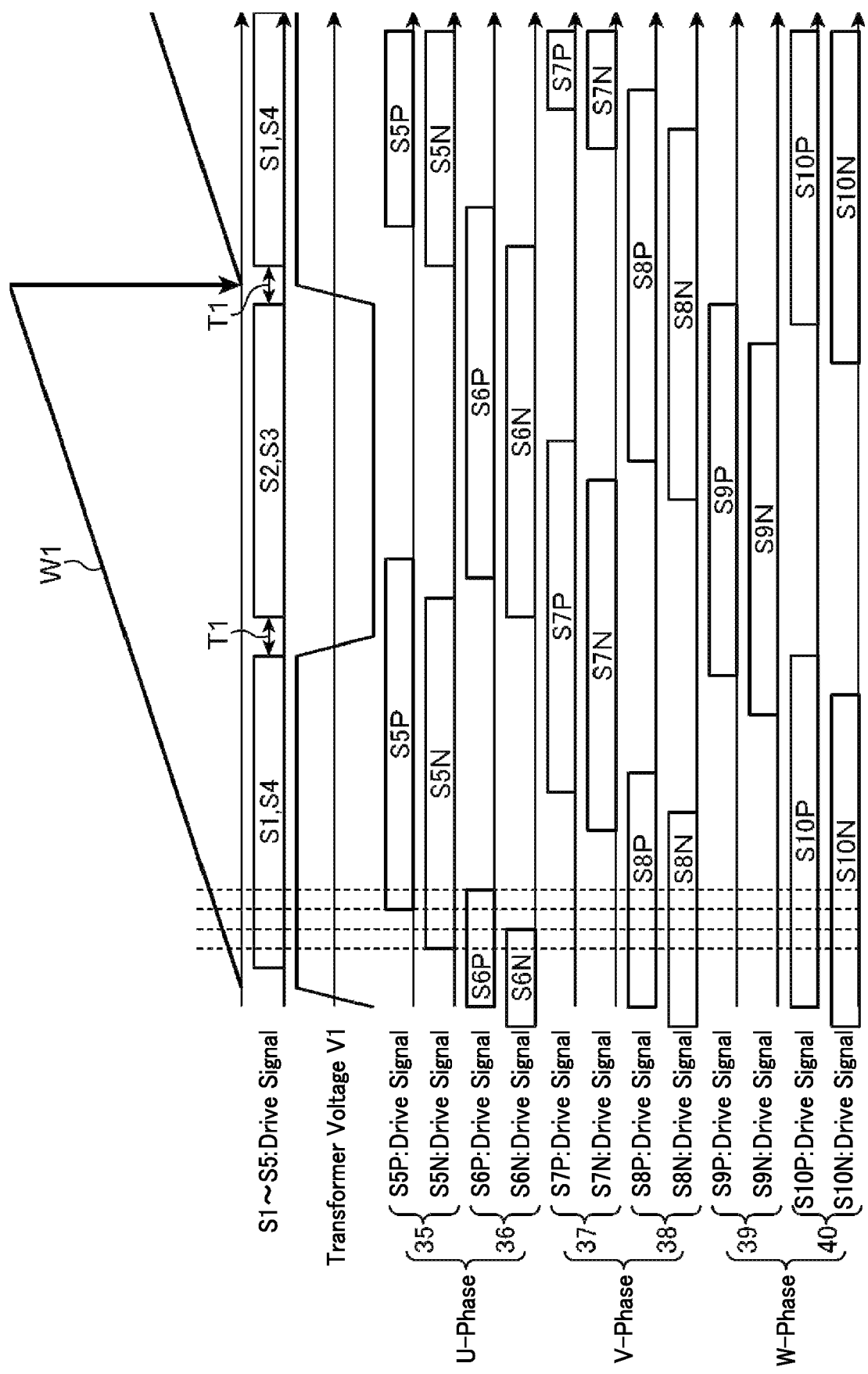
FIG. 3 is a timing chart illustrating how the power conversion system operates.

The transformer 9 includes a primary winding 19 and a secondary winding 21 magnetically coupled to the primary winding 19. The inverter circuit 5 converts a DC voltage supplied from the DC power supply 17 into an AC voltage and supplies the AC voltage thus converted to the primary winding 19. The three-phase AC connection unit 15 includes a first terminal 15a, a second terminal 15b, and a third terminal 15c, which may be electrically connected to at least one of a commercial power grid 27 or a load 29. The first bidirectional switch units (including the bidirectional switch units 35, 37, 39) are inserted between the first terminal 21a of the secondary winding 21 and the first terminal 15a of the connection unit 15, between the first terminal 21a of the secondary winding 21 and the second terminal 15b of the connection unit 15, and between the first terminal 21a of the secondary winding 21 and the third terminal 15c of the connection unit 15, respectively. The second bidirectional switch units (including the bidirectional switch units 36, 38, 40) are inserted between the second terminal 21b of the secondary winding 21 and the first terminal 15a of the connection unit 15, between the second terminal 21b of the secondary winding 21 and the second terminal 15b of the connection unit 15, and between the second terminal 21b of the secondary winding 21 and the third terminal 15c of the connection unit 15, respectively. The second bidirectional switch units (including the bidirectional switch units 36, 38, 40) are connected to the first bidirectional switch units (including the bidirectional switch units 35, 37, 39) in series. The control unit 7 controls the amplitude of at least one of the output voltage or the output current of the connection unit 15. As shown in FIGS. 1 and 3, the control unit 7 controls the amplitude of at least one of the output voltage or the output current by shifting a first timing and a second timing. The first timing is a timing when, in a positive polarity period during which the secondary winding 21 has a positive voltage (transformer voltage V1), a current, flowing through a circuit (cycloconverter 11) including the first bidirectional switch units (including the bidirectional switch units 35, 37, 39) and the second bidirectional switch units (including the bidirectional switch units 36, 38, 40), changes from a state of flowing through the second bidirectional switch units into a state of flowing through the first bidirectional switch units. The first timing may be, for example, the timing of switching from the state at Time t3 into the state at Time t4 in FIG. 5 or the timing of switching from the state at Time t2 into the state at Time t3 in FIG. 6. The second timing is a timing when, in a negative polarity period which follows the positive polarity period and during which the secondary winding 21 has a negative voltage, the current, flowing through the circuit (cycloconverter 11), changes from the state of flowing through the first bidirectional switch units into the state of flowing through the second bidirectional switch units. The second timing may be, for example, the timing of switching from the state at Time t11 into the state at Time t12 in FIG. 5 or the timing of switching from the state at Time t10 into the state at Time t11 in FIG. 6. As used herein, the phrase "the secondary winding 21 has a positive voltage (transformer voltage V1)" means that the potential at the first terminal 21a is higher than the potential at the second terminal 21b.

In a power conversion system 1 according to an aspect of the present disclosure, the amplitude of at least one of the output voltage or the output current of the connection unit 15 is controlled by controlling the first bidirectional switch units (including bidirectional switch units 35, 37, 39) and second bidirectional switch units (including bidirectional switch units 36, 38, 40), both of which are arranged on the secondary side of the power conversion system 1. This eliminates the needs for the inverter circuit 5 on the primary side to perform the processing of controlling the amplitude of at least one of the output voltage or the output current. That is to say, this allows the phase of a signal for driving the switching elements S1, S2, S3, S4 that form the inverter circuit 5 to be fixed. The control unit 7 controls the amplitude by controlling the first bidirectional switch units (bidirectional switch units 35, 37, 39) and the second bidirectional switch units (bidirectional switch units 36, 38, 40) with the phase of the inverter circuit 5 on the primary side fixed. This allows no circulating currents to be generated in the inverter circuit 5 on the primary side.

In the following description, a combination of the bidirectional switch units 35 and 36 will be taken as an example. However, the same statement applies to a combination of the bidirectional switch units 37 and 38 and a combination of the bidirectional switch units 39 and 40 as well.

An example of the first bidirectional switch unit (bidirectional switch unit 35) and the second bidirectional switch unit (bidirectional switch unit 36) is as follows. As shown in FIG. 1, the first bidirectional switch unit and the second bidirectional switch unit each include a first switch unit (switch unit S5P or S6P) and a second switch unit (switch unit S5N or S6N) connected to the first switch unit in series.

This exemplary pair of the first switch unit and second switch unit operates as follows. Specifically, as shown in FIG. 1, when the first switch unit (switch unit S5P or S6P) is ON, the first switch unit is electrically conductive both in the direction from the secondary winding 21 toward the connection unit 15 (second connection terminal) and in the direction from the connection unit 15 (second connection terminal) toward the secondary winding 21. On the other hand, when the first switch unit is OFF, the first switch unit is electrically non-conductive in the direction from the secondary winding 21 toward the connection unit 15 but is electrically conductive in the direction from the connection unit 15 toward the secondary winding 21. When the second switch unit (switch unit S5P or S6P) is ON, the second switch unit is electrically conductive both in the direction from the secondary winding 21 toward the connection unit 15 and in the direction from the connection unit 15 toward the secondary winding 21. On the other hand, when the second switch unit is OFF, the second switch unit is electrically conductive in the direction from the secondary winding 21 toward the connection unit 15 and is electrically non-conductive in the direction from the connection unit 15 toward the secondary winding 21.

Figure 4:
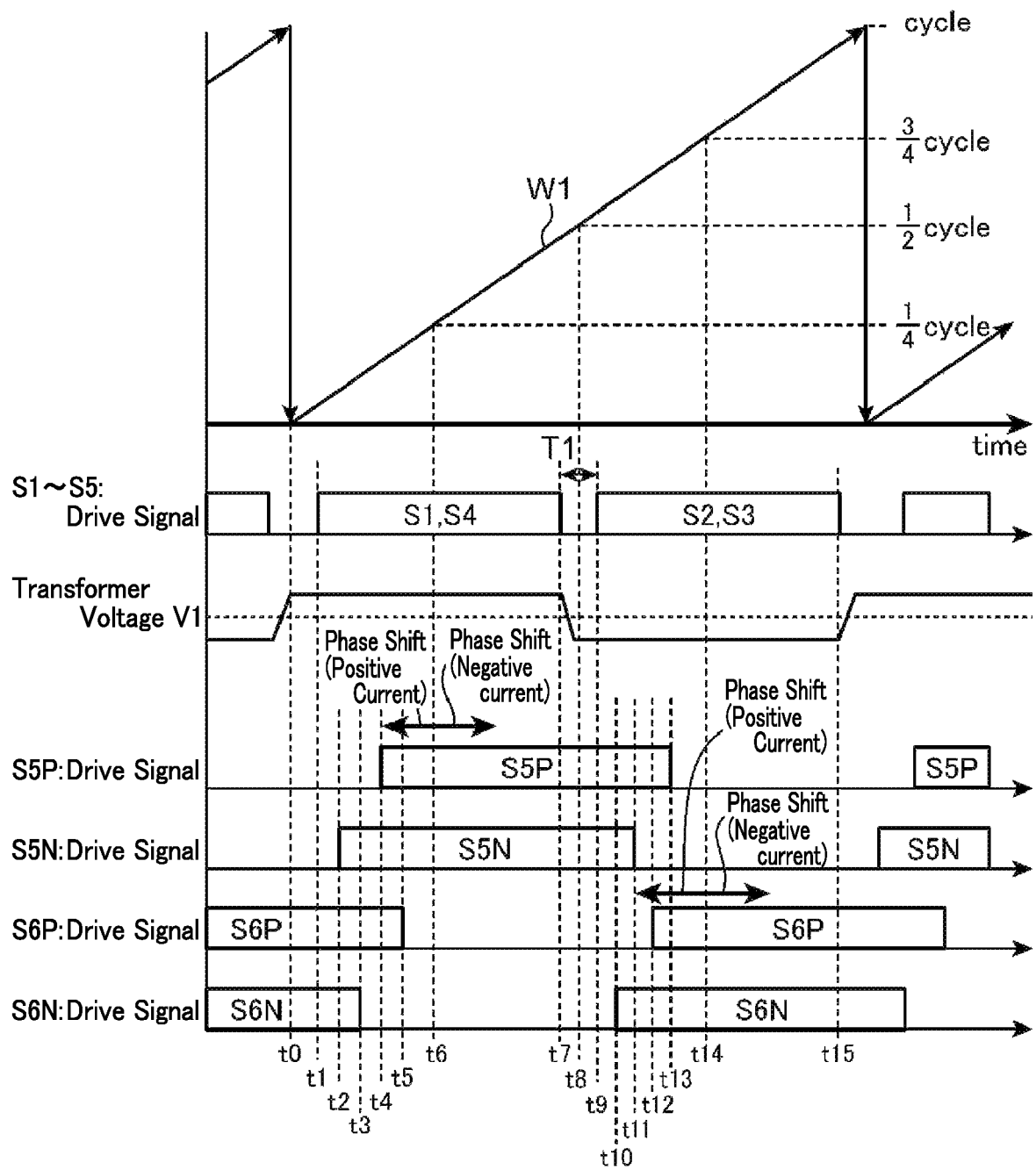
FIG. 4 is a timing chart of a drive signal for switching elements S1-S4, a transformer voltage V1, and respective drive signals for switch units S5P, S5N, S6P, and S6N in the power conversion system.

An exemplary control for shifting the first timing and the second timing may be performed in the following manner. As shown in FIGS. 1 and 4, the control unit 7 shifts the first timing and the second timing by shifting the phase of a drive signal for turning ON and OFF the first switch unit (switch unit S5P) of the first bidirectional switch unit, the phase of a drive signal for turning ON and OFF the second switch unit (switch unit S5N) of the first bidirectional switch unit, the phase of a drive signal for turning ON and OFF the first switch unit (switch unit S6P) of the second bidirectional switch unit, and the phase of a drive signal for turning ON and OFF the second switch unit (switch unit S6N) of the second bidirectional switch unit.

According to this configuration, as shown in FIGS. 1 and 4, the control unit 7 turns the first switch unit (switch unit S6P) of the second bidirectional switch unit from ON to OFF when a first predetermined period passes, during the positive polarity period (i.e., a period in which the transformer voltage V1 is positive), since the control unit 7 has turned the first switch unit (switch unit S5P) of the first bidirectional switch unit from OFF to ON. The control unit 7 also turns the second switch unit (switch unit S6N) of the second bidirectional switch unit from ON to OFF when a second predetermined period passes, during the positive polarity period, since the control unit 7 has turned the second switch unit (switch unit S5N) of the first bidirectional switch unit from OFF to ON. The control unit 7 further turns the first switch unit (switch unit S5P) of the first bidirectional switch unit from ON to OFF when a third predetermined period passes, during the negative polarity period (i.e., a period in which the transformer voltage V1 is negative), since the control unit 7 has turned the first switch unit (switch unit S6P) of the second bidirectional switch unit from OFF to ON. The control unit 7 further turns the second switch unit (switch unit S5N) of the first bidirectional switch unit from ON to OFF when a fourth predetermined period passes, during the negative polarity period, since the control unit 7 has turned the second switch unit (switch unit S6N) of the second bidirectional switch unit from OFF to ON.

This configuration is adopted as a countermeasure against a return current generated on the secondary side of the power conversion system 1. As used herein, the "return current" is a current that is prevented from flowing in its originally intended direction by disconnection, for example, and flows in the opposite direction. Failure to secure a path for the return current to flow through could cause a breakdown to the circuit.

According to this configuration, the control unit 7 performs control such that the ON period of the first switch unit (switch unit S5P) of the first bidirectional switch unit and the ON period of the first switch unit (switch unit S6P) of the second bidirectional switch unit partially overlap with each other, thus preventing both of these first switch units from being OFF in the same period. Likewise, the control unit 7 performs control such that the ON period of the second switch unit (switch unit S5N) of the first bidirectional switch unit and the ON period of the second switch unit (switch unit S6N) of the second bidirectional switch unit partially overlap with each other, thus preventing both of these second switch units from being OFF in the same period. This always secures a path leading to the secondary winding 21 of the transformer 9 on the secondary side of the power conversion system 1. Therefore, even if a return current has been generated on the secondary side of the power conversion system 1, a path is secured for the return current to flow, no matter whether the current is a positive current or a negative current. As used herein, a current flowing from the secondary winding 21 toward the connection unit 15 via a coil 41 will be hereinafter referred to as a "positive current" and a current flowing from the connection unit 15 toward the secondary winding 21 via the coil 41 will be hereinafter referred to as a "negative current."

According to this configuration, as shown in FIGS. 1 and 4, the control unit 7 turns the first switch unit (switch unit S5P) of the first bidirectional switch unit from OFF to ON when a fifth predetermined period passes, during the positive polarity period (i.e., a period in which the transformer voltage V1 is positive), since the control unit 7 has turned the second switch unit (switch unit S6N) of the second bidirectional switch unit from ON to OFF. The control unit 7 also turns the first switch unit (switch unit S6P) of the second bidirectional switch unit from OFF to ON when a sixth predetermined period passes, during the negative polarity period (i.e., a period during which the transformer voltage S5N is negative), since the control unit 7 has turned the second switch unit (switch unit S5N) of the first bidirectional switch unit from ON to OFF.

In the positive polarity period, the direction of a current flowing through the secondary winding 21 is supposed to be a direction from the first terminal 21a of the secondary winding 21 to the first bidirectional switch unit (bidirectional switch unit 35). If the first switch unit (switch unit S5P) of the first bidirectional switch unit and the second switch unit (switch unit S6N) of the second bidirectional switch unit are ON at the same time, then a current supposed to flow from the secondary winding 21 toward the connection unit 15 flows from the first terminal 21a of the secondary winding 21 toward the second terminal 21b of the secondary winding 21 via the first bidirectional switch unit (bidirectional switch unit 35) and the second bidirectional switch unit (bidirectional switch unit 36).

Likewise, in the negative polarity period, the direction of a current flowing through the secondary winding 21 is supposed to be a direction from the second terminal 21b of the secondary winding 21 to the second bidirectional switch unit (bidirectional switch unit 36). If the second switch unit (switch unit S5N) of the first bidirectional switch unit and the first switch unit (switch unit S6P) of the second bidirectional switch unit are ON at the same time, then a current supposed to flow from the secondary winding 21 toward the connection unit 15 flows from the second terminal 21b of the secondary winding 21 toward the first terminal 21a of the secondary winding 21 via the second bidirectional switch unit (bidirectional switch unit 36) and the first bidirectional switch unit (bidirectional switch unit 35).

According to this configuration, in the positive polarity period, the first switch unit (switch unit S5P) of the first bidirectional switch unit is turned from OFF to ON when a fifth predetermined period passes since the second switch unit (switch unit S6N) of the second bidirectional switch unit has been turned from ON to OFF. This prevents both of these switch units from turning ON at the same time. In the same way, according to this configuration, in the negative polarity period, the first switch unit (switch unit S6P) of the second bidirectional switch unit is turned from OFF to ON when a sixth predetermined period passes since the second switch unit (switch unit S5N) of the first bidirectional switch unit has been turned from ON to OFF. This prevents both of these switch units from turning ON at the same time.

According to this configuration, as shown in FIGS. 1 and 3, the control unit 7 performs, when no current flows through the primary winding 19 (i.e., at a dead time T1), the control of turning ON the first switch units (switch units S5P, S7P, S9P) and the second switch units (switch units S5N, S7N, S9N) of the first bidirectional switch units (bidirectional switch units 35, 37, 39) and turning OFF the first switch units (switch units S6P, 58P, S10P) and the second switch unit (switch units S6N, S8N, S9N) of the second bidirectional switch units (bidirectional switch units 36, 38, 40). Alternatively, the control unit 7 may perform the control of turning OFF the first switch units and the second switch units of the first bidirectional switch units and turning ON the first switch units and the second switch units of the second bidirectional switch units.

When the first switch units and second switch units of the first bidirectional switch units are ON and the first switch units and second switch units of the second bidirectional switch units are OFF, or when the first switch units and second switch units of the first bidirectional switch units are OFF and the first switch units and second switch units of the second bidirectional switch units are ON, no current is allowed to flow through the secondary winding 21 of the transformer 9 with a current circulated on the secondary side of the power conversion system 1.

If a current on the secondary side of the power conversion system 1 flows through the secondary winding 21 of the transformer 9 when no current is flowing through the primary winding 19 of the transformer 9 (i.e., at a dead time T1 on the primary side), significant current loss will be caused. This configuration allows, while no current is flowing through the primary winding 19, no current to flow through the secondary winding 21 with a current circulated on the secondary side.

(2.2) Details

Next, a power conversion system 1 according to a first embodiment will be described with reference to the accompanying drawings. FIG. 1 is a circuit diagram of a power conversion system 1 according to the first embodiment. The power conversion system 1 is implemented as a power conditioner including a connection unit 3, an inverter circuit 5, a control unit 7, a transformer 9, a cycloconverter 11, a filter circuit 13, and a connection unit 15.

The connection unit 3 serving as the first connection terminal includes a first terminal 3a to be electrically connected to a positive electrode of a DC power supply 17 (first connection target) and a second terminal 3b to be electrically connected to a negative electrode of the DC power supply 17. In the following description, the phrase "electrically connected to" will be simply hereinafter referred to as "connected." In this embodiment, the DC power supply 17 is implemented as a storage battery. However, this is only an example and should not be construed as limiting. Alternatively, any other DC power supply (such as a solar cell or a fuel cell) may also be adopted in this embodiment.

The power of the DC power supply 17 is supplied to the inverter circuit 5 via the connection unit 3. The inverter circuit 5 is implemented as an RF inverter and converts the DC voltage supplied from the DC power supply 17 into an RF voltage (AC voltage).

The inverter circuit 5 is implemented as a full-bridge circuit in which four switching elements S1, S2, S3, and S4 are bridge-connected together. In this embodiment, the switching elements S1, S2, S3 and S4 are implemented as n-channel metal-oxide-semiconductor (MOS) field-effect transistors. However, this is only an example and should not be construed as limiting. Alternatively, the switching elements S1, S2, S3, and S4 may also be implemented as any other type of switching elements as long as the switching elements are to form a full-bridge circuit. For example, npn-insulated gate bipolar transistors may also be adopted.

The control unit 7 controls the switching element S2 and S3 to OFF state while controlling the switching elements S1 and S4 to ON state, and controls the switching element S2 and S3 to ON state while controlling the switching elements S1 and S4 to OFF state. That is to say, the control unit 7 controls the inverter circuit 5 such that a positive voltage and a negative voltage are alternately applied to the primary winding 19.

The inverter circuit 5 includes four freewheeling diodes D1, D2, D3, and D4. The freewheeling diode D1 is connected to the drain and source of the switching element S1 such that a current flows in a predetermined direction. As used herein, the "current flowing in the predetermined direction" refers to a current flowing in the opposite direction from a current flowing through the switching element S1 in ON state. In the same way, the freewheeling diode D2 is connected to the drain and source of the switching element S2, the freewheeling diode D3 is connected to the drain and source of the switching element S3, and the freewheeling diode D4 is connected to the drain and source of the switching element S4.

The inverter circuit 5 includes an electrolytic capacitor 31 and a capacitor 33. The electrolytic capacitor 31 has one terminal thereof connected to the first terminal 3a of the connection unit 3 and the other terminal thereof connected to the second terminal 3b of the connection unit 3. The capacitor 33 has one terminal thereof connected to the source of the switching element S1 and the drain of the switching element S2, and the other terminal thereof connected to the source of the switching element S3 and the drain of the switching element S4. The capacitor 33 is provided to make soft switching of the inverter circuit 5. The soft switching allows for reducing the switching loss caused by the switching elements S1, S2, S3, and S4.

The transformer 9 is implemented as an RF transformer. The transformer 9 includes a primary winding 19 and a secondary winding 21 magnetically coupled to the primary winding 19. The first terminal 19a and second terminal 19b of the primary winding 19 are connected to output terminals of the inverter circuit 5. The first terminal 21a and second terminal 21b of the secondary winding 21 are connected to input terminals of the cycloconverter 11.

The transformer 9 insulates the inverter circuit 5 and the cycloconverter 11 from each other. The transformer 9 supplies, in a power supply mode, an RF voltage supplied from the inverter circuit 5 to the primary winding 19 to the cycloconverter 11, and supplies, in a power regeneration mode, a voltage supplied from the cycloconverter 11 to the secondary winding 21 to the inverter circuit 5.

The cycloconverter 11 is a DC/AC converter for converting the RF voltage supplied from the transformer 9 directly into a commercial three-phase AC voltage.

The cycloconverter 11 includes six bidirectional switch units 35-40. The first terminal 35a of the bidirectional switch unit 35, the first terminal 37a of the bidirectional switch unit 37, and the first terminal 39a of the bidirectional switch unit 39 are connected to the first terminal 21a of the secondary winding 21.

The second terminal 35b of the bidirectional switch unit 35 is connected to the first terminal 15a of the connection unit 15. The second terminal 37b of the bidirectional switch unit 37 is connected to the second terminal 15b of the connection unit 15. The second terminal 39b of the bidirectional switch unit 39 is connected to the third terminal 15c of the connection unit 15.

As can be seen, the bidirectional switch unit 35 is inserted between the first terminal 21a of the secondary winding 21 and the first terminal 15a of the connection unit 15. The bidirectional switch unit 37 is inserted between the first terminal 21a of the secondary winding 21 and the second terminal 15b of the connection unit 15. The bidirectional switch unit 39 is inserted between the first terminal 21a of the secondary winding 21 and the third terminal 15c of the connection unit 15.

The first terminal 36a of the bidirectional switch unit 36, the first terminal 38a of the bidirectional switch unit 38, and the first terminal 40a of the bidirectional switch unit 40 are connected to the second terminal 21b of the secondary winding 21.

The second terminal 36b of the bidirectional switch unit 36 is connected to the first terminal 15a of the connection unit 15. The second terminal 38b of the bidirectional switch unit 38 is connected to the second terminal 15b of the connection unit 15. The second terminal 40b of the bidirectional switch unit 40 is connected to the third terminal 15c of the connection unit 15.

As can be seen, the bidirectional switch unit 36 is inserted between the second terminal 21b of the secondary winding 21 and the first terminal 15a of the connection unit 15. The bidirectional switch unit 38 is inserted between the second terminal 21b of the secondary winding 21 and the second terminal 15b of the connection unit 15. The bidirectional switch unit 40 is inserted between the second terminal 21b of the secondary winding 21 and the third terminal 15c of the connection unit 15.

The bidirectional switch units 35, 37, and 39 serve as first bidirectional switch units. The bidirectional switch units 36, 38, and 40 serve as second bidirectional switch units. In other words, the bidirectional switch units include the first bidirectional switch units (35, 37, 39) and the second bidirectional switch units (36, 38, 40). The first bidirectional switch units (35, 37, 39) are inserted between the first terminal 21a of the secondary winding 21 and the plurality of terminals (namely, the first terminal 15a, second terminal 15b, and third terminal 15c) of the second connection terminal 15. The second bidirectional switch units (36, 38, 40) are inserted between the second terminal 21b of the secondary winding 21 and the plurality of terminals (namely, the first terminal 15a, second terminal 15b, and third terminal 15c) of the second connection terminal 15. As used herein, the "terminal" does not have to be a part to which an electric wire, a cable, or any other member is connected, but may also be a lead of an electronic part or a portion of a conductor included in a circuit board, for example.

Connecting the second terminal 35b of the bidirectional switch unit 35 and the second terminal 36b of the bidirectional switch unit 36 allows these bidirectional switch units 35 and 36 to be connected together in series. Connecting the second terminal 37b of the bidirectional switch unit 37 and the second terminal 38b of the bidirectional switch unit 38 allows these bidirectional switch units 37 and 38 to be connected together in series. Connecting the second terminal 39b of the bidirectional switch unit 39 and the second terminal 40b of the bidirectional switch unit 40 allows these bidirectional switch units 39 and 40 to be connected together in series.

Figure 2:
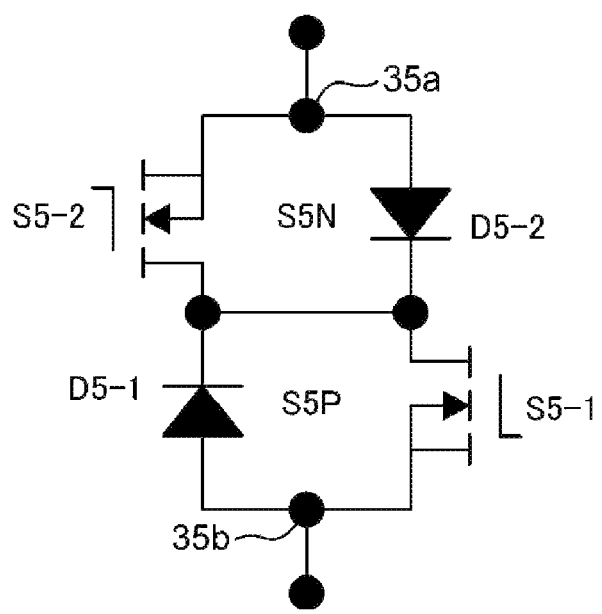
FIG. 2 is a circuit diagram illustrating a configuration for a bidirectional switch unit included in the power conversion system.

The configuration of the bidirectional switch unit 35 will be described in detail. FIG. 2 is a circuit diagram illustrating its configuration. The bidirectional switch unit 35 includes a switch unit S5P and a switch unit S5N. The switch unit S5P includes a switching element S5-1 and a diode D5-1. The switch unit S5N includes a switching element S5-2 and a diode D5-2. In this example, the switching elements S5-1 and S5-2 are implemented as n-channel MOS field-effect transistors. However, this is only an example and should not be construed as limiting. Alternatively, any other type of switching elements may also be used as long as the switching elements may be constituent elements of the bidirectional switch unit 35. For example, npn insulated gate bipolar transistors may also be adopted.

The source of the switching element S5-1 and the anode of the diode D5-1 are connected together at a connection node, which defines the second terminal 35b of the bidirectional switch unit 35. The source of the switching element S5-2 and the anode of the diode D5-2 are connected together at a connection node, which defines the first terminal 35a of the bidirectional switch unit 35.

The drain of the switching element S5-1, the cathode of the diode D5-1, the drain of the switching element S5-2, and the cathode of the diode D5-2 are connected together.

As shown in FIG. 1, the bidirectional switch unit 36 includes a switch unit S6P and a switch unit S6N. The bidirectional switch unit 37 includes a switch unit S7P and a switch unit S7N. The bidirectional switch unit 38 includes a switch unit S8P and a switch unit S8N. The bidirectional switch unit 39 includes a switch unit S9P and a switch unit S9N. The bidirectional switch unit 40 includes a switch unit S10P and a switch unit S10N. The bidirectional switch units 36-40 each have the same configuration as the bidirectional switch unit 35. The switch units S6P-S10P correspond to the switch unit S5P. The switch units S6N-S10N correspond to the switch unit S5N.

The switch units S5P, S6P, S7P, 58P, 59P, and S10P serve as first switch units. When any of these first switch units is ON, the first switch unit is electrically conductive both in the direction from the secondary winding 21 toward the connection unit 15 and in the direction from the connection unit 15 toward the secondary winding 21. When the first switch unit is OFF, the first switch unit is electrically non-conductive in the direction from the secondary winding 21 toward the connection unit 15 and is electrically conductive in the direction from the connection unit 15 toward the secondary winding 21.

The switch units S5N, S6N, S7N, S8N, S9N, and S10N serve as second switch units. When any of these second switch units is ON, the second switch unit is electrically conductive both in the direction from the secondary winding 21 toward the connection unit 15 and in the direction from the connection unit 15 toward the secondary winding 21. When the second switch unit is OFF, the second switch unit is electrically conductive in the direction from the secondary winding 21 toward the connection unit 15 and is electrically non-conductive in the direction from the connection unit 15 toward the secondary winding 21.

The control unit 7 controls the ON/OFF states of the switch units S5P, S5N, S6P, S6N, S7P, S7N, S8P, S8N, S9P, S9N, S10P, and S10N, thereby controlling the amplitude of at least one of the output voltage or the output current of the connection unit 15 as will be described in detail later.

The filter circuit 13 is inserted between the cycloconverter 11 and the connection unit 15. The filter circuit 13 includes coils 41, 43, and 45 and capacitors 47, 49, and 51. The capacitor 47 has one terminal thereof connected to the first terminal 15a of the connection unit 15 and the other terminal thereof connected to the second terminal 15b of the connection unit 15. The capacitor 49 has one terminal thereof connected to the second terminal 15b of the connection unit 15 and the other terminal thereof connected to the third terminal 15c of the connection unit 15. The capacitor 51 has one terminal thereof connected to the first terminal 15a of the connection unit 15 and the other terminal thereof connected to the third terminal 15c of the connection unit 15.

The coils 41, 43, and 45 are arranged closer to the cycloconverter 11 than the capacitors 47, 49, and 51 are. The coils 41, 43, and 45 are implemented as AC reactors. The coil 41 has one terminal thereof connected to the first terminal 15a and the other terminal thereof connected to the second terminal 35b of the bidirectional switch unit 35 and the second terminal 36b of the bidirectional switch unit 36. The coil 43 has one terminal thereof connected to the second terminal 15b and the other terminal thereof connected to the second terminal 37b of the bidirectional switch unit 37 and the second terminal 38b of the bidirectional switch unit 38. The coil 45 has one terminal thereof connected to the third terminal 15c and the other terminal thereof connected to the second terminal 39b of the bidirectional switch unit 39 and the second terminal 40b of the bidirectional switch unit 40.

The filter circuit 13 smoothes out an AC signal (which may be an AC voltage or an AC current) output from the cycloconverter 11. This allows a rectangular wave AC signal (which may be either an AC voltage or an AC current) output from the cycloconverter 11 to be converted into a sinusoidal wave AC signal (which may be either an AC voltage or an AC current), of which the amplitude corresponds to the pulse width of the rectangular wave.

The connection unit 15 (second connection terminal) is implemented as a switch with a first terminal 15a, a second terminal 15b, and a third terminal 15c, each of which is electrically connectable to either the commercial power grid 27 or load 29 as the second connection target. The first terminal 15a serves as a U-phase terminal. The second terminal 15b serves as a V-phase terminal. The third terminal 15c serves as a W-phase terminal. The load 29 is implemented as a resistive load with a power factor of one or an inductive or capacitive load with a power factor not equal to one. When power is supplied from the DC power supply 17 to the commercial power grid 27 (i.e., when power is sold) or when the DC power supply 17 is charged, the connection unit 15 is connected to the commercial power grid 27. On the other hand, when power is supplied from the DC power supply 17 to the load 29 (such as a consumer electronic appliance), the connection unit 15 is connected to the load 29.

Next, it will be described how the power conversion system 1 according to this embodiment operates. FIG. 3 is a timing chart illustrating its operation. The operation of the power conversion system 1 includes a power supply mode (inverter mode) in which the power is supplied from the DC power supply 17 to either the commercial power supply 27 or the load 29 and a power regeneration mode (converter mode) in which power supplied from either the commercial power grid 27 or load 29 is regenerated in the DC power supply 17. The operation mode of the power conversion system 1 is determined to be either the power supply mode or the power regeneration mode by the power factor of the load 29 or the voltage value of the commercial power grid 27. Therefore, the power conversion system 1 operates as shown in FIG. 3 in both of the power supply mode and the power regeneration mode.

As shown in FIGS. 1 and 3, the control unit 7 generates drive signals (primary-side drive signals) for the switching elements S1-S4. When the drive signal for the switching element S1 rises, the switching element S1 turns ON. When the drive signal for the switching element S1 falls, the switching element S1 turns OFF. In the same way, when the drive signal for any of the switching elements S2-S4 rises, the switching element S2-S4 turns ON. When the drive signal for any of the switching elements S2-S4 falls, the switching element S2-S4 turns OFF.

The control unit 7 matches the phases of the drive signals for the switching elements S1 and S4 to each other. This allows the switching elements S1 and S4 to always turn ON and OFF at the same timing. The control unit 7 also matches the phases of the drive signals for the switching elements S2 and S3 to each other. This allows the switching elements S2 and S3 to always turn ON and OFF at the same timing.

The control unit 7 provides a certain interval between the timing when the drive signal for the switching elements S1 and S4 falls and the timing when the drive signal for the switching elements S2 and S3 rises. In addition, the control unit 7 also provides a certain interval between the timing when the drive signal for the switching elements S2 and S3 falls and the timing when the drive signal for the switching elements S1 and S4 rises. This provides a so-called "dead time T1." This is because if both of the switching elements S1 and S2 were ON at the same time, the inverter circuit 5 would be short-circuited. The inverter circuit 5 would also be short-circuited if both of the switching elements S3 and S4 were ON at the same time.

The transformer voltage V1 represents the voltage of the secondary winding 21 of the transformer 9.

The control unit 7 controls the U phase by the combination of the bidirectional switch units 35 and 36. The control unit 7 controls the V phase by the combination of the bidirectional switch units 37 and 38. The control unit 7 controls the W phase by the combination of the bidirectional switch units 39 and 40. This will be described in detail.

The control unit 7 generates drive signals (secondary-side drive signals) for the switch units S5P, S5N, S6P, and S6N. When the drive signal for the switch unit S5P rises, the switch unit S5P turns ON (in other words, the switching element S5-1 shown in FIG. 2 turns ON). When the drive signal for the switch unit S5P falls, the switch unit S5P turns OFF (in other words, the switching element S5-1 shown in FIG. 2 turns OFF).

Likewise, when the drive signal for the switch unit S5N, S6P, or S6N rises, the switch unit S5N, S6P, or S6N turns ON. When the drive signal for the switch unit S5N, S6P, or S6N falls, the switch unit S5N, S6P, or S6N turns OFF.

The control unit 7 controls the amplitude of at least one of the U-phase output voltage or output current of the connection unit 15 by shifting the timing to turn ON the switch unit S5P, S5N, S6P, or S6N.

The control unit 7 generates drive signals (secondary-side drive signals) for the switch units S7P, S7N, S8P, and S8N. When the drive signal for the switch unit S7P, S7N, S8P, or S8N rises, the switch unit S7P, S7N, S8P, or S8N turns ON. When the drive signal for the switch unit S7P, S7N, S8P, or S8N falls, the switch unit S7P, S7N, S8P, or S8N turns OFF.

The control unit 7 controls the amplitude of at least one of the V-phase output voltage or output current of the connection unit 15 by shifting the timing to turn ON the switch unit S7P, S7N, S8P, or S8N.

The control unit 7 generates drive signals (secondary-side drive signals) for the switch units S9P, S9N, S10P, and S10N. When the drive signal for the switch unit S9P, S9N, S10P, or S10N rises, the switch unit S9P, S9N, S10P, or S10N turns ON. When the drive signal for the switch unit S9P, S9N, S10P, or S10N falls, the switch unit S9P, S9N, S10P, or S10N turns OFF.

The control unit 7 controls the amplitude of at least one of the W-phase output voltage or output current of the connection unit 15 by shifting the timing to turn ON the switch unit S9P, S9N, S10P, or S10N.

A triangular wave W1 is used to generate the drive signals for the switching elements S1-S4 and the drive signals for the switch units S5P, S5N, S6P, S6N, S7P, S7N, S8P, S8N, S9P, S9N, S10P, and S10N. The control unit 7 generates, based on the triangular wave W1, these drive signals each having a desired duty.

The group of V-phase drive signals (i.e., drive signals for the switch units S7P, S7N, 58P, and S8N) are generated to have a phase lag with respect to the group of U-phase drive signals (i.e., drive signals for the switch units (S5P, S5N, S6P, and S6N)). The group of W-phase drive signals (i.e., drive signals for the switch units 59P, S9N, S10P, and S10N) are generated to have a longer phase lag with respect to the group of U-phase drive signals. Therefore, the switch units S5P, S5N, S6P, and S6N operate in the same way as the switch units S7P, S7N, 58P, and S8N, respectively, and also operate in the same way as the switch units 59P, S9N, S10P, and S10N, respectively. It will be described how these switch units operate with the switch units S5P, S5N, S6P, and S6N taken as an example.

Figure 5:
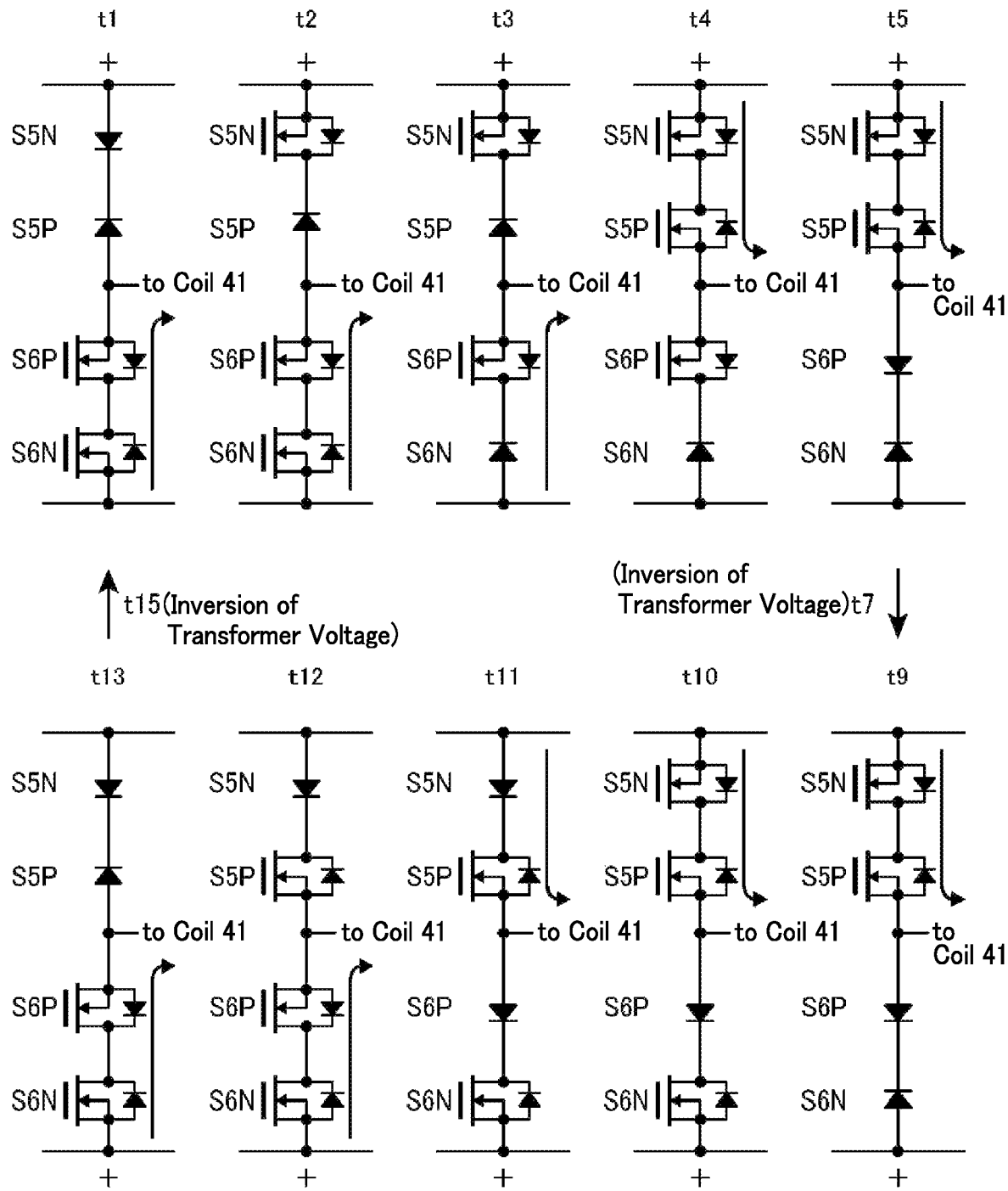
FIG. 5 is a sequence diagram illustrating how the switch units S5P, S5N, S6P, and S6N operate in the power conversion system in a situation where a U phase is a positive current.

FIG. 4 is a timing chart of the drive signals for the switching elements S1-S4, the transformer voltage V1 (voltage of the secondary winding 21), and the drive signals for the switch units S5P, S5N, S6P, and S6N according to this embodiment. FIG. 5 is a sequence diagram illustrating how the switch units S5P, S5N, S6P, and S6N operate when the U-phase is a positive current. The positive current flows from the secondary winding 21 toward the connection unit 15 via the coil 41. In FIG. 5, the sign "+" indicates one side, having the higher potential, of the circuit made up of the switch units S5P, S5N, S6P, and S6N.

As shown in FIGS. 4 and 5, Time t0 is a timing when the triangular wave W1 switches from a trailing edge into a leading edge, and Time t1 is a timing when the switching elements S1 and S4 turn ON. Time t1 is given by dead time T1×(½) with respect to Time t0 as a reference time.

At Time t1, the switch units S5P and S5N are OFF and the switch units S6P and S6N are ON. The switch unit S6P (first switch unit) and switch unit S6N (second switch unit) in ON state are electrically conductive in the direction from the secondary winding 21 toward the connection unit 15. The switch unit S5N (second switch unit) in OFF state is electrically conductive in the direction from the secondary winding 21 toward the connection unit 15. The switch unit S5P (first switch unit) in OFF state is electrically non-conductive in the direction from the secondary winding 21 toward the connection unit 15. Therefore, the positive current flows toward the coil 41 while passing through the switch units S6N and S6P, not through the switch units S5N and S5P.

At Time t2, the switch unit S5N turns ON. Therefore, at Time t2, the switch unit S5P is OFF and the switch units S5N, S6P, and S6N are ON. The switch unit S5P (first switch unit) in OFF state is electrically non-conductive in the direction from the secondary winding 21 toward the connection unit 15. Thus, the positive current's flowing path does not change.

At Time t3, the switch unit S6N turns OFF. Therefore, at Time t3, the switch units S5P and S6N are OFF and the switch units S5N and S6P are ON. The switch unit S6N (second switch unit) in OFF state is electrically conductive in the direction from the secondary winding 21 toward the connection unit 15. Thus, the positive current's flowing path does not change, either.

At Time t4, the switch unit S5P turns ON. Therefore, at Time t4, the switch unit S6N is OFF and the switch units S5P, S5N and S6P are ON. The switch unit S5P (first switch unit) in ON state is electrically conductive in the direction from the secondary winding 21 toward the connection unit 15. The switch unit S5N has the higher potential and the switch units S5P, S5N, and S6P are ON. Therefore, the switch unit S6N is reverse biased. Consequently, the positive current's flowing path changes. That is to say, the positive current flows toward the coil 41 while passing through the switch units S5N and S5P, not through the switch units S6N and S6P.

At Time t5, the switch unit S6P turns OFF. Therefore, at Time t5, the switch units S6P and S6N are OFF and the switch units S5P and S5N are ON. The switch unit S5N has the higher potential, the switch units S5P and S5N are ON, and the switch unit S6P is forward biased. Thus, the switch unit S6N becomes reverse biased. Therefore, the positive current's flowing path does not change.

Time t6 marks a quarter of one cycle of the triangular wave W1, and also indicates the middle of the ON period of the switching elements S1 and S4. Thus, the length of the period from the timing when the switching elements S1 and S4 are activated through Time t6 is equal to that of the period from Time t6 through the timing when the switching elements S1 and S4 are deactivated. The states of the switch units S5P, S5N, S6P, and S6N at Time t6 remain unchanged from the states of these switch units at Time t5. Therefore, the positive current's flowing path does not change.

Time t7 is a timing when the switching elements S1 and S4 turn OFF. Time t7 is given by one cycle of the triangular wave W1×(½)−dead time T1×(½). Time t8 is given by one cycle of the triangular wave W1×(½). The states of the switch units S5P, S5N, S6P, and S6N at Times t7 and t8 remain unchanged from the states of these switch units at Time t5. Therefore, the positive current's flowing path does not change.

Time t9 is a timing when the switching elements S2 and S3 turn ON. The interval from Time t7 through Time t9 defines the dead time T1. The states of the switch units S5P, S5N, S6P, and S6N at Time t9 remain unchanged from the states of these switch units at Time t5. Therefore, the positive current's flowing path does not change.

At Time t10, the switch unit S6N turns ON. Therefore, at Time t10, the switch unit S6P is OFF and the switch units S5P, S5N, and S6N are ON. The switch unit S6P (first switch unit) in OFF state is electrically non-conductive in the direction from the secondary winding 21 toward the connection unit 15. Thus, the positive current's flowing path does not change.

At Time t11, the switch unit S5N turns OFF. Therefore, at Time t11, the switch units S5N and S6P are OFF and the switch units S5P and S6N are ON. The switch unit S5N (second switch unit) in OFF state is electrically non-conductive in the direction from the secondary winding 21 toward the connection unit 15. Thus, the positive current's flowing path does not change, either.

At Time t12, the switch unit S6P turns ON. Therefore, at Time t12, the switch unit S5N is OFF and the switch units S5P, S6P and S6N are ON. The switch unit S6N has the higher potential and the switch units S6P and S6N are ON. Thus, the positive current's flowing path changes. That is to say, the positive current flows toward the coil 41 while passing through the switch units S6N and S6P, not through the switch units S5N and S5P.

At Time t13, the switch unit S5P turns OFF. Therefore, at Time t13, the switch unit S5P and S5N are OFF and the switch units S6P and S6N are ON. The switch unit S6N has the higher potential, the switch units S6P and S6N are ON. Therefore, the positive current's flowing path does not change.

Time t14 marks three quarters of one cycle of the triangular wave W1, and also indicates the middle of the ON period of the switching elements S2 and S3. Thus, the length of the period from the timing when the switching elements S2 and S3 are activated through Time t14 is equal to the length of the period from Time t14 through the timing when the switching elements S2 and S3 are deactivated. The states of the switch units S5P, S5N, S6P, and S6N at Time t14 remain unchanged from the states of these switch units at Time t13. Therefore, the positive current's flowing path does not change.

Time t15 is a timing when the switching elements S2 and S3 turn OFF. Time t15 is given by one cycle of the triangular wave W1−dead time T1×(½). The states of the switch units S5P, S5N, S6P, and S6N at Time t15 remain unchanged from the states of these switch units at Time t13. Therefore, the positive current's flowing path does not change.

The switch units S5P, S5N, S6P, and S6N operate as described above in one cycle of the triangular wave W1 when the U-phase is a positive current.

Figure 6:
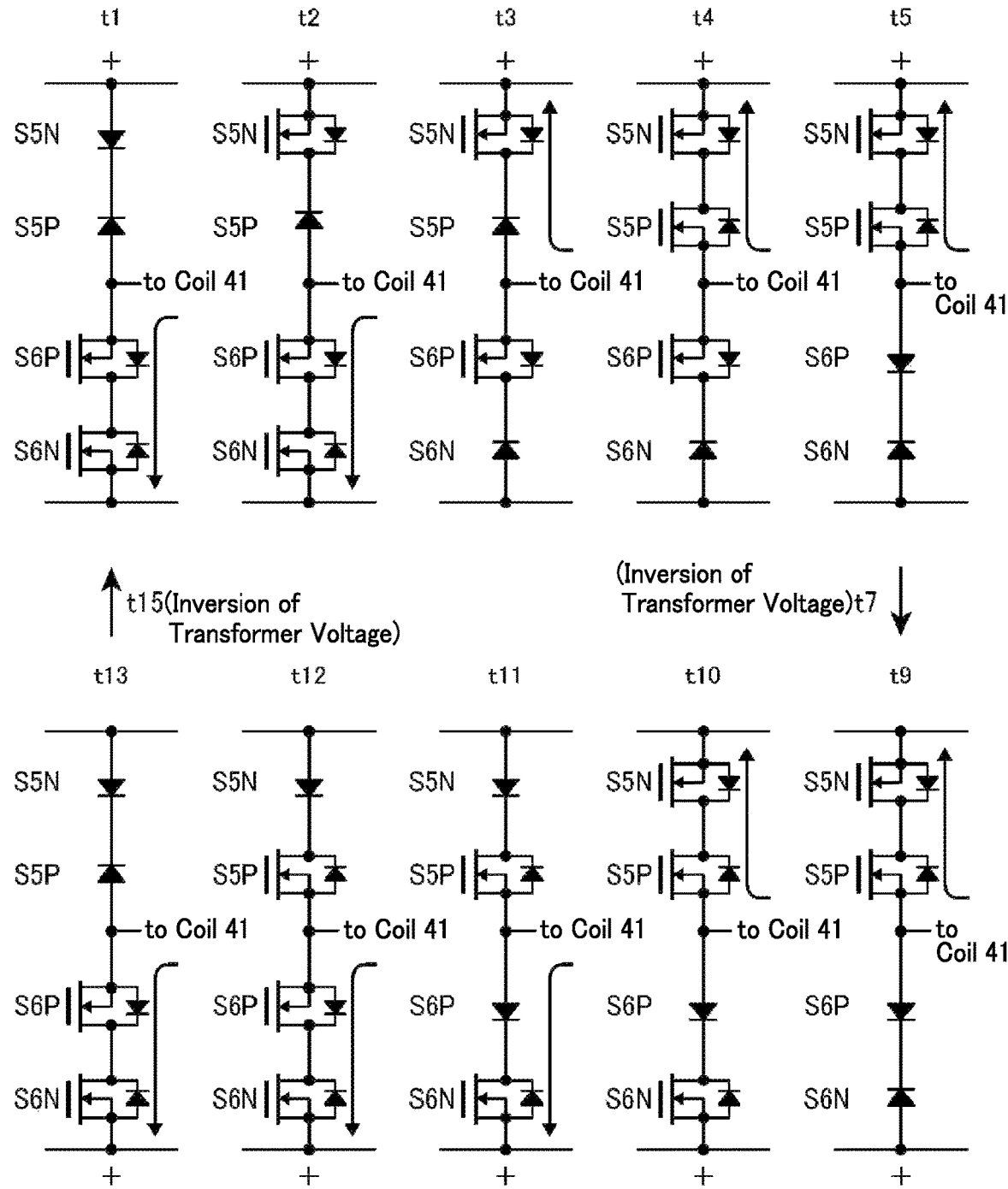
FIG. 6 is a sequence diagram illustrating how the switch units S5P, S5N, S6P, and S6N operate in the power conversion system in a situation where a U phase is a negative current.

Next, a situation where the U-phase is a negative current will be described. FIG. 6 is a sequence diagram illustrating how the switch units S5P, S5N, S6P, and S6N operate when the U-phase is a negative current. The negative current flows from the connection unit 15 toward the secondary winding 21 via the coil 41.

As shown in FIGS. 4 and 6, at Time t1, the states of the switch units S5P, S5N, S6P, and S6N are the same as the states of these switch units at Time t1 shown in FIG. 5. The switch unit S6P (first switch unit) and the switch unit S6N (second switch unit) in ON state are electrically conductive in the direction from the connection unit 15 toward the secondary winding 21. The switch unit S5N (second switch unit) in OFF state is electrically non-conductive in the direction from the connection unit 15 toward the secondary winding 21. The switch unit S5P (first switch unit) in OFF state is electrically conductive in the direction from the connection unit 15 toward the secondary winding 21. Therefore, the negative current flows toward the secondary winding 21 while passing through the switch units S6P and S6N, not through the switch units S5P and S5N.

At Time t2, the states of the switch units S5P, S5N, S6P, and S6N are the same as the states of these switch units at Time t2 shown in FIG. 5. At Time t2, the switch unit S5N (second switch unit) is ON. However, the switch unit S5N has the higher potential and the switch unit S6N has the lower potential. The negative current flows toward the lower potential side, and therefore, the negative current's flowing path does not change.

At Time t3, the states of the switch units S5P, S5N, S6P, and S6N are the same as the states of these switch units at Time t3 shown in FIG. 5. The switch unit S6N (second switch unit) in OFF state is electrically non-conductive in the direction from the connection unit 15 toward the secondary winding 21. Therefore, the negative current's flowing path changes. That is to say, the negative current flows toward the secondary winding 21 while passing through the switch units S5P and S5N, not through the switch units S6P and S6N.

At Time t4, the states of the switch units S5P, S5N, S6P, and S6N are the same as the states of these switch units at Time t4 shown in FIG. 5. Since the switch unit S6N is OFF, the negative current's flowing path does not change.

At Time t5, the states of the switch units S5P, S5N, S6P, and S6N are the same as the states of these switch units at Time t5 shown in FIG. 5. Since the switch unit S6N is OFF, the negative current's flowing path does not change.

At Time t9, the states of the switch units S5P, S5N, S6P, and S6N are the same as the states of these switch units at Time t9 shown in FIG. 5. Since the switch unit S6N is OFF, the negative current's flowing path does not change.

At Time t10, the states of the switch units S5P, S5N, S6P, and S6N are the same as the states of these switch units at Time t10 shown in FIG. 5. The switch unit S6N is ON. However, the switch unit S6N has the higher potential and the switch unit S5N has the lower potential. The negative current flows toward the lower potential side, and therefore, the negative current's flowing path does not change.

At Time t11, the states of the switch units S5P, S5N, S6P, and S6N are the same as the states of these switch units at Time t11 shown in FIG. 5. The switch unit S5N (second switch unit) in OFF state is electrically non-conductive in the direction from the connection unit 15 toward the secondary winding 21. Therefore, the negative current's flowing path changes. That is to say, the negative current flows toward the secondary winding 21 while passing through the switch units S6P and S6N, not through the switch units S5P and S5N.

At Time t12, the states of the switch units S5P, S5N, S6P, and S6N are the same as the states of these switch units at Time t12 shown in FIG. 5. The switch unit S5N (second switch unit) is OFF, and therefore, is electrically non-conductive in the direction from the connection unit 15 toward the secondary winding 21. Consequently, the negative current's flowing path does not change.

Figure 7:
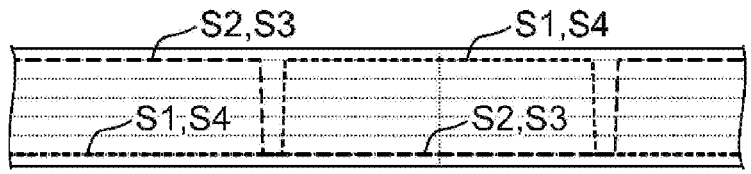
FIG. 7 is a timing chart illustrating how the power conversion system operates in a power supply mode.
Figure 7:
Figure 7:
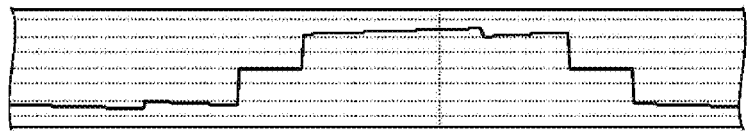
Figure 7:
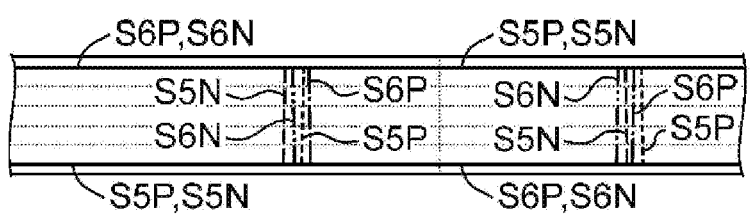
Figure 7:
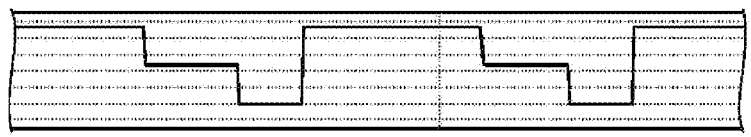
Figure 7:
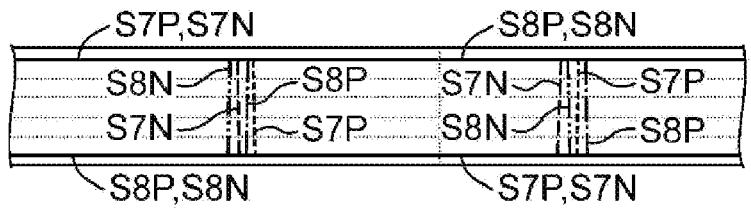
Figure 7:
Figure 7:
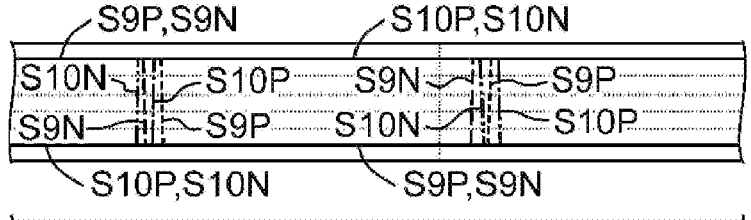
Figure 7:
Figure 8:
FIG. 8 is a timing chart illustrating how the power conversion system operates in a power regeneration mode.
Figure 8:
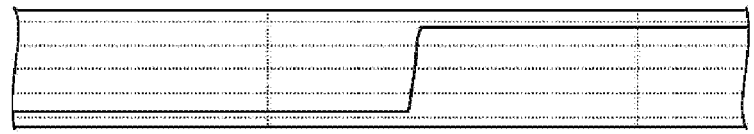
Figure 8:
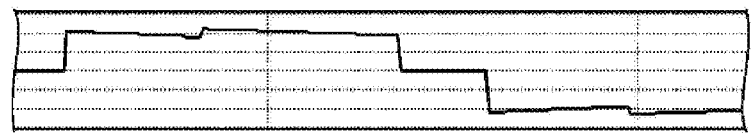
Figure 8:
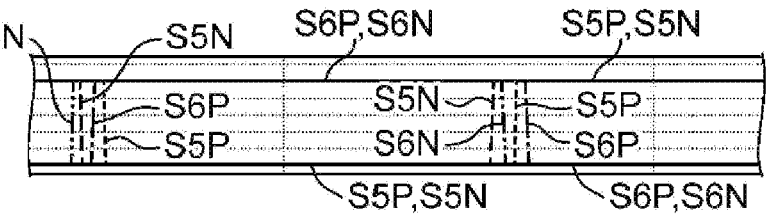
Figure 8:
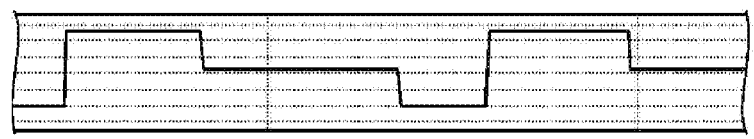
Figure 8:
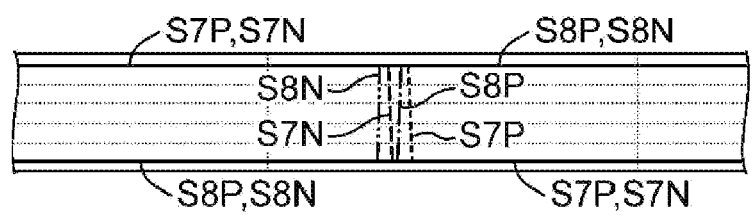
Figure 8:
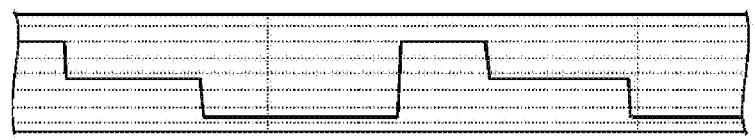
Figure 8:
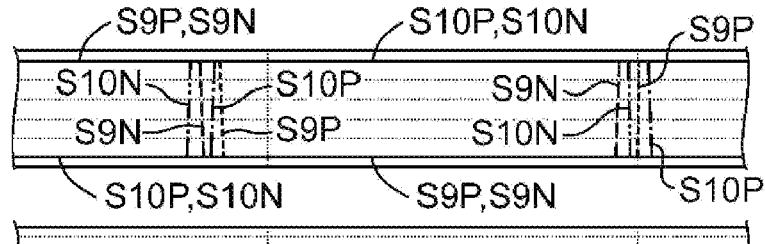
Figure 8:
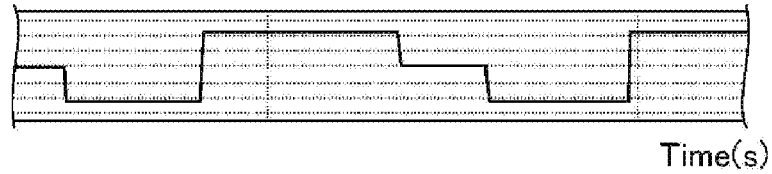

At Time t13, the states of the switch units S5P, S5N, S6P, and S6N are the same as the states of these switch units at Time t13 shown in FIG. 5. The switch unit S5N (second switch unit) is OFF, and therefore, is electrically non-conductive in the direction from the connection unit 15 toward the secondary winding 21. Consequently, the negative current's flowing path does not change Next, the output voltage delivered from the connection unit 15 by the above-described operation of the power conversion system 1 according to the first embodiment will be described. FIG. 7 is a timing chart illustrating how the power conversion system 1 according to the first embodiment operates in a power supply mode. FIG. 8 is a timing chart illustrating how the power conversion system 1 according to the first embodiment operates in a power regeneration mode. As shown in FIGS. 7 and 8, the drive signals for the switching elements S1-S4 correspond to the drive signals for the switching elements S1-S4 shown in FIG. 3. The transformer voltage V1 (i.e., the voltage of the secondary winding 21) corresponds to the transformer voltage V1 shown in FIG. 3. A transformer current i1 indicates the current flowing through the secondary winding 21.

The drive signals for the switch units S5P, S5N, S6P, and S6N correspond to the drive signals for the switch units S5P, S5N, S6P, and S6N shown in FIG. 3. The output voltage (U) indicates a U-phase output voltage delivered from the connection unit 15. In the line graphs representing the drive signals, a laterally extending line is drawn as a solid line because lines representing a plurality of drive signals are superposed one on top of another.

The drive signals for the switch units S7P, S7N, S8P, and S8N correspond to the drive signals for the switch units S7P, S7N, S8P, and S8N shown in FIG. 3. The output voltage (V) indicates a V-phase output voltage delivered from the connection unit 15. In the line graphs representing the drive signals, a laterally extending line is drawn as a solid line because lines representing a plurality of drive signals are superposed one on top of another.

The drive signals for the switch units S9P, S9N, S10P, and S10N correspond to the drive signals for the switch units 59P, S9N, S10P, and S10N shown in FIG. 3. The output voltage (W) indicates a W-phase output voltage delivered from the connection unit 15. In the line graphs representing the drive signals, a laterally extending line is drawn as a solid line because lines representing a plurality of drive signals are superposed one on top of another.

Next, a major feature of this embodiment will be described. As shown in FIG. 4, the control unit 7 controls the amplitude of at least one of the U-phase output voltage or output current of the connection unit 15 by shifting the timings to turn the switch units S5P, S5N, S6P, and S6N ON. Although not shown, the control unit 7 also controls the amplitude of at least one of the V-phase output voltage or output current of the connection unit 15 by shifting the timings to turn the switch units S7P, S7N, 58P, and S8N ON. In addition, the control unit 7 controls the amplitude of at least one of the W-phase output voltage or output current of the connection unit 15 by shifting the timings to turn the switch units 59P, S9N, S10P, and S10N ON.

The group of U-phase drive signals (i.e., drive signals for the switch units S5P, S5N, S6P, and S6N), the group of V-phase drive signals (i.e., drive signals for the switch units S7P, S7N, 58P, and S8N), and the group of W-phase drive signals (i.e., drive signals for the switch units 59P, S9N, S10P, and S10N) have the same magnitude of shift and the same shifting direction. Thus, it will be described in detail, with the group of U-phase drive signals taken as an example, how to shift the drive signals (i.e., how to shift the timings to turn the switch units ON).

As shown in FIG. 4, the control unit 7 makes the respective ON periods of the switch unit S5P (first switch unit), the switch unit S5N (second switch unit), the switch unit S6P (first switch unit), and the switch unit S6N (second switch unit) constant and also makes their respective OFF periods constant. Thus, shifting the timings to turn these switch units ON allows the timings to turn these switch units OFF to shift in the same direction. The magnitudes of shift may be either the same or different.

When shifting the timing to turn the switch unit S5P ON while the switching elements S1 and S4 are ON, the control unit 7 also shifts the timings to turn the other switch units S5N, S6P, and S6N ON in the same direction and by the same magnitude as the former switch unit S5P. Likewise, when shifting the timing to turn the switch unit S6P ON while the switching elements S2 and S3 are ON, the control unit 7 also shifts the timings to turn the other switch units S5P, S5N, and S6N ON in the same direction and by the same magnitude as the former switch unit S6P.

That is to say, when the transformer voltage V1 is positive, the control unit 7 shifts the timing to turn the switch unit S5P ON with respect to Time t6, and shifts the timings to turn the other switch units S5N, S6P, and S6N ON in the same direction and by the same magnitude as the former switch unit S5P. In the case of a positive current flowing, the control unit 7 shifts the timings to turn these switch units ON to the left in FIG. 4. In the case of a negative current flowing, on the other hand, the control unit 7 shifts the timings to turn these switch units ON to the right in FIG. 4. The greater the magnitude of shift is, the greater the amplitude of at least one of the U-phase output voltage or output current of the connection unit 15 becomes.

When the transformer voltage V1 is negative, the control unit 7 shifts the timing to turn the switch unit S6P ON with respect to Time t14, and shifts the timings to turn the other switch units S5P, S5N, and S6N ON in the same direction and by the same magnitude as the former switch unit S6P. In the case of a positive current flowing, the control unit 7 shifts the timings to turn these switch units ON to the left in FIG. 4. In the case of a negative current flowing, on the other hand, the control unit 7 shifts the timings to turn these switch units ON to the right in FIG. 4. The greater the magnitude of shift is, the greater the amplitude of at least one of the U-phase output voltage or output current of the connection unit 15 becomes.

Shifting the timings to turn the switch units S5P, S5N, S6P, and S6N ON may be done by changing the respective duties of the drive signals for these switch units according to manipulated variable.

If the manipulated variable for changing the duty of a drive signal for the switch unit S5P is 1, then the timing to turn the switch unit S5P ON is the same as the timing to turn the switching elements S1 and S4 ON (at Time t1). If the manipulated variable for changing the duty of the drive signal for the switch unit S5P is 0, then the timing to turn the switch unit S5P ON is Time t6. If the manipulated variable for changing the duty of the drive signal for the switch unit S5P is −1, then the timing to turn the switch unit S5P ON is the same as the timing to turn the switching elements S1 and S4 OFF (at Time t7).

If the manipulated variable for changing the duty of a drive signal for the switch unit S6P is 1, then the timing to turn the switch unit S6P ON is the same as the timing to turn the switching elements S2 and S3 ON (at Time t9). If the manipulated variable for changing the duty of the drive signal for the switch unit S6P is 0, then the timing to turn the switch unit S6P ON is Time t14. If the manipulated variable for changing the duty of the drive signal for the switch unit S6P is −1, then the timing to turn the switch unit S6P ON is the same as the timing to turn the switching elements S2 and S3 OFF (at Time t15).

Figure 9:
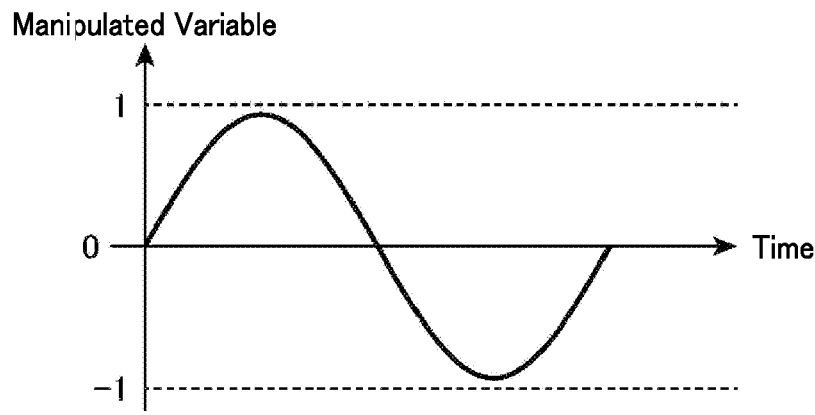
FIG. 9 is a graph showing a first exemplary manipulated variable for changing the duty of a drive signal in the power conversion system.

The control unit 7 controls the amplitude of at least one of the U-phase output voltage or output current of the connection unit 15 by controlling the manipulated variable for changing the duties of the drive signals for the switch units S5P, S5N, S6P, and S6N. FIG. 9 is a graph showing a first exemplary manipulated variable for changing the duties of the drive signals. In FIG. 9, the ordinate indicates a manipulated variable for changing the duties of the drive signals for the switch units S5P, S5N, S6P, and S6N, and the abscissa indicates the time. This graph has a sinusoidal waveform. When making the waveform of at least one of the U-phase output voltage or output current of the connection unit 15 a sinusoidal waveform, the control unit 7 also makes the manipulated variable for changing the duties of the drive signals for the switch units S5P, S5N, S6P, and S6N have a sinusoidal waveform. The same statement applies to the V-phase and the W-phase. The control unit 7 makes the manipulated variable for changing the duties of the drive signals for the switch units S7P, S7N, 58P, S8N, 59P, S9N, S10P, and S10N have a sinusoidal waveform.

Figure 10:
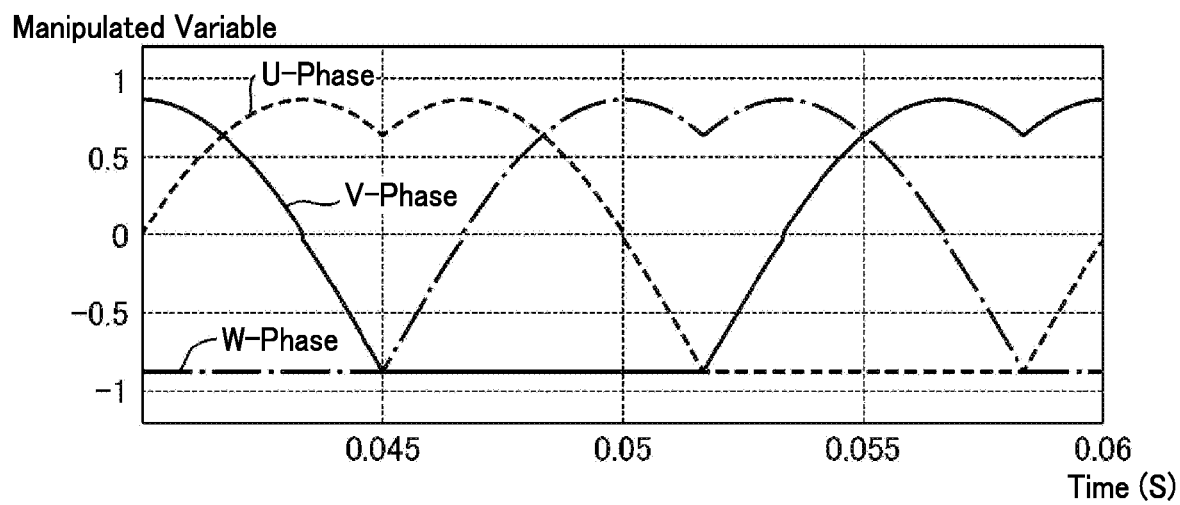
FIG. 10 is a graph showing a second exemplary manipulated variable for changing the duty of a drive signal in the power conversion system.
Figure 11:
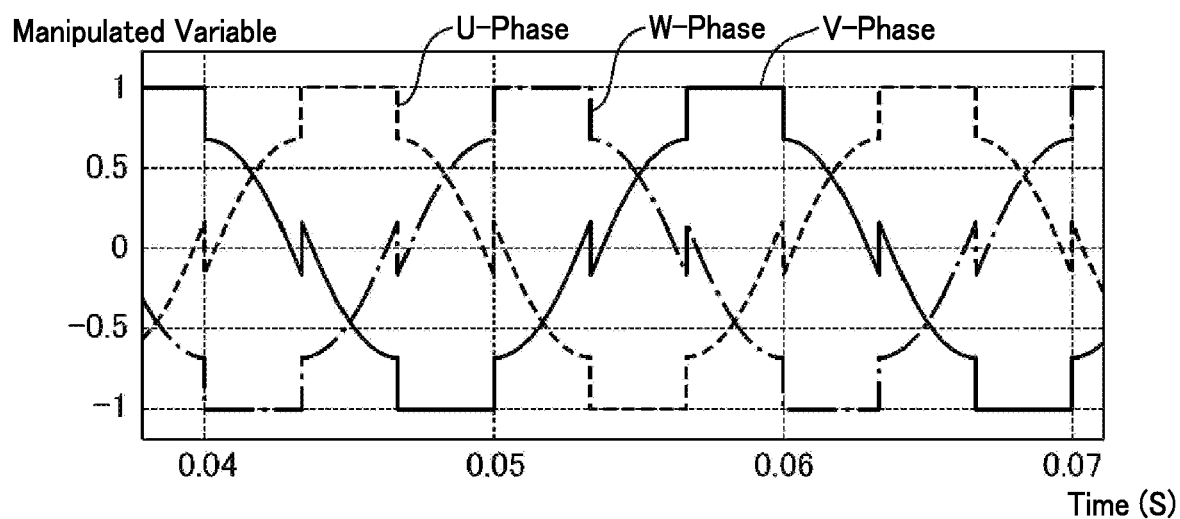
FIG. 11 is a graph showing a third exemplary manipulated variable for changing the duty of a drive signal in the power conversion system.

FIG. 10 is a graph showing second exemplary manipulated variables for changing the duties of the drive signals. FIG. 11 is a graph showing third exemplary manipulated variables for changing the duties of the drive signals. In FIGS. 10 and 11, the ordinate and abscissa indicate the same as in the graph shown in FIG. 9. FIG. 10 shows manipulated variables for changing the duties of the drive signals when linear modulation is performed on the U-, V- and W-phases. When performing linear modulation on the U-, V-, and W-phases, the control unit 7 allows the manipulated variables for changing the duties of the drive signals for the switch units S5P, S5N, S6P, S6N, S7P, S7N, 58P, S8N, 59P, S9N, S10P, and S10N to vary as shown in FIG. 10.

FIG. 11 shows manipulated variables for changing the duties of the drive signals used when two-phase modulation is performed on the U-, V-, and W-phases. When performing two-phase modulation on the U-, V-, and W-phases, the control unit 7 allows the manipulated variables for changing the duties of the drive signals for the switch units S5P, S5N, S6P, S6N, S7P, S7N, S8P, S8N, S9P, S9N, S10P, and S10N to vary as shown in FIG. 11.

As already described with reference to FIG. 3, the control unit 7 controls the amplitude of at least one of the output voltage or output current of the connection unit 15 by shifting the timings to turn the switch units S5P, S5N, S6P, S6N, S7P, S7N, S8P, S8N, S9P, S9N, S10P, and S10N ON. This advantage will be described in comparison with a comparative example.

Figure 12:
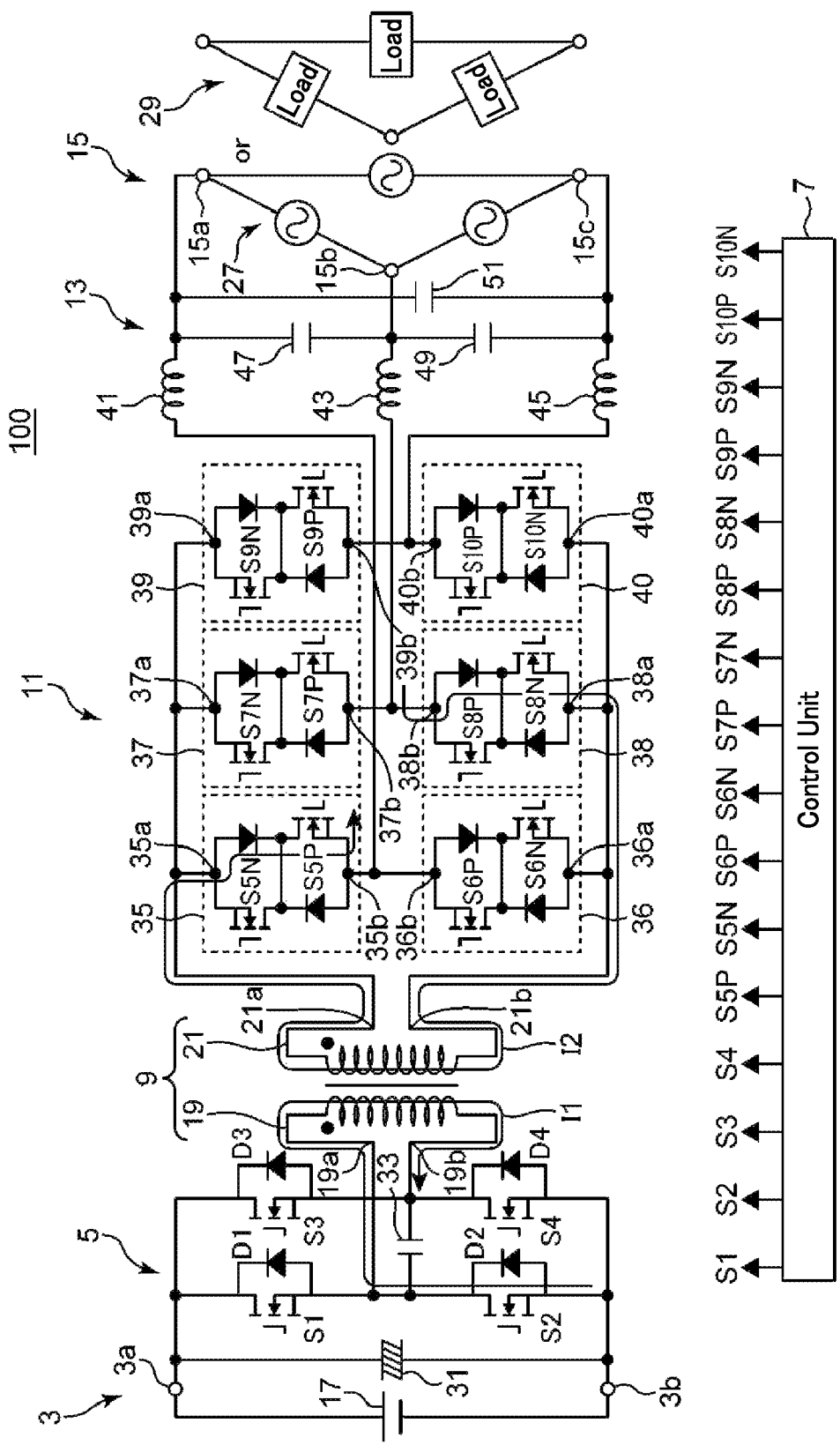
FIG. 12 illustrates a relationship between a circulating current and the circuit of a power converter as a comparative example for the power conversion system.
Figure 13:
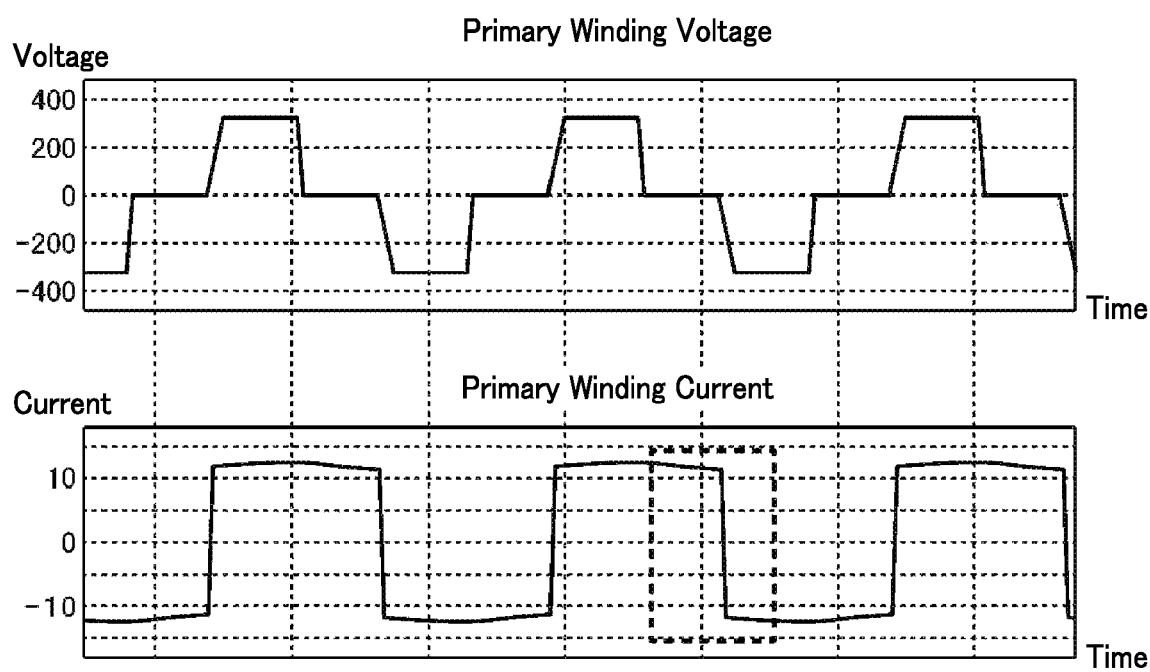
FIG. 13 is a graph showing the voltage and current of a primary winding of a transformer as a comparative example for the power conversion system.

FIG. 12 illustrates a relationship between the circuit and a circulating current in a power conversion system 100 representing a comparative example. The power conversion system 100 has the same circuit configuration as the power conversion system 1 according to the embodiment shown in FIG. 1. In this comparative example, the amplitude of at least one of the output voltage or output current of the connection unit 15 is controlled by shifting the timings to turn ON and OFF the switching elements S1-S4. FIG. 13 is a graph showing the voltage and current of the primary winding 19 of the transformer 9 in the comparative example. In the voltage graph, the ordinate indicates the voltage and the abscissa indicates the time. In the current graph, the ordinate indicates the current and the abscissa indicates the time.

The power supply mode (inverter mode) of the power conversion systems 1 and 100 has a supply period and a circulation period. The supply period is a period in which power is supplied from the DC power supply 17 to the AC power grid 27 or the load 29. The circulation period is a period in which a current is allowed to circulate without this power supply.

In the comparative example, the timings to turn the switching elements S1-S4 ON and OFF are shifted, and therefore, a current always flows through the primary winding 19. In other words, there are no periods in which the current flowing through the primary winding 19 becomes zero. Thus, a current I1 flowing through the primary winding 19 during the circulation period causes a current I2 to flow through the secondary winding 21. In the comparative example, the current flows through the transformer 9 during the circulation period, thus causing some loss.

Figure 14:
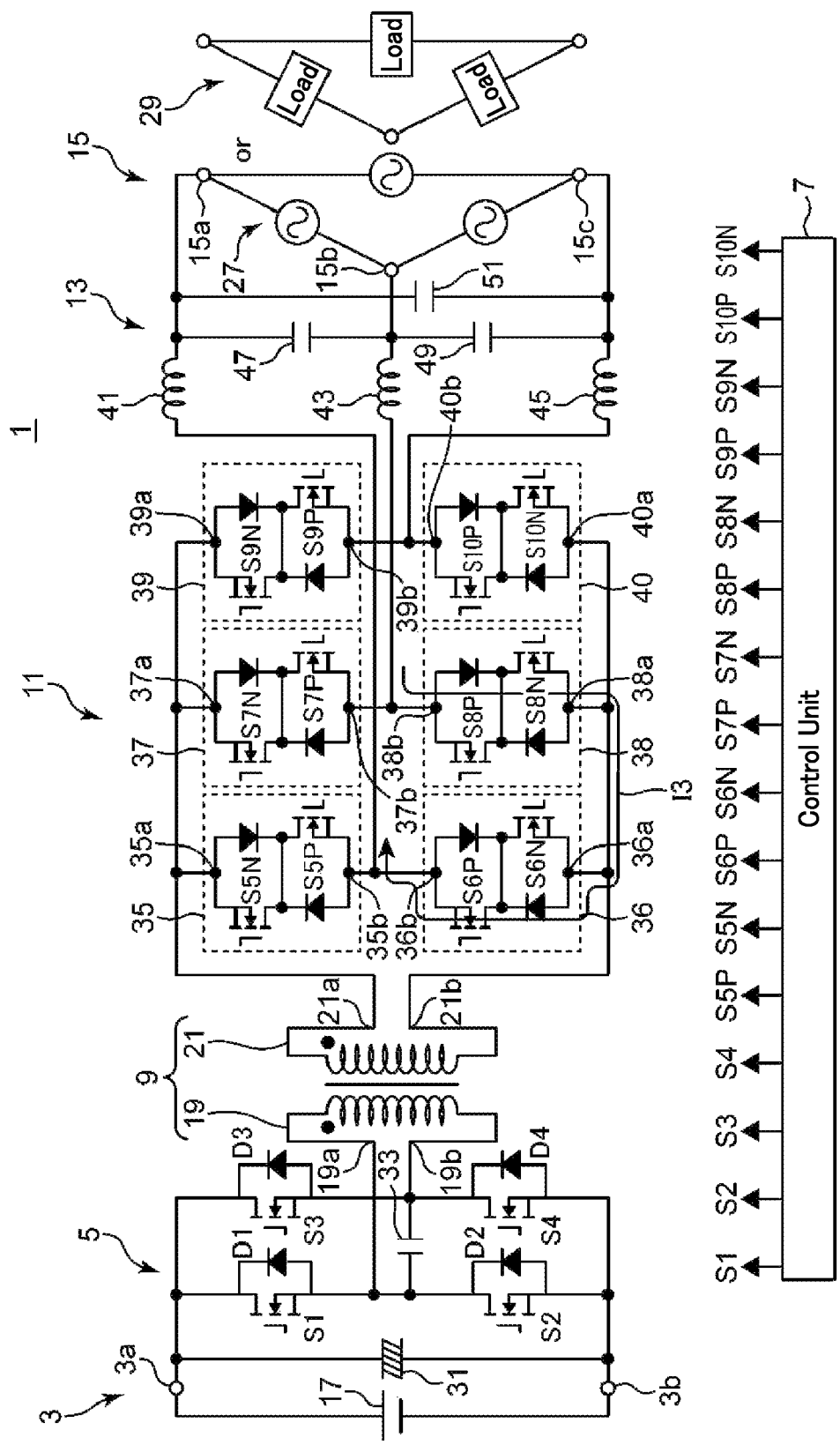
FIG. 14 illustrates a relationship between a circulating current and the circuit of the power conversion system.
Figure 15:
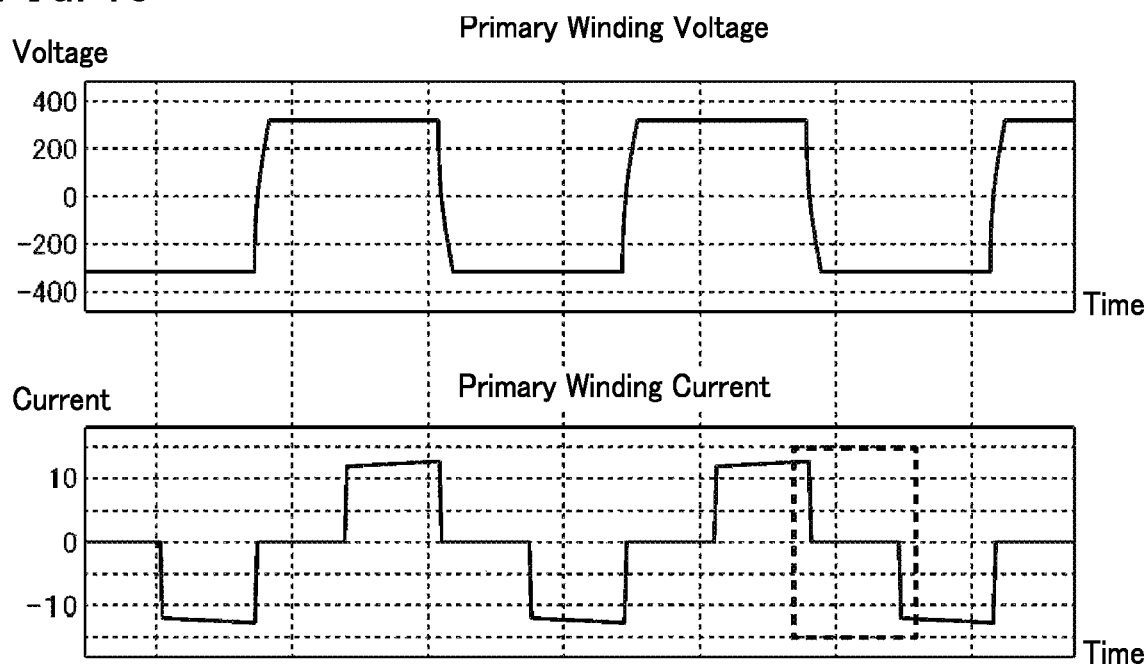
FIG. 15 is a graph showing the voltage and current of a primary winding of a transformer of the power conversion system.

FIG. 14 illustrates a relationship between the circuit and a circulating current of the power conversion system 1 according to this embodiment. In FIG. 14, a current I3 is additionally illustrated in the circuit shown in FIG. 1. FIG. 15 is a graph showing the voltage and current of the primary winding of the transformer according to this embodiment. In the voltage graph, the ordinate indicates the voltage and the abscissa indicates the time. In the current graph, the ordinate indicates the current and the abscissa indicates the time.

In this embodiment, the timings to turn the switching elements S1-S4 ON and OFF are not shifted, and therefore, are always constant. The control unit 7 controls the amplitude of at least one of the output voltage or output current of the connection unit 15 by controlling the cycloconverter 11 with the timings to turn the switching elements S1-S4 ON and OFF always kept constant. This allows a period in which no currents flow through the primary winding 19 to be provided during the circulation period. That is to say, there is a period in which no current flows through the primary winding 19. In that period, no current flows through the primary winding 19, and therefore, no current flows through the secondary winding 21, either. This eliminates the loss caused by the transformer 9.

Figure 16:
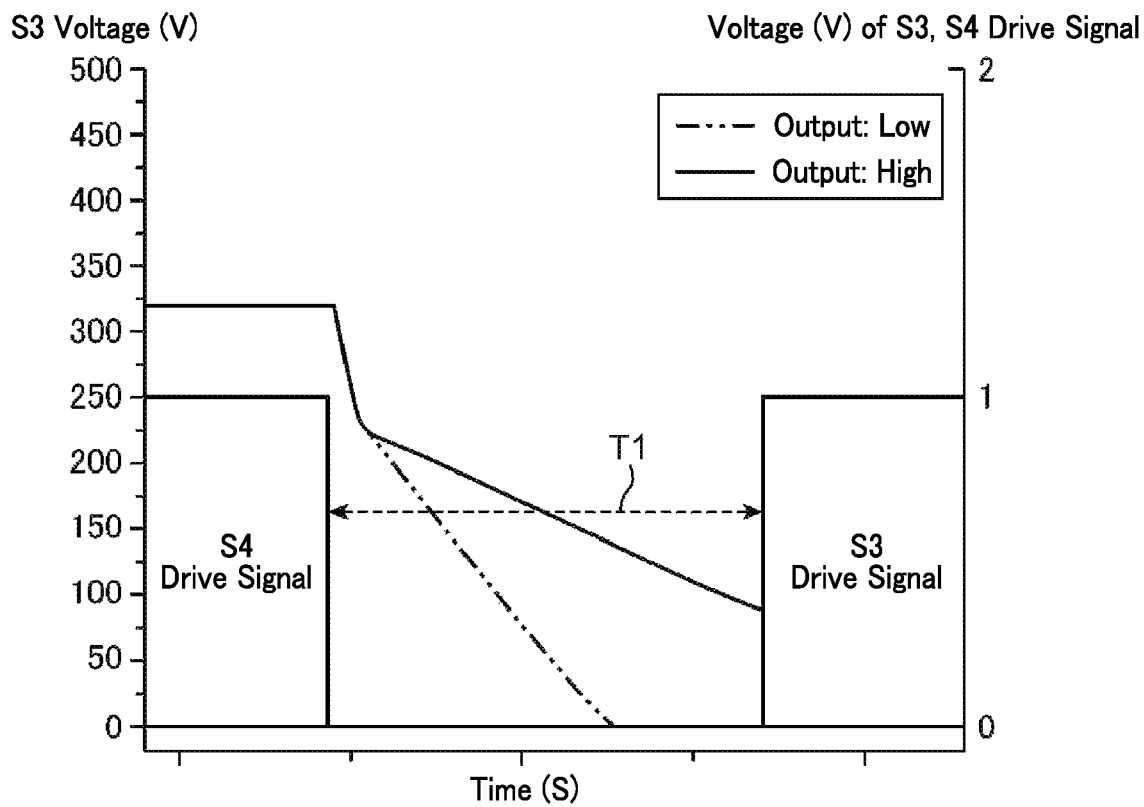
FIG. 16 is a graph showing relationships between a drive signal for switching elements S3, S4 and two different voltages in the comparative example of the power conversion system.
Figure 17:
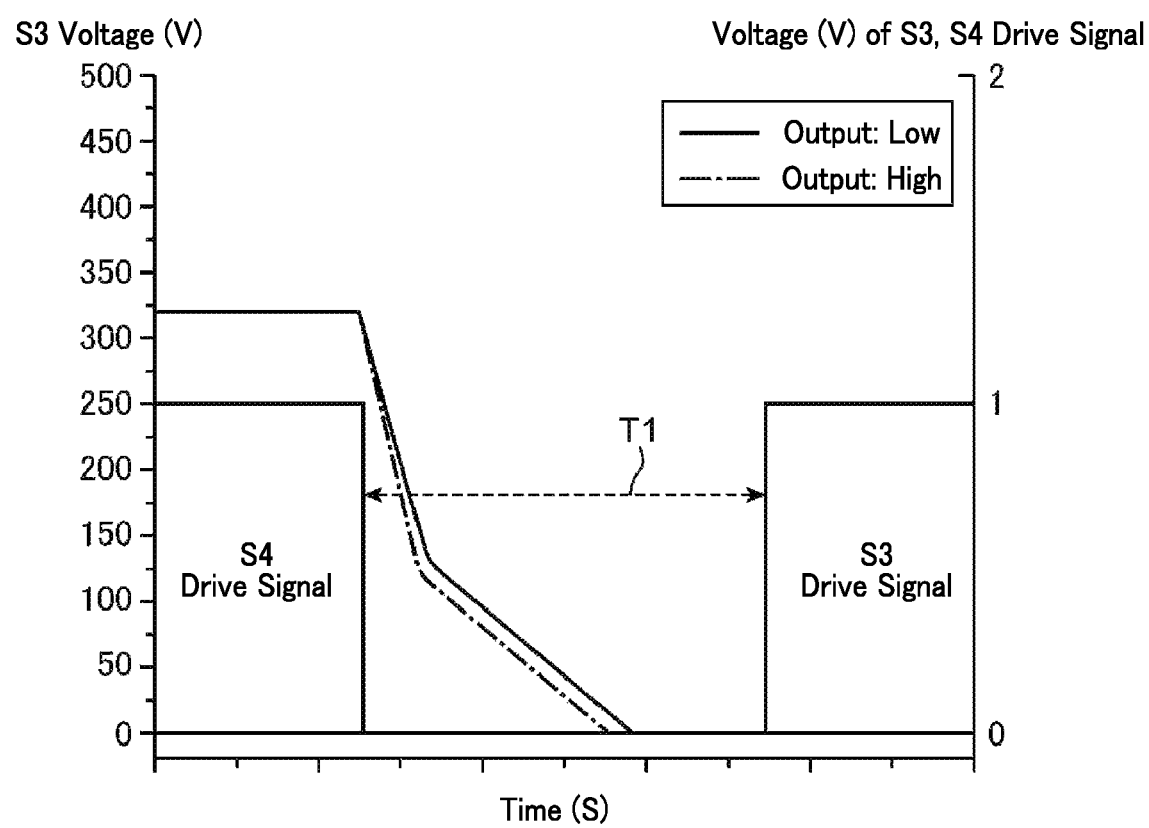
FIG. 17 is a graph showing relationships between a drive signal for switching elements S3, S4 and two different voltages in the power conversion system.

In the comparative example, an increase in the amount of a current flowing through the load 29 prevents the switching elements S1-S4 from making soft switching. In contrast, this embodiment allows the switching elements S1-S4 to make soft switching, irrespective of the amount of the current flowing through the load 29. This will be described in further detail. FIG. 16 is a graph showing a relationship between drive signals for the switching elements S3 and S4 and two different voltages according to the comparative example. FIG. 17 is a graph showing a relationship between drive signals for the switching elements S3 and S4 and two different voltages according to this embodiment. In the graphs, the abscissa indicates the time, the ordinate on the left indicates an S3 voltage, and the ordinate on the right indicates the voltage of drive signals for the switching elements S3 and S4. As used herein, the "S3 voltage" refers to a source-drain voltage of the switching element S3.

As shown in FIGS. 16 and 17, when the S3 voltage goes zero during the dead time period T1, the switching element S3 is allowed to make soft switching. In the comparative example, an increase in the current (output) of the load 29 prevents the S3 voltage from going zero during the dead time period T1 as shown in FIG. 16. The reason is that the current I1 is flowing through the primary winding 19 of the transformer 9 during the circulation period and an increase in the current (output) of the load 29 leads to an increase in the amount of the current I1 flowing, thus preventing the S3 voltage from going zero. That is why according to the comparative example, an increase in the current (output) of the load 29 keeps the switching element S3 from making soft switching.

As shown in FIGS. 14 and 17, according to this embodiment, the S3 voltage varies in almost the same way, regardless of the amount of the current (output) of the load 29, and goes zero during the dead time period T1. The reason is that no current flows through the primary winding 19 of the transformer 9 during the circulation period. Thus, this embodiment allows the switching element S3 to make soft switching, irrespective of the amount of the current (output) of the load 29. This example has been described about the switching element S3 by way of illustrative example. The same statement applies to the other switching elements S1, S2, and S4 as well.

Next, it will be described how the control unit 7 performs control of making the ON periods of switch units partially overlapping with each other. As shown in FIG. 4, the ON period of the switch unit S5P partially overlaps with the ON period of the switch unit S6P (from Time t4 through Time t5). In addition, the ON period of the switch unit S5N partially overlaps with the ON period of the switch unit S6N (from Time t2 through Time t3). This is a countermeasure against a return current generated on the secondary side of the power conversion system 1.

Figure 18:
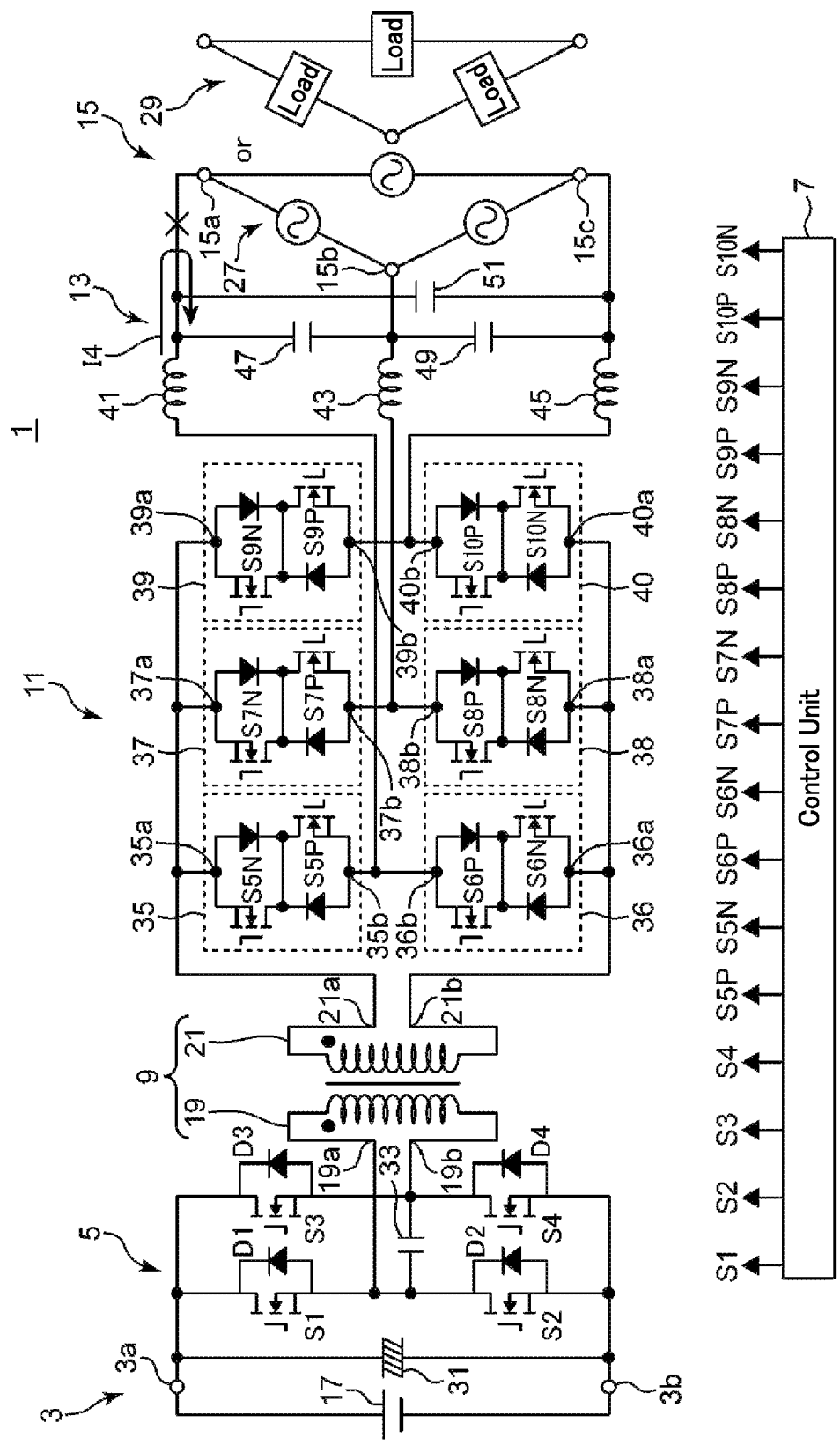
FIG. 18 illustrates a relationship between a return current and the circuit of the power conversion system.

FIG. 18 illustrates a relationship between the circuit and a return current of the power conversion system 1 according to this embodiment. Suppose, for example, a disconnection or any other error has occurred before the first terminal 15a of the connection unit 15. In that case, the current I4 that has flowed through the coil 41 is unable to reach the first terminal 15a and has to return. This is a so-called "return current." In such a situation, failure to secure a flowing path for the current I4 (return current) causes the current to flow into the capacitors 47, 49, and 51. This could make the voltages of the capacitors 47, 49, and 51 excessively high.

Thus, to secure a path, the control unit 7 performs the following control. As shown in FIG. 4, when a predetermined period passes since the switch unit S5P of the bidirectional switch unit 35 has been turned from OFF to ON in a period during which the transformer voltage V1 is positive (positive polarity period), the control unit 7 turns the switch unit S6P of the bidirectional switch unit 36 from ON to OFF. Also, when a predetermined period passes since the switch unit S5N of the bidirectional switch unit 35 has been turned from OFF to ON in the period during which the transformer voltage V1 is positive, the control unit 7 turns the switch unit S6N of the bidirectional switch unit 36 from ON to OFF.

Furthermore, when a predetermined period passes since the switch unit S6P of the bidirectional switch unit 36 has been turned from OFF to ON in a period during which the transformer voltage V1 is negative (negative polarity period), the control unit 7 turns the switch unit S5P of the bidirectional switch unit 35 from ON to OFF. Also, when a predetermined period passes since the switch unit S6N of the bidirectional switch unit 36 has been turned from OFF to ON in the period during which the transformer voltage V1 is negative, the control unit 7 turns the switch unit S5N of the bidirectional switch unit 35 from ON to OFF.

In this manner, the control unit 7 performs the control of making the respective ON periods of the switch units S5P and S6P partially overlapping with each other, thus preventing these switch units from being OFF in the same period. In the same way, the control unit 7 performs the control of making the respective ON periods of the switch units S5N and S6N partially overlapping with each other, thus preventing these switch units from being OFF in the same period. This always secures a path leading toward the secondary winding 21 of the transformer 9 on the secondary side of the power conversion system 1. Thus, even if a return current has been generated on the secondary side of the power conversion system 1, a path is secured for the return current to flow through.

Note that if the control unit 7 could perform the control of turning the switch unit S5P ON and turning the switch unit S6P OFF in synch with each other, the control of turning the switch unit S5P OFF and turning the switch unit S6P ON in synch with each other, the control of turning the switch unit S5N ON and turning the switch unit S6N OFF in synch with each other, and the control of turning the switch unit S5N OFF and turning the switch unit S6N ON in synch with each other, then a path leading from the coil 41 to the secondary winding 21 of the transformer 9 could always be secured. However, such control is too difficult for the control unit 7 to perform, and therefore, the control unit 7 actually performs the control of making the ON periods partially overlapping with each other.

For the same reason, as shown in FIG. 3, the respective ON periods of the switch units S7P and S8P partially overlap with each other. The respective ON periods of the switch units S7N and S8N partially overlap with each other. The respective ON periods of the switch units S9P and S10P partially overlap with each other. The respective ON periods of the switch units S9N and S10N partially overlap with each other.

Next, it will be described how the control unit 7 performs the control of not allowing respective ON periods of switch units to overlap with each other. As shown in FIG. 4, in a period during which the transformer voltage V1 is positive (corresponding to the ON period of the switching elements S1 and S4), the respective ON periods of the switch units S5P and S6N do not overlap with each other. In other words, there are no periods in which the switch units S5P and S6N are ON at the same time. In a period during which the transformer voltage V1 is negative (corresponding to the ON period of the switching elements S2 and S3), the respective ON periods of the switch units S5N and S6P do not overlap with each other. In other words, there are no periods in which the switch units S5N and S6P are ON at the same time. The reason is that the current to flow from the secondary winding 21 toward the connection unit 15 needs to be prevented to flow from the first terminal 21a of the secondary winding 21 toward the second terminal 21b of the secondary winding 21 via the bidirectional switch units 35 and 36 or to flow from the second terminal 21b of the secondary winding 21 toward the first terminal 21a of the secondary winding 21 via the bidirectional switch units 36 and 35. This will be described with the combination of the switch units S5P and S6N taken as an example.

Figure 19:
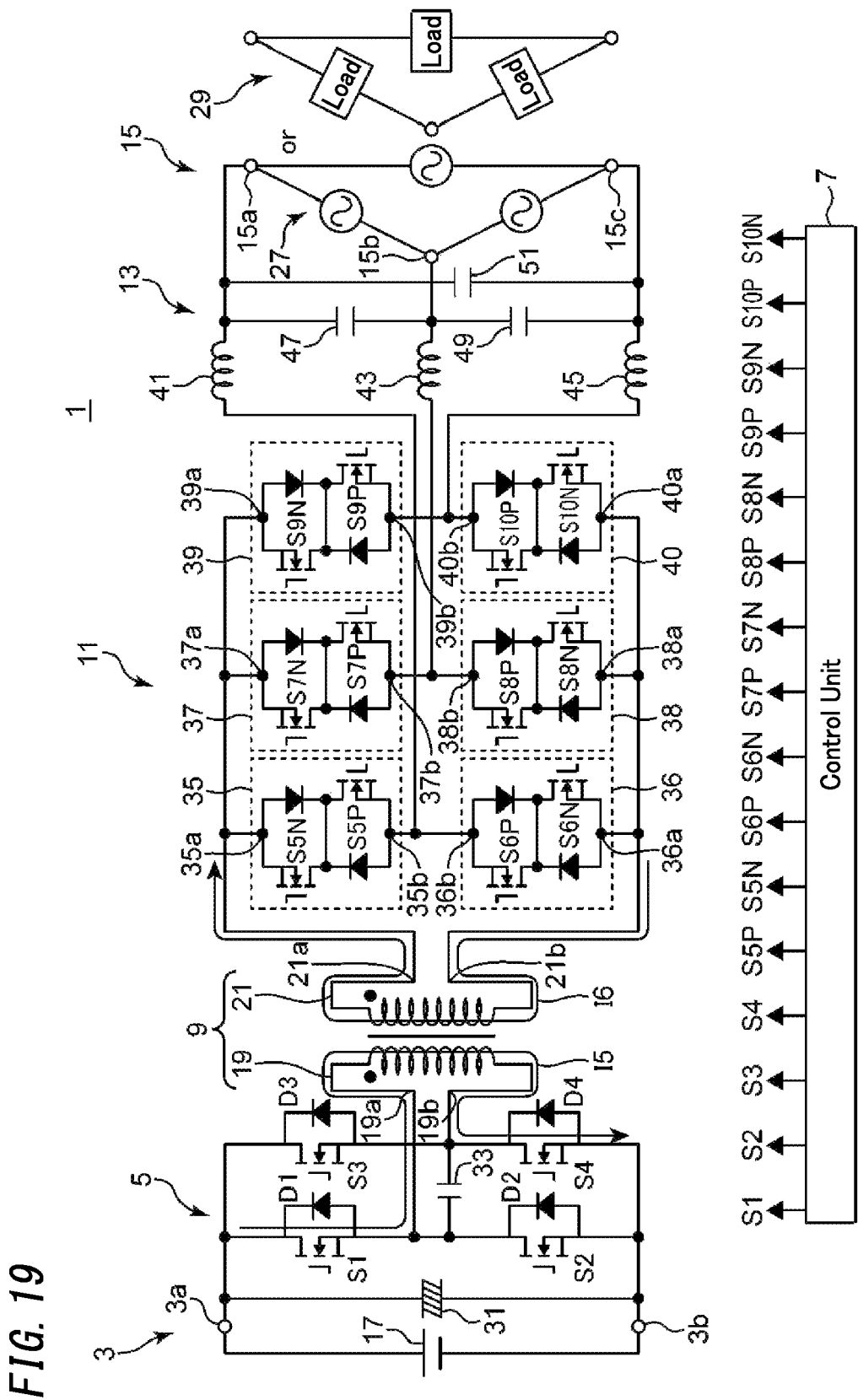

FIG. 19 illustrates a relationship between the circuit and currents I5 and I6 near the transformer 9 in the power conversion system 1 according to the first embodiment in a period in which the switching elements S1 and S4 are ON. In the ON period of the switching elements S1 and S4, the current I5 flows through the primary winding 19, thus allowing the current I6 to flow through the secondary winding 21. If the respective ON periods of the switch units S5P and S6N overlapped with each other, then the current that should flow from the secondary winding 21 toward the connection unit 15 would flow from the first terminal 21a of the secondary winding 21 toward the second terminal 21b of the secondary winding 21 via the bidirectional switch units 35 and 36.

Thus, the control unit 7 performs control to avoid such an overlap. As shown in FIG. 4, in a period during which the transformer voltage V1 is positive, the control unit 7 turns the switch unit S5P from OFF to ON when a predetermined period passes since the switch unit S6N has been turned from ON to OFF.

For the same reason, in a period during which the transformer voltage V1 is positive (corresponding to the ON period of the switching elements S1 and S4), the respective ON periods of the switch units S7P and S8N do not overlap with each other as shown in FIG. 3. In other words, there are no periods in which the switch units S7P and S8N are ON at the same time. In addition, in the period during which the transformer voltage V1 is positive, the respective ON periods of the switch units S9P and S10N do not overlap with each other. In other words, there are no periods in which the switch units S9P and S10N are ON at the same time. On the other hand, in a period during which the transformer voltage V1 is negative (corresponding to the ON period of the switching elements S2 and S3), the respective ON periods of the switch units S7N and S8P do not overlap with each other. In other words, there are no periods in which the switch units S7N and S8P are ON at the same time. In addition, in the period during which the transformer voltage V1 is negative, the respective ON periods of the switch units S9N and S10P do not overlap with each other. In other words, there are no periods in which the switch units S9N and S10P are ON at the same time.

Next, a path through which a current circulates on the secondary side during the dead time period T1 will be described. As already described with reference to FIG. 14, according to this embodiment, the current I3 is allowed to circulate without flowing through the secondary winding 21 of the transformer 9. This is realized by the following control.

As shown in FIG. 3, in the interval between a point in time when the switching elements S1 and S4 turn OFF and a point in time when the switching elements S2 and S3 turn ON (i.e., during the dead time period T1), the control unit 7 performs the control of turning the switch units S5P, S5N, S7P, S7N, 59P, and S9N ON and turning the switch units S6P, S6N, 58P, S8N, S10P, and S10N OFF.

In the interval between a point in time when the switching elements S2 and S3 turn OFF and a point in time when the switching elements S1 and S4 turn ON (i.e., during the dead time period T1), the control unit 7 performs the control of turning the switch units S6P, S6N, 58P, S8N, S10P, and S10N ON and turning the switch units S5P, S5N, S7P, S7N, 59P, and S9N OFF.

In this case, the control unit 7 controls the inverter circuit 5 to invert the polarity of the voltage of the primary winding 19 during the dead time period T1. That is to say, the circulation period including the dead time period T1 corresponds to a first period including an inversion period in which the polarity of the voltage of the primary winding 19 inverts, and the supply period corresponds to a second period. Then, the control unit 7 controls the cycloconverter 11 to allow no power to be transmitted between the inverter circuit 5 and the cycloconverter 11 in the circulation period (first period). The control unit 7 also controls the cycloconverter 11 to allow power to be transmitted in either a first direction from the inverter circuit 5 toward the cycloconverter 11, or a second direction opposite from the first direction, in the supply period (second period).

Allowing a current on the secondary side to flow through the secondary winding 21 of the transformer 9 during the dead time period T1 (i.e., in a situation where no current is flowing through the primary winding 19) would cause an increase in current loss. This embodiment allows no current to flow, during the dead time period T1, through the secondary winding 21 while allowing the current to circulate on the secondary side. Thus, the power conversion system 1 according to the first embodiment improves the power conversion efficiency while cutting down the power loss caused by switching.

The converter circuit (cycloconverter 11) of the first embodiment is configured to convert power from DC power into three-phase AC power, or vice versa. However, this is only an example and should not be construed as limiting. Alternatively, the converter circuit of the first embodiment may also be configured to convert power from DC power into single-phase AC power, or vice versa. Still alternatively, the converter circuit (cycloconverter 11) of the first embodi-

(3) Second Embodiment

Turning all of the bidirectional switch units OFF when the cycloconverter is deactivated (i.e., when its output is stopped) could apply excessive stress to the bidirectional switch units due to loss of current flowing paths. A power conversion system according to a second embodiment is configured to reduce the stress applied to the bidirectional switch units when the output is stopped.

(3.1) Overview

A power conversion system 1A according to a second embodiment will be described with reference to FIG. 20.

A power conversion system 1A includes a first set of connection terminals T11 and T12 and a second set of connection terminals T21, T22, and T23. The power conversion system 1A further includes an inverter circuit 110, a primary winding 121, a secondary winding 122, a converter circuit 130, reactors (AC reactors) L11-L13, and a control circuit 140. A DC power supply 200 such as a storage battery is connected as a first connection target to the first set of connection terminals T11 and T12. An AC power grid 300 is connected as a second connection target to the second set of connection terminals T21, T22, and T23. The inverter circuit 110 is connected between the first set of connection terminals T11 and T12 and the primary winding 121 to perform power conversion. The converter circuit 130 includes a plurality of bidirectional switch units Q5-Q10, which are bridge-connected between both terminals of the secondary winding 122. The reactors L11-L13 are connected between the converter circuit 130 and the second set of connection terminals T21, T22, and T23, respectively. The control circuit 140 controls the converter circuit 130 such that when the second set of connection terminals T21-T23 are open, energy stored in the reactors L11-L13 is regenerated on the primary winding 121 side.

As can be seen, having the energy stored in the reactors L11-L13 regenerated on the primary winding 21 side through a regeneration path allows the stress applied to the bidirectional switch units Q5-Q10 included in the converter circuit 130 to be reduced. As used herein, the "regeneration path" refers to a current path through which the energy stored in the reactors L11-L13 is regenerated on the primary winding 21 side. Also, the phrase "regenerated on the primary winding 21 side" means regenerating the energy in a primary-side circuit electrically connected to the primary winding 121. In the circuit shown in FIG. 20, it means regenerating the energy on either the DC power supply 200 or the capacitor C1.

Figure 20:
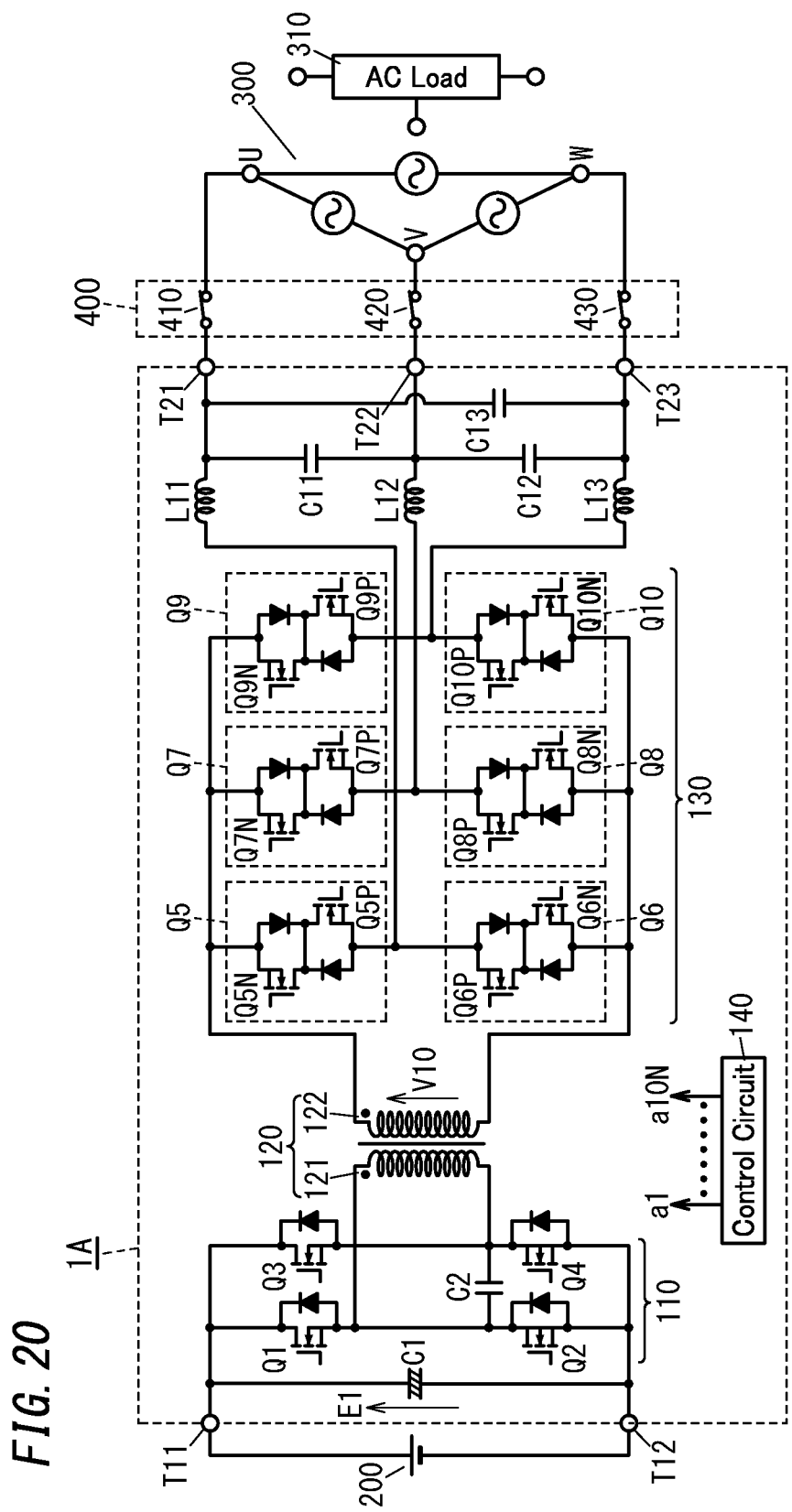
FIG. 20 is a circuit diagram of a power conversion system according to a second embodiment of the present disclosure.

The power conversion system 1A may be used, for example, to convert power between the DC power supply 200 as a first connection target and the AC power grid 300 as a second connection target as shown in FIG. 20. As used herein, the "power grid" refers to an overall system allowing an electric utility company such as a power company to supply electricity to consumers' power receiving facilities. The power conversion system 1A converts, when a storage battery as the DC power supply 200 is being discharged, the DC power supplied from the DC power supply 200 into AC power and output the AC power to the AC power grid 300. The power conversion system 1A converts, when a storage battery as the DC power supply 200 is being charged, the AC power supplied from the AC power grid 300 into DC power and supply the DC power to the DC power supply 200.

To deal with charging and discharging a storage battery as the DC power supply 200, the power conversion system 1A according to this embodiment is configured to convert power bidirectionally between the first set of connection terminals T11 and T12 and the second set of connection terminals T21, T22, and T23. This allows the power conversion system 1A to connect the DC power supply 200 to the AC power grid 300 so as to charge the DC power supply 200 with the power supplied from the AC power grid 300 and supply the discharge power from the DC power supply 200 to a load connected to the AC power grid 300. In this embodiment, such a power conversion system 1A is supposed to be introduced into, for example, a non-dwelling house such as an office building, a hospital, or a school.

(3.2) Circuit Configuration

The configuration of the power conversion system 1A according to this embodiment will be described with reference to FIG. 20.

As described above, the power conversion system 1A includes a first set of connection terminals T11 and T12, to which a DC power supply 200 implemented as a storage battery is connected, and a second set of connection terminals T21, T22, and T23, to which an AC power grid 300 is connected. The power conversion system 1A further includes an inverter circuit 110, a transformer 120 with a primary winding (first winding) 121 and a secondary winding (second winding) 122, a converter circuit 130, reactors L11-L13, a control circuit 140, and capacitors C1 and C11-C13.

In the example illustrated in FIG. 20, the DC power supply 200 is connected between the first set of connection terminals T11 and T12 such that the connection terminal T11 of the first set has the higher potential (i.e., serves as a positive electrode). On the other hand, the AC power grid 300 implemented as a three-phase AC power supply is connected to the second set of connection terminals T21, T22, and T23. The power conversion system 1A performs power conversion bidirectionally between the first set of connection terminals T11 and T12 and the second set of connection terminals T21, T22, and T23. Specifically, the power conversion system 1A needs to perform at least one of the operation of converting the DC power input through the first set of connection terminals T11 and T12 into three-phase AC power and outputting the three-phase AC power through the second set of connection terminals T21, T22, and T23 or the operation of converting the three-phase AC power input through the second set of connection terminals T21, T22, and T23 into DC power and outputting the DC power through the first set of connection terminals T11 and T12.

The capacitor C1 is implemented as an electrolytic capacitor, for example, and electrically connected between the first set of connection terminals T11 and T12. The capacitor C1 has the capability of stabilizing the voltage between the first set of connection terminals T11 and T12. In the following description, the voltage between both terminals of the capacitor C1 will be designated by "+E1."

The inverter circuit 110 is electrically connected between the first set of connection terminals T11 and T12 and the primary winding 121 of the transformer 120. The inverter circuit 110 includes four switching elements Q1-Q4 and a capacitor C2. The inverter circuit 110 has the capability of converting the DC power input through the first set of connection terminals T11 and T12 into AC power and outputting the AC power to the primary winding 121 and the capability of converting the AC power input from the primary winding 121 into DC power and outputting the DC power to the first set of connection terminals T11 and T12.

In this embodiment, the four switching elements Q1-Q4 may each be implemented as a depletion n-channel MOS field-effect transistor, for example. The four switching elements Q1-Q4 are full-bridge connected between the first set of connection terminals T11 and T12, i.e., between both terminals of the capacitor C1. The switching element Q1 is connected to the switching element Q2 electrically in series between both terminals of the capacitor C1. The switching element Q3 is connected to the switching element Q4 electrically in series between both terminals of the capacitor C1. Specifically, the drain of the switching element Q1 and the drain of the switching element Q3 are both electrically connected to the connection terminal T11 having the higher potential, out of the first set of connection terminals T11 and T12. The source of the switching element Q2 and the source of the switching element Q4 are both electrically connected to the first connection terminal T12 having the lower potential, out of the first connection terminals T11 and T12.

The transformer 120 is implemented as an RF insulating transformer with the primary winding 121 and secondary winding 122 that are magnetically coupled together. The primary winding 121 is electrically connected between a connection node where the source of the switching element Q1 and the drain of the switching element Q2 are connected together and a connection node where the source of the switching element Q3 and the drain of the switching element Q4 are connected together. In addition, another capacitor C2 is electrically connected between both terminals of the primary winding 121.

The converter circuit 130 may be implemented as a cycloconverter, for example. The converter circuit 130 is electrically connected between the secondary winding 122 of the transformer 120 and the second set of connection terminals T21, T22, and T23. The converter circuit 130 includes a plurality of bidirectional switch units Q5-Q10 which are bridge-connected between both terminals of the secondary winding 122. The converter circuit 130 constitutes a DC/AC converter for converting a DC voltage into an AC voltage, and vice versa, between both terminals of the secondary winding 122 and the second set of connection terminals T21, T22, and T23.

In this embodiment, each of the bidirectional switch units Q5-Q10 is made up of two depletion n-channel MOSFETs, of which the respective drains are connected together, and is configured to selectively pass or cut off a current bidirectionally. For example, the bidirectional switch unit Q5 may be implemented as a pair of switching elements Q5N and Q5P, which are connected in series such that their drains are connected together. Likewise, the bidirectional switch unit Q6 may be implemented as a pair of switching elements Q6N and Q6P, which are connected in series such that their drains are connected together. The bidirectional switch unit Q7 may be implemented as a pair of switching elements Q7N and Q7P, which are connected in series such that their drains are connected together. The bidirectional switch unit Q8 may be implemented as a pair of switching elements Q8N and Q8P, which are connected in series such that their drains are connected together. The bidirectional switch unit Q9 may be implemented as a pair of switching elements Q9N and Q9P, which are connected in series such that their drains are connected together. The bidirectional switch unit Q10 may be implemented as a pair of switching elements Q10N and Q10P, which are connected in series such that their drains are connected together.

Also, in this embodiment, the pair of switching elements Q5N and Q5P and the pair of switching elements Q6N and Q6P are electrically connected together in series between both terminals of the secondary winding 122. In the same way, the pair of switching elements Q7N and Q7P and the pair of switching elements Q8N and Q8P are electrically connected together in series between both terminals of the secondary winding 122. Furthermore, the pair of switching elements Q9N and Q9P and the pair of switching elements Q10N and Q10P are electrically connected together in series between both terminals of the secondary winding 122. In this configuration, the respective sources of the switching elements Q5N, Q7N, and Q9N are electrically connected to one terminal of the secondary winding 122, and the respective sources of the switching elements Q6N, Q8N, and Q10N are electrically connected to the other terminal of the secondary winding 122.

The reactor L11 is connected between a connection node where the bidirectional switch units Q5 and Q6 are connected together and the connection terminal T21 of the second set. The reactor L12 is connected between a connection node where the bidirectional switch units Q7 and Q8 are connected together and the connection terminal T22 of the second set. The reactor L13 is connected between a connection node where the bidirectional switch units Q9 and Q10 are connected together and the connection terminal T23 of the second set. Supposing the flowing direction of a current flowing from the converter circuit 130 toward the AC power grid 200 is a positive direction, a positive current is allowed to flow when the switching elements Q5P-Q10P are ON and a negative current is allowed to flow when the switching elements Q5N-Q10N are ON.

In addition, a capacitor C11 is connected between the connection terminals T21 and T22 of the second set. A capacitor C12 is connected between the connection terminals T22 and T23 of the second set. A capacitor C13 is connected between the connection terminals T23 and T21 of the second set. In this configuration, the reactors L11-L13 and the capacitors C11-C13 together form a filter circuit for converting the output of the converter circuit 130 into a three-phase AC voltage.

The connection terminals T21, T22, and T23 of the second set may be connected to the AC power grid 300 of a three-phase AC type (including a U-phase, a V-phase, and a W-phase), for example. In this configuration, contacts 410, 420, and 430 of a parallel-off relay 400 are respectively connected between the connection terminals T21, T22, and T23 of the second set and the AC power grid 300 of the three-phase AC type.

The control circuit 140 applies control signals a1-a10N for the controlling the switching elements Q1-Q4, Q5P-Q10P, and Q5N-Q10N to the respective gates of the switching elements Q1-Q4, Q5P-Q10P, and Q5N-Q10N either directly or via a driver circuit. This allows the control circuit 140 to turn ON and OFF the switching elements Q1-Q4, Q5P-Q10P, and Q5N-Q10N. The control circuit 140 of this embodiment controls the switching elements Q1-Q4 of the inverter circuit 110 and the switching elements Q5P-Q10P and Q5N-Q10N of the converter circuit 130 by pulse width modulation (PWM) method that makes the duty ratio adjustable.

The control circuit 140 also outputs a control signal for controlling the parallel-off relay 400 to the parallel-off relay 400 via the driver circuit, thus controlling the ON/OFF states of the parallel-off relay 400. The control circuit 140 may be implemented as a microcomputer including a central processing unit (CPU), a field-programmable gate array (FPGA), or an application specific integrated circuit (ASIC), for example.

(3.3) Operation The power conversion system 1A according to this embodiment is configured to perform power conversion bidirectionally between the first set of connection terminals T11 and T12 and the second set of connection terminals T21, T22, and T23. For this purpose, the power conversion system 1A has two operation modes, namely, an "inverter mode" and a "converter mode."

The inverter mode is an operation mode for converting the DC power input through the first set of connection terminals T11 and T12 into AC power and outputting the AC power through the second set of connection terminals T21, T22, and T23. The converter mode is an operation mode for converting the AC power input through the second set of connection terminals T21, T22, and T23 into DC power and outputting the DC power through the first set of connection terminals T11 and T12. That is to say, in the converter mode, the power conversion system 1A supplies the power provided by the AC power grid 300 to the DC power supply 200.

Next, it will be described with reference to FIG. 20 how the power conversion system 1A performs the power conversion operation.

The control circuit 140 controls the switching elements Q1-Q4 of the inverter circuit 110 such that the combination of the switching elements Q1 and Q4 and the combination of the switching elements Q2 and Q3 turn ON alternately. In this embodiment, a drive frequency to turn the switching elements Q1-Q4 ON and OFF may be 20 kHz, and the duty ratio of the switching elements Q1 and Q4 and the duty ratio of the switching elements Q2 and Q3 may each be 50%, for example. Thus, when the switching elements Q1 and Q4 are ON, the voltage between both terminals of the primary winding 121 of the transformer 120 becomes "+E1" and the voltage V10 between both terminals of the secondary winding 122 also becomes "+E1." On the other hand, when the switching elements Q2 and Q3 are ON, the voltage between both terminals of the primary winding 121 of the transformer 120 becomes "−E1" and the voltage V10 between both terminals of the secondary winding 122 also becomes "−E1." That is to say, the voltage V10 between both terminals of the secondary winding 122 alternates between "+E1" and "−E1." In other words, the control circuit 140 controls the inverter circuit 110 such that a positive voltage and a negative voltage are alternately applied to the primary winding 121.

In a period during which the voltage V10 between both terminals of the secondary winding 122 is fixed at either "+E1" or "−E1," the control circuit 140 performs PWM control on the bidirectional switch units Q5-Q10, thereby adjusting the period in which power is supplied from the secondary winding 122 and controlling the output voltage of the converter circuit 130. In this case, the bidirectional switch units Q5, Q7, and Q9 are controlled such that their ON/OFF states are inverse of those of the bidirectional switch units Q6, Q8, and Q10.

The control circuit 140 turning all of the bidirectional switch units Q6, Q8, and Q10 OFF or turning all of the bidirectional switch units Q5, Q7, and Q9 ON changes the operation mode into a circulation mode in which a current circulates through the converter circuit 130. Alternatively, the control circuit 140 turning all of the bidirectional switch units Q5, Q7, and Q9 OFF or turning all of the bidirectional switch units Q6, Q8, and Q10 ON changes the operation mode into a circulation mode in which a current circulates through the converter circuit 130. The control circuit 140 controls the inverter circuit 110 so as to invert the polarity sign of the voltage V10 between both terminals of the secondary winding 122 while making the converter circuit 130 operate in the circulation mode. This allows the polarity sign of the voltage V10 between both terminals to be inverted without being affected by the current flowing through the converter circuit 130. That is to say, the period in which the converter circuit 130 operates in the circulation mode becomes a first period including an inversion period.

On the other hand, the control circuit 140 turning ON one or two of the bidirectional switch units Q5, Q7, and Q9 in a period during which the voltage V10 between both terminals of the secondary winding 122 is fixed at either "+E1" or "−E1" changes the operation mode into a power transmission mode in which power is supplied from the inverter circuit 110 to the converter circuit 130. That is to say, the period in which the power conversion system 1A operates in the power transmission mode becomes a second period.

Next, it will be described specifically how the power conversion system 1A operates.

For example, the control circuit 140 may control the inverter circuit 110 such that the voltage V10 between both terminals of the secondary winding 122 inverts from "−E1" into "+E1" with the converter circuit 130 allowed to operate in the circulation mode by turning OFF all of the bidirectional switch units Q5, Q7, and Q9 and by turning ON all of the bidirectional switch units Q6, Q8, and Q10.

After the voltage V10 between both terminals of the secondary winding 122 has been fixed at "+E1," the control circuit 140 turns, for example, the bidirectional switch unit Q7 ON. This allows the converter circuit 130 to operate in the power transmission mode. Thereafter, the control circuit 140 turns the bidirectional switch units Q5 and Q9 ON in this order. As can be seen, turning the bidirectional switch units Q5, Q7, and Q9 in this order with the voltage V10 between both terminals of the secondary winding 122 fixed at "+E1" changes currents in respective phases of the three-phase AC drive.

The control circuit 140 turning all of the bidirectional switch units Q5, Q7, and Q9 ON allows the converter circuit 130 to operate in the circulation mode. The control circuit 140 controls the inverter circuit 110 such that the voltage V10 between both terminals of the secondary winding 122 inverts from "+E1" into "−E1" with the converter circuit 130 allowed to operate in the circulation mode.

When the voltage V10 between both terminals of the secondary winding 122 becomes "−E1," the control circuit 140 turns, for example, the bidirectional switch unit Q9 OFF. This allows the converter circuit 130 to operate in the power transmission mode. Thereafter, the control circuit 140 turns the bidirectional switch units Q5 and Q7 OFF in this order. As can be seen, turning the bidirectional switch units Q9, Q5, and Q79 OFF in this order with the voltage V10 between both terminals of the secondary winding 122 fixed at "−E1" changes currents in respective phases of the three-phase AC drive.

The control circuit 140 turning all of the bidirectional switch units Q9, Q5, and Q7 OFF allows the converter circuit 130 to operate in the circulation mode. The control circuit 140 controls the inverter circuit 110 such that the voltage V10 between both terminals of the secondary winding 122 inverts from "−E1" into "+E1" with the converter circuit 130 allowed to operate in the circulation mode.

The power conversion system 1A performs power conversion between the DC power supply 200 and the AC power grid 300 by repeatedly performing the operation described above. In this case, the power conversion system 1A controls the output voltage toward a desired value by changing the ratio of a period, in which the power conversion system 1A operates in the power transmission mode, to one cycle of the AC voltage waveform through PWM control of the bidirectional switch units Q5-Q10. In the power conversion system 1A, if the output voltage of the converter circuit 130 is greater than the voltage of the AC power grid 300, the output of the converter circuit 130 is supplied to the AC power grid 300. On the other hand, if the output voltage of the converter circuit 130 is less than the voltage of the AC power grid 300, then the power conversion system 1A converts the AC power supplied from the AC power grid 300 into DC power and outputs the DC power to the DC power supply 200 through the first set of connection terminals T11 and T12.

In the power conversion system 1A, if the bidirectional switch units Q5-Q10 were all OFF when the second set of connection terminals T21, T22, and T23 are opened by turning OFF the contacts 410-430 of the parallel-off relay 400, for example, then there would be no current paths for releasing the energy stored in the reactors L11, L12, and L13, and therefore, excessive stress could be applied to the bidirectional switch units Q5-Q10. Thus, in the power conversion system 1A of this embodiment, the control circuit 140 controls the converter circuit 130 so as to form a regeneration path for regenerating the energy stored in the reactors L11, L12, and L13 on the primary winding 121 side when the second set of connection terminals T21, T22, and T23 are opened. Next, it will be described with reference to FIGS. 21-25B how the power conversion system 1A operates when the second set of connection terminals T21, T22, and T23 are opened.

If the power conversion system 1A stops outputting power from the converter circuit 130 to the AC power grid 300 while performing the operation of converting the power between the DC power supply 200 and the AC power grid 300, then the control circuit 140 controls the parallel-off relay 400 to turn the contacts 410-430 OFF. When the second set of connection terminals T21-T23 are opened by turning the contacts 410-430 OFF, the control circuit 140 controls the converter circuit 130 so as to perform the regeneration operation of regenerating the energy stored in the reactors L11, L12, and L13 toward the primary winding 121 side.

The control circuit 140 controls the converter circuit 130 such that when the second set of connection terminals T21, T22, and T23 are opened, the energy stored in the reactor L11, L12, and L13 is regenerated on the primary winding 121 side. In this case, the control circuit 140 provides a regeneration operation period, lasting until the energy stored in the reactor L11, L12, and L13 finishes being regenerated on the primary winding 121 side, with regeneration periods intermittently. The control circuit 140 controls the converter circuit 130 such that the energy stored in the reactor L11, L12, and L13 is regenerated on the primary winding 121 side during each of the regeneration periods provided intermittently for the regeneration operation period.

Figure 21:
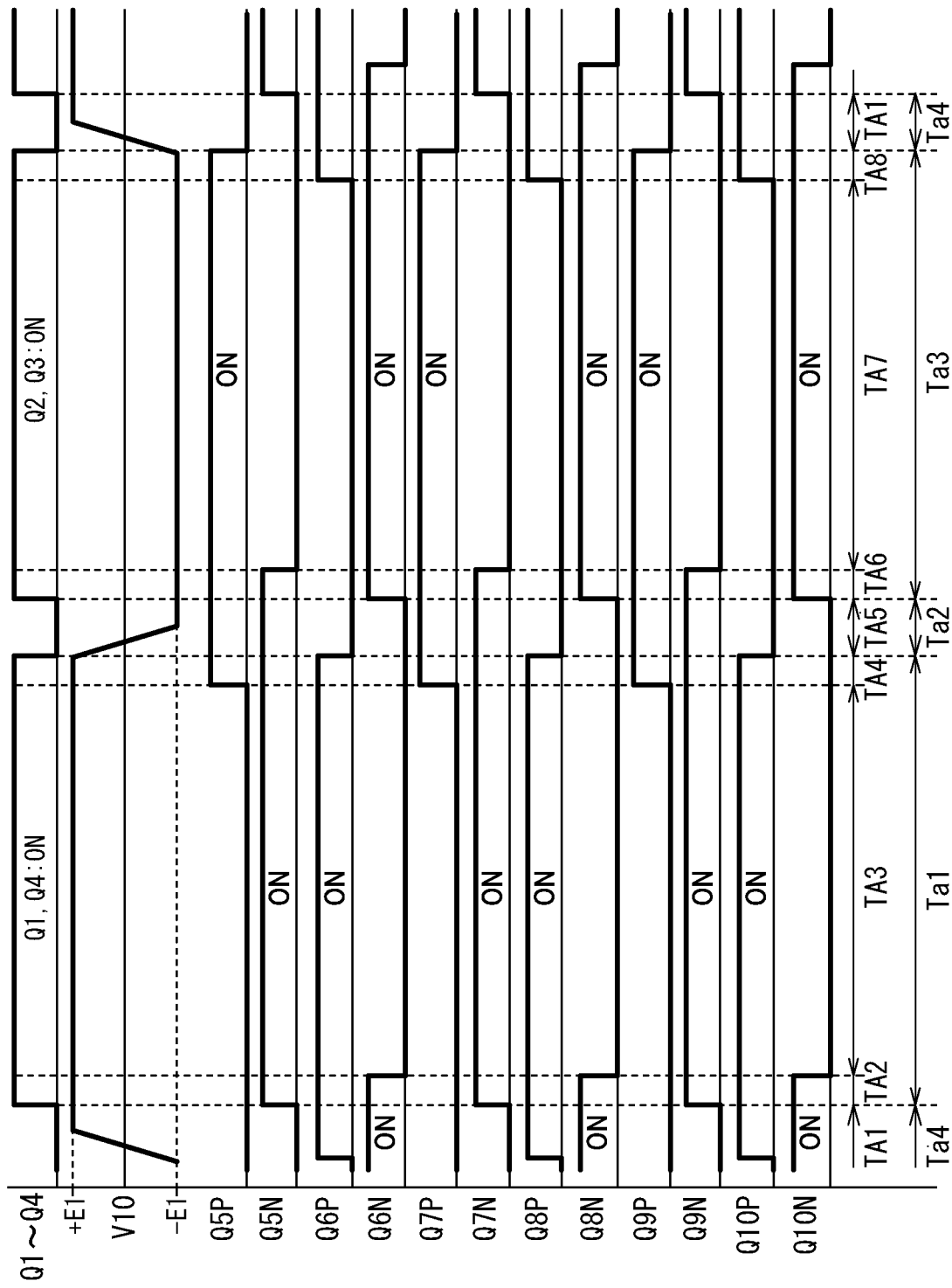
FIG. 21 is a timing chart illustrating how the power conversion system operates.

FIG. 21 is a timing chart illustrating how the power conversion system 1A operates during the regeneration operation period. The control circuit 140 controls the inverter circuit 110 such that the pair of switching elements Q1 and Q4 and the pair of switching elements Q2 and Q3 of the inverter circuit 110 turn ON alternately at a duty ratio of 50% even after the contacts 410-430 of the parallel-off relay 400 have been turned OFF. This allows the voltage V10 between both terminals of the secondary winding 122 to change alternately between "+E1" and "−E1."

The control circuit 140 controls the converter circuit 130 so as to provide respective regeneration periods TA3 and TA7 for a period Ta1 in which the voltage V10 between both terminals of the secondary winding 122 is fixed at a positive constant voltage (+E1) and a period Ta3 in which the voltage V10 between both terminals is fixed at a negative constant voltage (−E1). The regeneration periods TA3 and TA7 are periods in which a current generated by the energy stored in the reactors L11-L13 flows through the secondary winding 122 via the converter circuit 130. In these periods, the energy stored in the reactors L11-L13 is regenerated in the inverter circuit 110 (that is to say, on the DC power supply 200 side, i.e., on the primary winding 121 side).

In addition, the control circuit 140 controls the converter circuit 130 so as to provide respective freewheeling periods TA5 and TA1 for periods Ta2 and Ta4 in which the polarity sign of the voltage V10 between both terminals of the secondary winding 122 inverts. The freewheeling periods TA1 and TA5 are periods in which a current generated by the energy stored in the reactors L11-L13 flows through the converter circuit 130 without passing through the secondary winding 122.

In addition, the control circuit 140 also controls the converter circuit 130 so as to provide respective freewheeling switching periods TA4 and TA8 as transitional periods from the regeneration periods TA3 and TA7 to the freewheeling periods TA5 and TA1. The control circuit 140 further controls the converter circuit 130 so as to provide respective regeneration switching periods TA6 and TA2 as transitional periods from the freewheeling periods TA5 and TA1 to the regeneration periods TA7 and TA3.

This allows the converter circuit 130 to repeatedly perform the series of operations for the freewheeling period TA1, the regeneration switching period TA2, the regeneration period TA3, the freewheeling switching period TA4, the freewheeling period TA5, the regeneration switching period TA6, the regeneration period TA7, the freewheeling switching period TA8, and the freewheeling period TA1 in this order.

Next, it will be described with reference to FIGS. 22A-25B how the converter circuit 130 operates in the respective periods. In FIGS. 22A-25B, the arrow A1 indicates the polarity of the voltage V10 generated between both terminals of the secondary winding 122, and the arrows A11, A12, and A13 indicate the directions of currents flowing through the reactors L11, L12, and L13, respectively. The directions of the currents flowing through the reactors L11, L12, and L13 are only exemplary ones, and are variable according to the phase of the output voltage of the converter circuit 130 when the contacts 410-430 of the parallel-off relay turn OFF or the polarity of the currents flowing through the reactors L11, L12, and L13 when the contacts 410-430 turn OFF, for example. When the contacts 410-430 of the parallel-off relay 400 turn OFF, the energy stored in the reactors L11, L12, and L13 causes a positive current to flow through at least one of the reactors L11, L12, and L13 and also causes a negative current to flow through at least one of the reactors L11, L12, and L13. Also, in FIGS. 22A-25B, out of the switching elements Q5N-Q10N and Q5P-Q10P, the switching elements, of which the circuit symbol is surrounded with a dotted square, are ON, while the switching elements, of which the circuit symbol is not surrounded with any dotted square, are OFF.

Figure 22A:
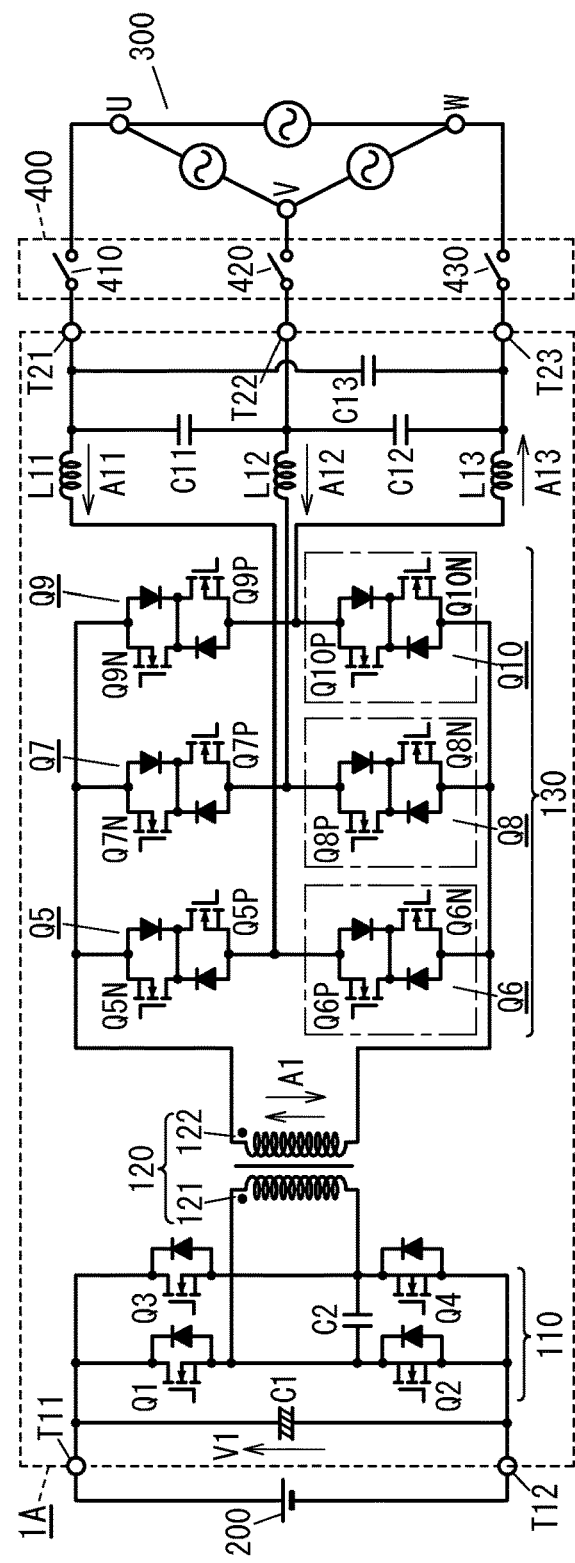
FIG. 22A is a circuit diagram illustrating how the power conversion system operates in a freewheeling period.

FIG. 22A illustrates how the power conversion system 1A operates in the freewheeling period TA1. The freewheeling period TA1 is a transitional period Ta4 from the period Ta3 to the period Ta1. In the freewheeling period TA1, the polarity of the voltage V10 between both terminals of the secondary winding 122 inverts from negative to positive.

The control circuit 140 turns, in the freewheeling period TA1, the switching elements Q6P, Q6N, Q8P, Q8N, Q10P, and Q10N ON to make the bidirectional switch units Q6, Q8, and Q10 enter a bidirectionally ON state. In addition, the control circuit 140 also turns, in the freewheeling period TA1, all of the switching elements Q5P, Q5N, Q7P, Q7N, Q9P, and Q9N OFF to make the bidirectional switch units Q5, Q7, and Q9 enter a bidirectionally OFF state. As used herein, the "bidirectionally ON state" of the bidirectional switch units Q5-Q10 refers to a state where a bidirectional current is allowed to flow, while the "bidirectionally OFF state" refers to a state where a bidirectional current is cut off.

This prevents the current flowing through the reactors L11, L12, and L13 when the second set of connection terminals T21-T23 are open from flowing through the secondary winding 122 and makes the current flow through the converter circuit 130. In the converter circuit 130, the current flows, for example, through a freewheeling path in the order of the reactor L11, the bidirectional switch unit Q6, the bidirectional switch unit Q10, the reactor L13, the capacitor C13, and the reactor L11. The current also flows through a freewheeling path in the order of the reactor L12, the bidirectional switch unit Q8, the bidirectional switch unit Q10, the reactor L13, the capacitor C12, and the reactor L12. Furthermore, in the freewheeling period TA1, the bidirectional switch units Q6, Q8, and Q10 are in the bidirectionally ON state, while the bidirectional switch units Q5, Q7, and Q9 are in the bidirectionally OFF state. This prevents both terminals of the secondary winding 122 from being short-circuited.

Figure 22B:
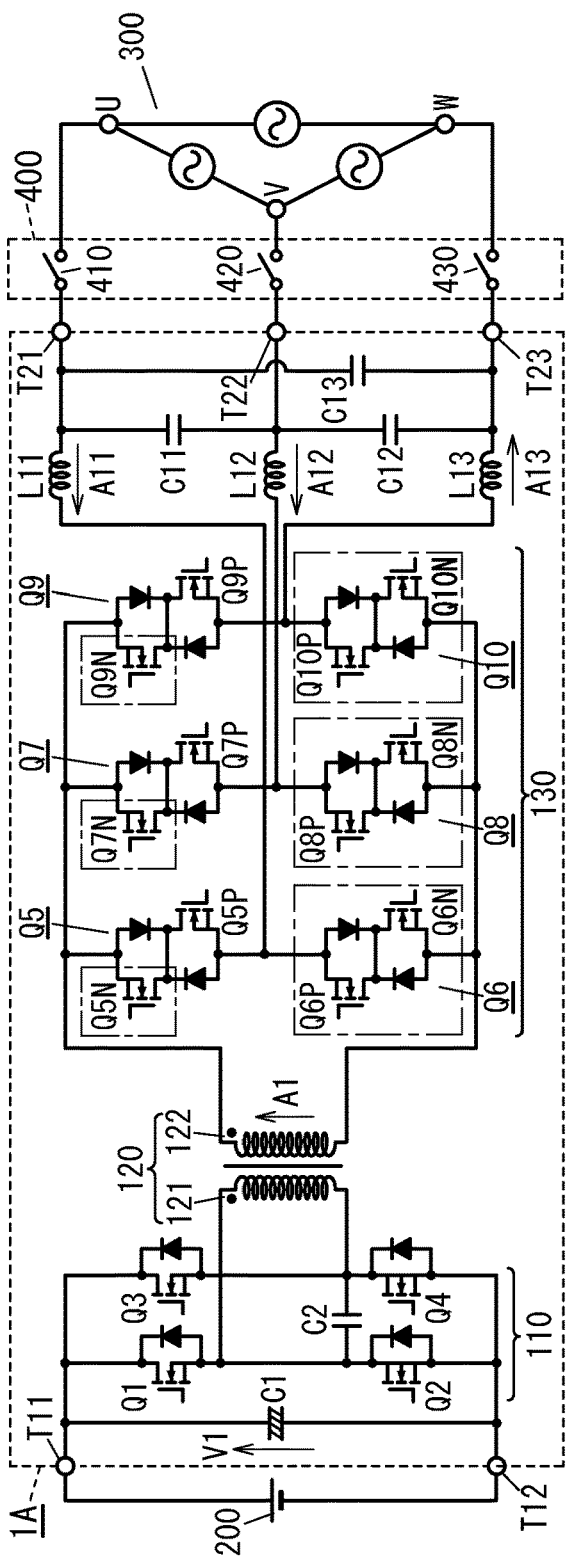
FIG. 22B is a circuit diagram illustrating how the power conversion system operates in a regeneration switching period.

The control circuit 140 turns, when a transition is made from the period Ta4 to the period Ta1, the switching element Q1 and Q4 of the inverter circuit 110 ON to change the operation mode of the converter circuit 130 from operation for the freewheeling period TA1 to operation for regeneration switching period TA2. FIG. 22B illustrates how the power conversion system 1A operates in the regeneration switching period TA2. In the regeneration switching period TA2, the voltage V10 between both terminals of the secondary winding 122 is fixed at positive polarity.

The control circuit 140 maintains, in the regeneration switching period TA2, the bidirectional switch units Q6, Q8, and Q10 in the bidirectionally ON state to turn the switching elements Q5N, Q7N, and Q9N ON. In addition, the control circuit 140 also turns the switching elements Q5P, Q7P, and Q9P OFF.

This allows a current to flow, in the converter circuit 130, through a regeneration path in the order of the reactor L11, the switching element Q5N, the secondary winding 122, the bidirectional switch unit Q10, the reactor L13, the capacitor C13, and the reactor L11. A current is also allowed to flow through another regeneration path in the order of the reactor L12, the switching element Q7N, the secondary winding 122, the bidirectional switch unit Q10, the reactor L13, the capacitor C12, and the reactor L12. Thus, in the converter circuit 130, a regeneration path is formed in the regeneration switching period TA2 with the freewheeling path of the freewheeling period TA1 maintained. This allows the current that has flowed through the freewheeling path during the freewheeling period TA1 to continue flowing in the regeneration switching period TA2, thus avoiding a situation where the loss of a flowing path for a current flowing through the freewheeling path applies stress to the bidirectional switch units Q5, Q7, and Q9.

When the regeneration switching period TA2 lasts for a predetermined amount of time, the control circuit 140 changes the operation mode of the converter circuit 130 from operation for the regeneration switching period TA2 to operation for a regeneration period TA3. FIG. 23A illustrates how the power conversion system 1A operates in the regeneration period TA3. In the regeneration period TA3, the voltage V10 between both terminals of the secondary winding 122 is fixed at positive polarity.

The control circuit 140 turns, in the regeneration period TA3, the switching elements Q6N, Q8N, and Q10N OFF while keeping the switching elements Q5N, Q7N, Q9N, Q6P, Q8P, and Q10P ON. In addition, the control circuit 140 also keeps, in the regeneration period TA3, the switching elements Q5P, Q7P, and Q9P OFF.

This allows a current to flow, in the regeneration period TA3, through the regeneration path that has been formed during the regeneration switching period TA2. In this case, the converter circuit 130 is controlled such that the current flowing through the reactors L11, L12, and L13 flows into one terminal, located on a positive end with respect to the voltage generated on the secondary winding 122, out of the two terminals of the secondary winding 122. Making the current flowing through the reactors L11, L12, and L13 flow through the secondary winding 122 via the converter circuit 130 allows the current to flow through the primary winding 121 of the transformer 120 and to flow through the capacitor C1 or the DC power supply 200 via the inverter circuit 110. Thus, the current is regenerated on the primary winding 121 side. In the regeneration period TA3, the freewheeling path that has been maintained during the regeneration switching period TA2 is cut off.

The control circuit 140 controls the converter circuit 130 such that a transition is made from the regeneration period TA3 to a freewheeling switching period TA4 before the polarity of the voltage V10 between both terminals of the secondary winding 122 inverts. FIG. 23B illustrates how the power conversion system 1A operates in the freewheeling switching period TA4. In the freewheeling switching period TA4, the voltage V10 between both terminals of the secondary winding 122 is fixed at positive polarity.

The control circuit 140 maintains, in the freewheeling switching period TA4, the switching elements Q5N, Q7N, Q9N, Q6P, Q8P, and Q10P, which have been ON during the regeneration period TA3, in the ON state, and also turns the switching elements Q5P, Q7P, and Q9P ON. This allows the bidirectional switch units Q5, Q7, and Q9 to enter the bidirectionally ON state and forms a freewheeling path through which a current flows through the converter circuit 130 without passing through the secondary winding 122. That is to say, in the freewheeling switching period TA4, a freewheeling path is formed with the regeneration path of the regeneration period TA3 maintained.

Thereafter, the control circuit 140 turns all of the switching elements Q1-Q4 OFF to make a transition from the period Ta1 to the period Ta2, and then controls the converter circuit 130 to make a transition from the freewheeling switching period TA4 to a freewheeling period TA5. FIG. 24A illustrates how the power conversion system 1A operates in the freewheeling period TA5. In the freewheeling period TA5, the polarity of the voltage V10 between both terminals of the secondary winding 122 inverts from positive to negative.

The control circuit 140 maintains, in the freewheeling period TA5, the bidirectional switch units Q5, Q7, and Q9, which have been in the bidirectionally ON state during the freewheeling switching period TA4, in the bidirectionally ON state, and also turns the switching elements Q6P, Q8P, and Q10P OFF. This cuts off the regeneration path that has been maintained during the freewheeling switching period TA4 and allows a current to flow through only the freewheeling path that has been formed during the freewheeling switching period TA4.

Specifically, in the converter circuit 130, the current is allowed to flow through the freewheeling path in the order of the reactor L11, the switching element Q5N, the switching element Q9P, the reactor L13, the capacitor C13, and the reactor L11. The current is also allowed to flow through the freewheeling path in the order of the reactor L12, the switching element Q7N, the switching element Q9P, the reactor L13, the capacitor C12, and the reactor L12. In this manner, the current flows through the converter circuit 130 without passing through the secondary winding 122. This allows the control circuit 140 to invert the polarity of the output voltage of the inverter circuit 110 from positive to negative in the freewheeling period TA5 (period Ta2).

The control circuit 140 turns the switching elements Q2 and Q3 ON to make a transition from the period Ta2 to the period Ta3, and then controls the converter circuit 130 to make a transition from the freewheeling period TA5 to a regeneration switching period TA6. FIG. 24B illustrates how the power conversion system 1A operates in the regeneration switching period TA6. In the regeneration switching period TA6, the voltage V10 between both terminals of the secondary winding 122 is fixed at negative polarity.

The control circuit 140 maintains, in the regeneration switching period TA6, the bidirectional switch units Q5, Q7, and Q9, which have been in the bidirectionally ON state during the freewheeling period TA5, in the bidirectionally ON state, and also turns the switching elements Q6N, Q8N, and Q10N ON. Thus, in the regeneration switching period TA6, a regeneration path is formed with the freewheeling path formed during the freewheeling period TA5 maintained.

Specifically, in the converter circuit 130, the current is allowed to flow through the regeneration path in the order of the reactor L11, the switching element Q6N, the secondary winding 122, the switching element Q9P, the reactor L13, the capacitor C13, and the reactor L11. The current is also allowed to flow through the regeneration path in the order of the reactor L12, the switching element Q8N, the secondary winding 122, the switching element Q9P, the reactor L13, the capacitor C12, and the reactor L12.

Figure 25A:
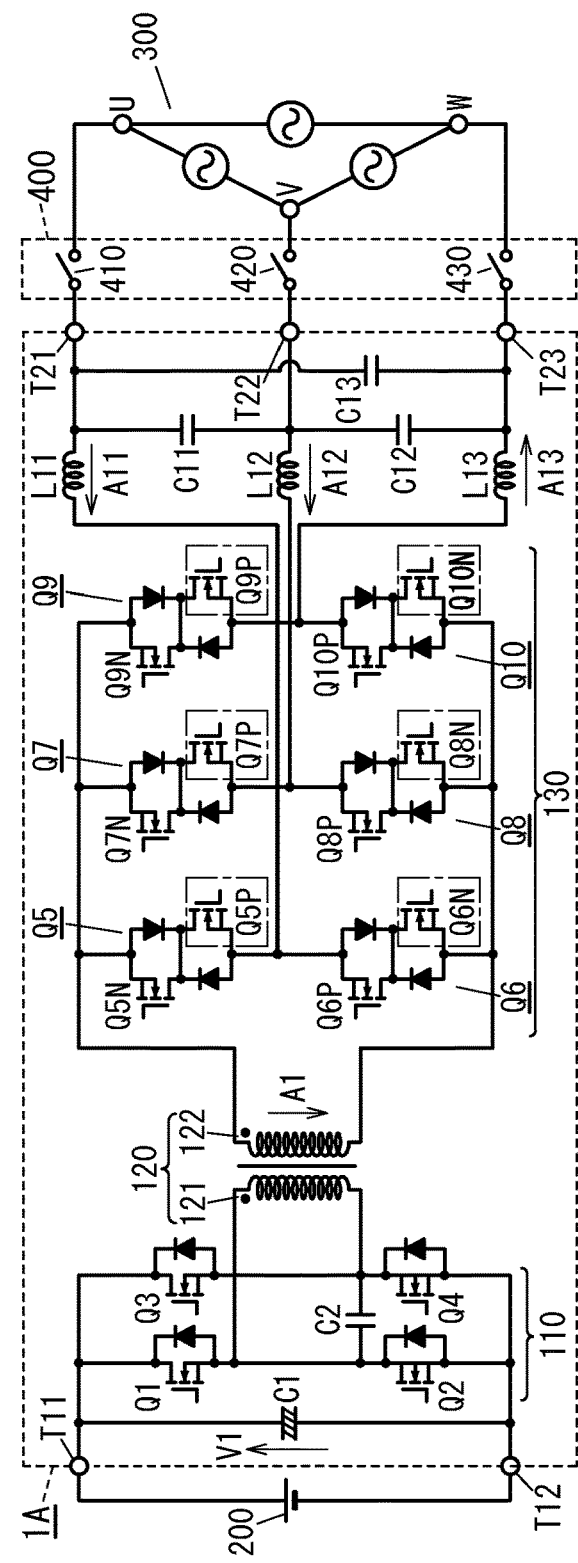
FIG. 25A is a circuit diagram illustrating how the power conversion system operates in a regeneration period.

When the regeneration switching period TA6 lasts for a predetermined amount of time, the control circuit 140 changes the operation mode of the converter circuit 130 from operation for the regeneration switching period TA6 to operation for a regeneration period TA7. FIG. 25A illustrates how the power conversion system 1A operates in the regeneration period TA7. In the regeneration period TA7, the voltage V10 between both terminals of the secondary winding 122 is fixed at negative polarity.

The control circuit 140 maintains, in the regeneration period TA7, the switching elements Q5P, Q7P, Q9P, Q6N, Q8N, and Q10N, which have been in ON state during the regeneration switching period TA6, in the ON state. The control circuit 140 also turns, in the regeneration period TA7, the switching elements Q5N, Q7N, and Q9N, which have been in the ON state during the regeneration switching period TA6, OFF. The control circuit 140 maintains, in the regeneration period TA7, the switching elements Q6P, Q8P, and Q10P in the OFF state. This cuts off, in the regeneration period TA7, the freewheeling path that has been maintained during the regeneration switching period TA6 and allows a current to flow through the regeneration path that has been formed during the regeneration switching period TA6.

Specifically, in the converter circuit 130, the current is allowed to flow through the regeneration path in the order of the reactor L11, the switching element Q6N, the secondary winding 122, the switching element Q9P, the reactor L13, the capacitor C13, and the reactor L11. The current is also allowed to flow through the regeneration path in the order of the reactor L12, the switching element Q8N, the secondary winding 122, the switching element Q9P, the reactor L13, the capacitor C12, and the reactor L12. In this case, the converter circuit 130 is controlled such that the current flowing through the reactors L11, L12, and L13 flows into one terminal, located on a positive end with respect to the voltage generated on the secondary winding 122, out of the two terminals of the secondary winding 122. Making the current flowing through the reactors L11, L12, and L13 flow through the secondary winding 122 via the converter circuit 130 allows the current to flow through the capacitor C1 or the DC power supply 200 via the transformer 120 and the inverter circuit 110. This allows the capacitor C1 or the DC power supply 200 to be charged and also allows a current to be regenerated on the primary winding 121 side.

Figure 25B:
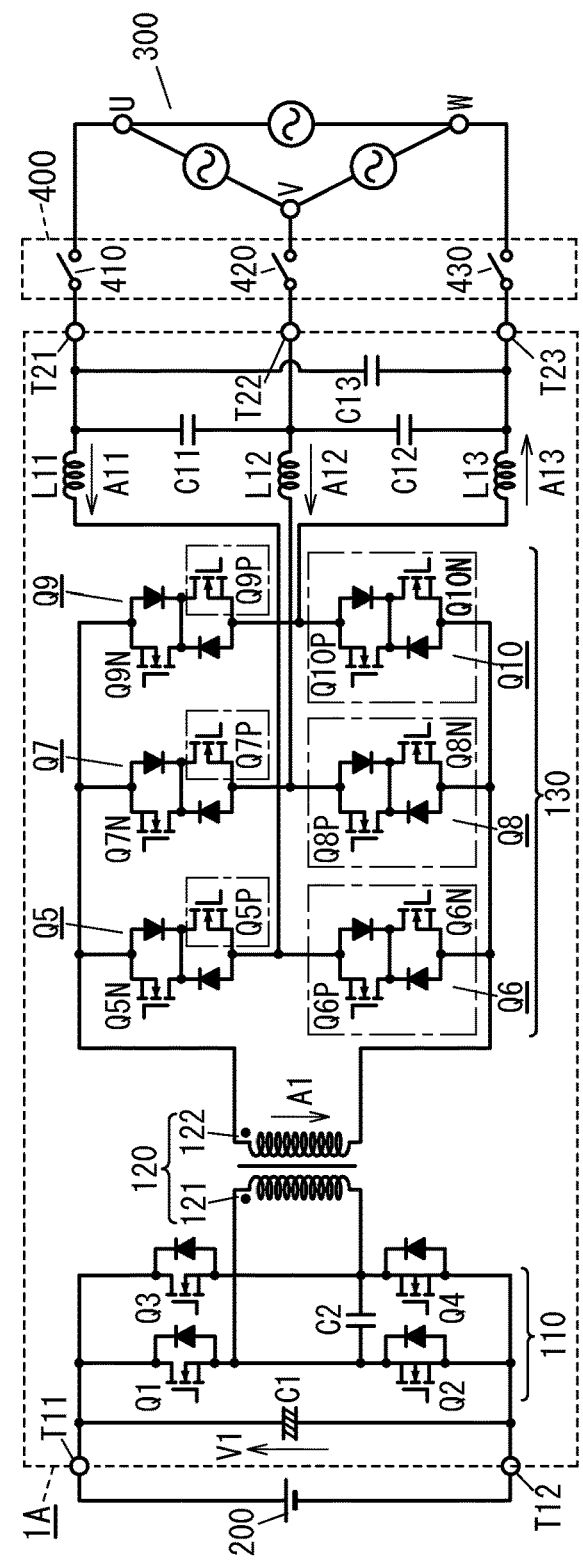
FIG. 25B is a circuit diagram illustrating how the power conversion system operates in a freewheeling switching period.

Thereafter, the control circuit 140 controls the converter circuit 130 such that a transition is made from the regeneration period TA7 to a freewheeling switching period TA8 before the polarity of the voltage V10 between both terminals of the secondary winding 122 inverts from negative to positive. FIG. 25B illustrates how the power conversion system 1A operates in the freewheeling switching period TA8. In the freewheeling switching period TA8, the voltage V10 between both terminals of the secondary winding 122 is fixed at negative polarity.

The control circuit 140 maintains, in the freewheeling switching period TA8, the switching elements Q5P, Q7P, Q9P, Q6N, Q8N, and Q10N, which have been ON during the regeneration period TA7, in the ON state, and also turns the switching elements Q6P, Q8P, and Q10P ON. This allows the bidirectional switch units Q6, Q8, and Q10 to enter the bidirectionally ON state and forms a freewheeling path through which a current flows through the converter circuit 130 without passing through the secondary winding 122. That is to say, in the freewheeling switching period TA8, a freewheeling path is formed with the regeneration path that has been formed during the regeneration period TA7 maintained.

This forms, in the converter circuit 130, a regeneration path through which the current flows in the order of the reactor L11, the bidirectional switch unit Q6, the bidirectional switch unit Q10, the reactor L13, the capacitor C13, and the reactor L11. In addition, this also forms another regeneration path through which the current flows in the order of the reactor L12, the bidirectional switch unit Q8, the bidirectional switch unit Q10, the reactor L13, the capacitor C12, and the reactor L12.

Thereafter, the control circuit 140 turns all of the switching elements Q1-Q4 OFF to make a transition from the period Ta3 to the period Ta4, and then controls the converter circuit 130 to make a transition from the freewheeling switching period TA8 to the freewheeling period TA1. FIG. 22A illustrates how the power conversion system 1A operates in the freewheeling period TA1. In the freewheeling period TA1, the polarity of the voltage V10 between both terminals of the secondary winding 122 inverts from negative to positive.

The control circuit 140 maintains, in the freewheeling period TA1, the bidirectional switch units Q6, Q8, and Q10, which have been in the bidirectionally ON state during the freewheeling switching period TA8, in the bidirectionally ON state. The control circuit 140 also turns the switching elements Q5P, Q7P, and Q9P, which have been in the ON state during the freewheeling switching period TA8, OFF. This cuts off, in the freewheeling period TA1, the regeneration path that has been maintained during the freewheeling switching period TA8. In addition, in the freewheeling period TA1, the bidirectional switch units Q6, Q8, and Q10 enter the bidirectionally ON state and a freewheeling path, allowing a current to flow through the converter circuit 130 without passing through the secondary winding 122, is formed continuously. This allows, in the converter circuit 130, the current to flow through the freewheeling path without passing through the secondary winding 122. Thus, the polarity of the output voltage of the inverter circuit 110 may be inverted from negative to positive in the meantime.

The control circuit 140 controls the converter circuit 130 such that after the second set of connection terminals T21-T23 have been opened, a regeneration path is formed to allow the current, flowing through the reactors L11, L12, and L13, to flow through the secondary winding 122 via the converter circuit 130. Thus, letting the current flow through the secondary winding 122 via the converter circuit 130 after the second set of connection terminals T21-T23 have been opened allows the energy stored in the reactors L11, L12, and L13 to be regenerated in either the capacitor C1 or the DC power supply 200 via the inverter circuit 110. This allows the capacitor C1 or the DC power supply 200 to be charged and also allows the energy stored in the reactors L11, L12, and L13 to be regenerated on the primary winding 121 side.

The control circuit 140 controls the converter circuit 130 so as to perform the series of operations for the periods TA1-TA8 repeatedly for at least a preset amount of time after the second set of connection terminals T21-T23 have been opened. This allows the converter circuit 130 and the inverter circuit 110 to be deactivated after the energy stored in the reactors L11, L12, and L13 has been regenerated on the primary winding 121 side, thus reducing the stress applied to the switching elements of the converter circuit 130. As used herein, the regeneration operation period refers to a period of time it takes to finish regenerating, on the primary winding 121 side, the energy stored in the reactors L11, L12, and L13. The preset amount of time just needs to be longer than the regeneration operation period.

(4) Variations

Next, variations of the embodiments described above will be enumerated one after another. Note that any of the variations to be described below may be adopted in combination with the embodiments described above as appropriate.

The power conversion system 1A deactivates, when a certain amount of time passes since the second set of connection terminals T21-T23 have been opened, the inverter circuit 110 and the converter circuit 130. However, this is not the only timing to deactivate the inverter circuit 110 and the converter circuit 130. Alternatively, the control circuit 140 may directly or indirectly measure the current value of the current to be regenerated on the primary winding 121 side and may deactivate, on finding the measured value of the current equal to or less than a predetermined threshold value, the inverter circuit 110 and the converter circuit 130. For example, the control circuit 140 may make a current sensor (such as a current transformer or a Hall element) directly measure the current flowing through the reactors L11, L12, and L13 after the second set of connection terminals T21-T23 have been opened, and may deactivate, on finding the measured value of the current equal to or less than a threshold value, the inverter circuit 110 and the converter circuit 130. Alternatively, the control circuit 140 may also use, instead of the current sensor, a current-detecting resistor, connected to the reactors L11, L12, and L13 in series, for indirectly measuring, based on the voltage between both terminals of the current-detecting resistor, the amount of the current flowing through the reactors L11, L12, and L13.

Also, in the power conversion system 1A described above, the control circuit 140 is allowed to provide the regeneration operation period immediately after the second set of connection terminals T21, T22, and T23 have been opened. However, this is only an example and should not be construed as limiting. Alternatively, there may be a time lag between a point in time when the second set of connection terminals T21, T22, and T23 are opened and a point in time when the regeneration operation period starts. That is to say, the control circuit 140 may provide the regeneration operation period between the point in time when the second set of connection terminals T21, T22, and T23 are opened and a point in time when the inverter circuit 110 and the converter circuit 130 are deactivated. This allows the control circuit 140 to deactivate the inverter circuit 110 and the converter circuit 130 after the energy stored in the reactors L11, L12, and L13 during the regeneration operation period has been regenerated on the primary winding 121 side. This reduces the stress applied to the bidirectional switch units Q5-Q10 of the converter circuit 130 when the converter circuit 130 is deactivated.

Furthermore, even if any of the connection terminals T21, T22, or T23 of the second set has been opened due to disconnection of an electric wire connected to the connection terminal T21-T23 of the second set, for example, the power conversion system 1A may also deactivate the inverter circuit 110 and the converter circuit 130 after having provided the regeneration operation period. In that case, the control circuit 140 may detect, based on an inter-terminal voltage between the second set of connection terminals T21, T22, and T23, for example, the open state of the connection terminal T21, T22, or T23 of the second set.

Furthermore, the power conversion system 1, 1A does not have to be configured to perform power conversion bidirectionally. Alternatively, the power conversion system 1, 1A may also be configured to perform power conversion only in the direction from the first set of connection terminals T11 and T12 toward the second set of connection terminals T21, T22, and T23. In other words, power may be transmitted in either the first direction from the converter circuit (11, 130) toward the inverter circuit (5, 110) or the second direction from the inverter circuit (5, 110) toward the converter circuit (11, 130).

Furthermore, in the first and second embodiments described above, the first connection target is the DC power supply 200. However, this is only an example and should not be construed as limiting. The first connection target does not have to be a DC power supply but may also be a DC load operating with DC power supplied or a DC/DC converter for performing power conversion bidirectionally.

Furthermore, in the first and second embodiments described above, the second connection target is the AC power grid 300. However, this is only an example and should not be construed as limiting. The second connection target does not have to be the AC power grid 300 but may also be a load 29 (see FIG. 1) or AC load 310 (see FIG. 20), each operating with AC power supplied as well.

The power conversion system 1, 1A does not have to be applied to a non-dwelling house, but may also be installed in a dwelling house. Alternatively, the power conversion system 1, 1A is also applicable to electric vehicles, for example, instead of facilities.

Furthermore, the switching elements S1-S4 and Q1-Q4 of the inverter circuit 5, 110 do not have to be MOSFETs but may also be bipolar transistors, insulated gate bipolar transistors (IGBTs), or any other type of transistors as well. Likewise, the switch units S5P-S10P and S5N-S10N of the cycloconverter 11 and the switching elements Q5P-Q10P and Q5N-Q10N of the converter circuit 130 do not have to be MOSFETs but may also be bipolar transistors, IGBTs, or any other type of transistors. In that case, freewheeling diodes may be connected in the same direction as the parasitic diodes of the MOSFETs.

Furthermore, in the first and second embodiments described above, the commercial power grid 27 and the AC power grid 300 as the second connection targets are three-phase AC power supplies. However, this is only an example and should not be construed as limiting. Alternatively, the second connection target may also be a single-phase AC power supply. The power conversion system 1A performs power conversion bidirectionally between the first set of connection terminals T11 and T12 and the second set of connection terminals T21, T22, and T23. That is to say, the power conversion system 1A may convert DC power input through the first set of connection terminals T11 and T12 into single-phase AC power and output the single-phase AC power through the second set of connection terminals T21, T22, and T23. Alternatively, the power conversion system 1A may also convert single-phase AC power input through the second set of connection terminals T21, T22, and T23 into DC power and output the DC power through the first set of connection terminals T11 and T12.

(5) Resume

As can be seen from the foregoing description, a power conversion system (1, 1A) according to a first aspect includes a first connection terminal (3, T11-T12), a second connection terminal (15, T21-T23), a primary winding (19, 121), a secondary winding (21, 122), an inverter circuit (5, 110), a converter circuit (11, 130), and a control circuit (7, 140). A first connection target (17, 200) is connected to the first connection terminal (3, T11-T12). A second connection target (27, 29, 300, 310) is connected to the second connection terminal (15, T21-T23). The secondary winding (21, 122) is magnetically coupled to the primary winding (19, 121). The inverter circuit (5, 110) is connected between the first connection terminal (3, T11-T12) and the primary winding (19, 121) to perform power conversion. The converter circuit (11, 130) includes a plurality of bidirectional switch units (35-40, Q5-Q10), which are bridge-connected between both terminals of the secondary winding (21, 122). The control circuit (7, 140) controls the inverter circuit (5, 110) such that a positive voltage and a negative voltage are alternately applied to the primary winding (19, 121). The control circuit (7, 140) controls the converter circuit (11, 130) so as to allow no power to be transmitted between the converter circuit (11, 130) and the inverter circuit (5, 110) in a first period including an inversion period during which a voltage of the primary winding (19, 121) has its polarity inverted. The control circuit (7, 140) also controls the converter circuit (11, 130) so as to allow power to be transmitted either in a first direction from the converter circuit (11, 130) toward the inverter circuit (5, 110), or in a second direction opposite from the first direction, in a second period different from the first period.

According to this configuration, the converter circuit (11, 130) is controlled such that no power is transmitted between the converter circuit (11, 130) and the inverter circuit (5, 110) in a first period including an inversion period during which a voltage of the primary winding (19, 121) has its polarity inverted. This allows the voltage applied to the primary winding (19, 121) to have its polarity inverted with stability, thus cutting down the power loss caused by switching of the bidirectional switch units (35-40, Q5-Q10). Consequently, the power conversion efficiency of the power conversion system (1, 1A) improves.

In a power conversion system (1) according to a second aspect, which may be implemented in conjunction with the first aspect, the second connection terminal (15) includes a plurality of terminals (15a-15c). The bidirectional switch units (35-40) include: first bidirectional switch units (35, 37, 39), each of which is inserted between a first terminal (21a) of the secondary winding (21) and an associated one of the plurality of terminals (15a-15c); and second bidirectional switch units (36, 38, 40), each of which is inserted between a second terminal (21b) of the secondary winding (21) and an associated one of the plurality of terminals (15a-15c). Each of the first bidirectional switch units (35, 37, 39) and a corresponding one of the second bidirectional switch units (36, 38, 40) are connected together in series. The control circuit (7) controls the amplitude of at least one of an output voltage or an output current of the second connection terminal (15) by shifting a first timing and a second timing. The first timing is a timing when, in a positive polarity period during which the secondary winding (21) has a positive voltage, a current, flowing through a circuit including the first bidirectional switch units (35, 37, 39) and the second bidirectional switch units (36, 38, 40), changes from a state of flowing through the second bidirectional switch units (36, 38, 40) into a state of flowing through the first bidirectional switch units (35, 37, 39). The second timing is a timing when, in a negative polarity period which follows the positive polarity period and during which the secondary winding (21) has a negative voltage, the current, flowing through the circuit, changes from the state of flowing through the first bidirectional switch units (35, 37, 39) into the state of flowing through the second bidirectional switch units (36, 38, 40).

Thus, the inverter circuit (5) on the primary side does not need to perform the processing of controlling the amplitude of at least one of the output voltage or the output current. That is to say, this allows the phase of a signal for driving the switching elements that form the inverter circuit (5) to be fixed. The control circuit (7) controls the amplitude by controlling the first bidirectional switch units (35, 37, 39) and the second bidirectional switch units (36, 38, 40) with the phase of the inverter circuit (5) on the primary side fixed. This prevents circulating currents from being generated in the inverter circuit (5) on the primary side.

In a power conversion system (1) according to a third aspect, which may be implemented in conjunction with the second aspect, the first bidirectional switch units (35, 37, 39) and the second bidirectional switch units (36, 38, 40) each include a first switch unit (S5P-S10P) and a second switch unit (S5N-S10N) connected to the first switch unit (S5P-S10P) in series.

In a power conversion system (1) according to a fourth aspect, which may be implemented in conjunction with the third aspect, when turned ON, the first switch unit (S5P-S10P) is electrically conductive in a direction from the secondary winding (21) toward the second connection terminal (15) and in a direction from the second connection terminal (15) toward the secondary winding (21). When turned OFF, the first switch unit (S5P-SL0P) is electrically non-conductive in the direction from the secondary winding (21) toward the second connection terminal (15) and is electrically conductive in the direction from the second connection terminal (15) toward the secondary winding (21). When turned ON, the second switch unit (S5N-S10N) is electrically conductive in the direction from the secondary winding (21) toward the second connection terminal (15) and in the direction from the second connection terminal (15) toward the secondary winding (21). When turned OFF, the second switch unit (S5N-S10N) is electrically conductive in the direction from the secondary winding (21) toward the second connection terminal (15) and is electrically non-conductive in the direction from the second connection terminal (15) toward the secondary winding (21).

In a power conversion system (1) according to a fifth aspect, which may be implemented in conjunction with the third or fourth aspect, the control circuit (7) shifts the first timing and the second timing by shifting a phase of a drive signal for turning ON and OFF the first switch unit (S5P, S7P, S9P) of any one of the first bidirectional switch units (35, 37, 39), a phase of a drive signal for turning ON and OFF the second switch unit (S5N, S7N, S9N) of the first bidirectional switch unit (35, 37, 39), a phase of a drive signal for turning ON and OFF the first switch unit (S6P, S8P, S10P) of a corresponding one of the second bidirectional switch units (36, 38, 40), and a phase of a drive signal for turning ON and OFF the second switch unit (S6N, S8N, S10N) of the second bidirectional switch unit (36, 38, 40).

This allows the first timing and the second timing to be shifted by shifting the phase of a drive signal without changing the duty thereof.

In a power conversion system (1) according to a sixth aspect, which may be implemented in conjunction with any one of the third to fifth aspects, the control circuit (7) turns the first switch unit (S6P, S8P, S10P) of any one of the second bidirectional switch units (36, 38, 40) from ON to OFF when a first predetermined period passes, during the positive polarity period, since the control circuit (7) has turned the first switch unit (S5P, S7P, S9P) of a corresponding one of the first bidirectional switch units (35, 37, 39) from OFF to ON. The control circuit (7) also turns the second switch unit (S6N, S8N, S10N) of the second bidirectional switch unit (36, 38, 40) from ON to OFF when a second predetermined period passes, during the positive polarity period, since the control circuit (7) has turned the second switch unit (S5N, S7N, S9N) of the first bidirectional switch unit (35, 37, 39) from OFF to ON. The control circuit (7) further turns the first switch unit (S5P, S7P, S9P) of the first bidirectional switch unit (35, 37, 39) from ON to OFF when a third predetermined period passes, during the negative polarity period, since the control circuit (7) has turned the first switch unit (S6P, S8P, S10P) of the second bidirectional switch unit (36, 38, 40) from OFF to ON. The control circuit (7) further turns the second switch unit (S5N, S7N, S9N) of the first bidirectional switch unit (35, 37, 39) from ON to OFF when a fourth predetermined period passes, during the negative polarity period, since the control circuit (7) has turned the second switch unit (S6N, S8N, S10N) of the second bidirectional switch unit (36, 38, 40) from OFF to ON.

The control circuit (7) performs control such that the ON period of the first switch unit (S5P, S7P, S9P) of any one of the first bidirectional switch units (35, 37, 39) and the ON period of the first switch unit (S6P, S8P, S10P) of a corresponding one of the second bidirectional switch units (36, 38, 40) partially overlap with each other, thus preventing both of the first switch unit (S5P, S7P, S9P) and the first switch unit (S6P, S8P, S10P) from being OFF in the same period. Likewise, the control circuit (7) performs control such that the ON period of the second switch unit (S5N, S7N, S9N) of any one of the first bidirectional switch units (35, 37, 39) and the ON period of the second switch unit (S6N, S8N, S10N) of a corresponding one of the second bidirectional switch units (36, 38, 40) partially overlap with each other, thus preventing both of the second switch unit (S5N, S7N, S9N) and the second switch unit (S6N, S8N, S10N) from being OFF in the same period. This always secures a path leading to the secondary winding (21) on the secondary side of the power conversion system (1). Therefore, even if a return current has been generated on the secondary side of the power conversion system (1), a path is secured for the return current to flow, no matter whether the current is a positive current or a negative current, thus protecting the circuit from breakdown.

In a power conversion system (1) according to a seventh aspect, which may be implemented in conjunction with any one of the third to sixth aspects, the control circuit (7) turns the first switch unit (S5P, S7P, S9P) of any one of the first bidirectional switch units (35, 37, 39) from OFF to ON when a fifth predetermined period passes, during the positive polarity period, since the control circuit (7) has turned the second switch unit (S6N, S8N, S10N) of a corresponding one of the second bidirectional switch units (36, 38, 40) from ON to OFF. The control circuit (7) also turns the first switch unit (S6P, S8P, S10P) of the second bidirectional switch unit (36, 38, 40) from OFF to ON when a sixth predetermined period passes, during the negative polarity period, since the control circuit (7) has turned the second switch unit (S5N, S7N, S9N) of the first bidirectional switch unit (35, 37, 39) from ON to OFF.

This prevents the second switch unit (S6N, S8N, S10N) and the first switch unit (S5P, S7P, S9P) from being ON at the same time during the positive polarity period. In addition, this also prevents the second switch unit (S5N, S7N, S9N) and the first switch unit (S6P, S8P, S10P) from being ON at the same time during the negative polarity period.

In a power conversion system (1) according to an eighth aspect, which may be implemented in conjunction with any one of the third to seventh aspects, the control circuit (7) performs, when no current flows through the primary winding, either control of turning ON the first switch unit (S5P, S7P, S9P) and the second switch unit (S5N, S7N, S10N) of each of the first bidirectional switch units (35, 37, 39) and turning OFF the first switch unit (S6P, S8P, S10P) and the second switch unit (S6N, S8N, S10N) of each of the second bidirectional switch units (36, 38, 40). Alternatively, the control circuit (7) performs control of turning OFF the first switch unit (S5P, S7P, S9P) and the second switch unit (S5N, S7N, S9N) of each of the first bidirectional switch units (35, 37, 39) and turning ON the first switch unit (S6P, S8P, S10P) and the second switch unit (S6N, S8N, S10N) of each of the second bidirectional switch units (36, 38, 40).

This allows no current to flow through the secondary winding (21) while allowing a current to circulate through the secondary side of the power conversion system (1).

A power conversion system (1A) according to a ninth aspect, which may be implemented in conjunction with the first aspect, includes a first connection terminal (T11 and T12) and a second connection terminal (T21, T22, and T23). The power conversion system (1A) includes a primary winding (121), a secondary winding (122), an inverter circuit (110), a converter circuit (130), a reactor (L11, L12, L13), and a control circuit (140). A first connection target (200) is connected to the first connection terminal (T11 and T12). A second connection target (300, 310) is connected to the second connection terminal (T21, T21, T23). The secondary winding (122) is magnetically coupled to the primary winding (121). The inverter circuit (110) is connected between the first connection terminal (T11 and T12) and the primary winding (121) to perform power conversion. The converter circuit (130) includes a plurality of bidirectional switch units (Q5-Q10), which are bridge-connected between both terminals of the secondary winding (122). The reactor (L11, L12, L13) is connected between the converter circuit (130) and the second connection terminal (T21, T22, and T23). The control circuit (140) controls the converter circuit (130) such that when the second connection terminal (T21, T22, and T23) is opened, energy stored in the reactor (L11, L12, L13) is regenerated on a circuit section, located closer to the primary winding (121), of the power conversion system (1A).

This configuration allows, when the second connection terminal (T21, T22, and T23) is opened, energy stored in the reactor (L11, L12, L13) to be regenerated on a circuit section, located closer to the primary winding (121), of the power conversion system (1A). This reduces the stress applied to the bidirectional switch units when deactivating the inverter circuit (110) and the converter circuit (130), compared to a situation where the converter circuit (130) does not perform the regeneration operation.

In a power conversion system (1A) according to a tenth aspect, which may be implemented in conjunction with the ninth aspect, the control circuit (140) controls the converter circuit (130) such that when the second connection terminal (T21, T22, and T23) is opened, a regeneration operation period is provided intermittently with regeneration periods. The regeneration operation period lasts until the energy stored in the reactor (L11, L12, L13) finishes being regenerated on the circuit section located closer to the primary winding (121). Each of the regeneration periods is a period, during which the energy stored in the reactor (L11, L12, L13) is regenerated on the circuit section located closer to the primary winding (121).

This configuration allows the energy stored in the reactor (L11, L12, L13) during the regeneration periods, which are provided intermittently for the regeneration operation period, to be regenerated on the circuit section located closer to the primary winding (121).

In a power conversion system (1A) according to an eleventh aspect, which may be implemented in conjunction with the tenth aspect, the control circuit (140) deactivates, when the regeneration operation period ends, the inverter circuit (110) and the converter circuit (130).

This configuration allows, when the regeneration operation period ends, the inverter circuit (110) and the converter circuit (130) to be deactivated. In this case, the regeneration operation period does not have to be provided immediately after the second connection terminal (T21-T23) has been opened, but may be provided during an interval from a point in time when the second connection terminal (T21-T23) has been opened through a point in time when the inverter circuit (110) and the converter circuit (130) are deactivated. This reduces the stress applied to the bidirectional switch units when deactivating the inverter circuit (110) and the converter circuit (130), compared to a situation where no regeneration operation periods are provided.

In a power conversion system (1A) according to a twelfth aspect, which may be implemented in conjunction with the tenth or eleventh aspect, the control circuit (140) controls the converter circuit (130) such that in the regeneration period, a current flows from the converter circuit (130) into one terminal, located on a positive end with respect to a voltage (V10) generated in the secondary winding (122) by operation of the inverter circuit (110), out of the two terminals of the secondary winding (122).

This configuration increases the voltage between both terminals of the secondary winding (122) by allowing a current, generated by the energy stored in the reactor (L11-L13), to flow into one terminal, located on a positive end, of the secondary winding (122). This allows the energy to be regenerated, via the inverter circuit (110), on the circuit section located closer to the primary winding (121).

In a power conversion system (1A) according to a thirteenth aspect, which may be implemented in conjunction with any one of the tenth to twelfth aspects, the control circuit (140) controls the converter circuit (130) such that the regeneration operation period includes, during a period in which the polarity of the voltage generated in the secondary winding (122) is inverted, a freewheeling period. The freewheeling period is a period in which a freewheeling path, allowing a current to flow through the converter circuit (130) without passing through the secondary winding (122), is formed.

This configuration allows a current to flow, during the freewheeling period, through the converter circuit (130) without passing through the secondary winding (122). This allows the voltage generated in the secondary winding (122) to have its polarity inverted without being affected by the current flowing through the converter circuit (130).

In a power conversion system (1A) according to a fourteenth aspect, which may be implemented in conjunction with the thirteenth aspect, the control circuit (140) provides a freewheeling switching period in which the control circuit (140) controls the converter circuit (130) so as to form the freewheeling path with a regeneration path, through which a current flows during the regeneration period, maintained while a transition is made from the regeneration period to the freewheeling period.

This configuration allows a current to flow, during the freewheeling switching period, through both of the regeneration path and the freewheeling path. This reduces the stress applied to the bidirectional switch units by avoiding the loss of a current flowing path in a situation where a current that has flowed through the regeneration path during the regeneration period continues to flow even in the freewheeling switching period.

In a power conversion system (1A) according to a fifteenth aspect, which may be implemented in conjunction with the thirteenth or fourteenth aspect, the control circuit (140) provides a regeneration switching period in which the control circuit (140) controls the converter circuit (130) so as to regenerate the energy stored in the reactor (L11, L12, L13) on the circuit section located closer to the primary winding (121) with the freewheeling path maintained while a transition is made from the freewheeling period to the regeneration period.

In a power conversion system (1, 1A) according to a sixteenth aspect, which may be implemented in conjunction with any one of the first to fifteenth aspects, the converter circuit (11, 130) performs at least one of the operation of converting single-phase AC power into three-phase AC power or the operation of converting three-phase AC power into single-phase AC power between the secondary winding (21, 122) and the second connection terminal (15, T21-T23).

This configuration makes the power conversion system (1, 1A) applicable to an AC power grid of three-phase AC type.

In a power conversion system (1, 1A) according to a seventeenth aspect, which may be implemented in conjunction with any one of the first to fifteenth aspects, the converter circuit (11, 130) performs the operation of converting single-phase AC power between the secondary winding (21, 122) and the second connection terminal (15, T21-T23).

This configuration makes the power conversion system (1, 1A) applicable to an AC power grid of single-phase AC type.

Note that the constituent elements according to the second to fifteenth aspects are not essential constituent elements for the power conversion system (1, 1A) but may be omitted as appropriate.

It should also be noted that the ninth aspect may be implemented independently and does not always depend on one of the first to eighth aspects. Likewise, the second aspect may also be implemented independently and does not always depend on one of the ninth to fifteenth aspects.

INDUSTRIAL APPLICABILITY

The present disclosure is applicable for use, for example, in a power conditioner for a stationary storage battery and a V2H (vehicle to home) power conditioner for EV/PHV.

REFERENCE SIGNS LIST 1,1A Power Conversion System
3 Connection Unit (First Connection Terminal)
5 Inverter Circuit
7 Control Unit (Control Circuit)
9 Transformer
11 Cycloconverter (Converter Circuit)
13 Filter Circuit
15 Connection Unit (Second Connection Terminal)
15a First Terminal (Terminal)
15b Second Terminal (Terminal)
15c Third Terminal (Terminal)
17 DC Power Supply (First Connection Target)
19 Primary Winding
21 Secondary Winding
21a First Terminal
21b Second Terminal
27 Commercial Power Grid (Second Connection Target)
29 Load (Second Connection Target)
35-40 Bidirectional Switch Unit
35, 37, 39 First Bidirectional Switch Unit
36, 38, 40 Second Bidirectional Switch Unit
41, 43, 45 Coil (Reactor)
110 Inverter Circuit
121 Primary Winding
122 Secondary Winding
130 Converter Circuit
140 Control Circuit
200 DC Power Supply (First Connection Target)
300 AC Power Grid (Second Connection Target)
310 AC Load (Second Connection Target)
L11-L13 Reactor
S5P-S10P Switch Unit (Example of First Switch Unit)
S5N-S10N Switch Unit (Example of Second Switch Unit)
T11-T13 First Set of Connection Terminals
T21-T23 Second Set of Connection Terminals
TA1, TA5 Freewheeling Period
TA2, TA6 Regeneration Switching Period
TA3, TA7 Regeneration Period
TA4, TA8 Freewheeling Switching Period

The invention claimed is:

1. A power conversion system comprising:
a first connection terminal to which a first connection target is connected;
a second connection terminal to which a second connection target is connected;
a primary winding and a secondary winding magnetically coupled to the primary winding;
an inverter circuit connected between the first connection terminal and the primary winding and configured to perform power conversion;
a converter circuit including a plurality of bidirectional switch units; and
a control circuit configured to control the inverter circuit such that polarity of a first voltage across the primary winding alternately inverts,
the secondary winding having a first terminal and a second terminal,
the plurality of bidirectional switch units being bridge-connected between the first terminal and the second terminal of the secondary winding,
the control circuit being configured to control the converter circuit so as to allow no power to be transmitted between the converter circuit and the inverter circuit in a first period including an inversion period during which the first voltage across the primary winding has its polarity inverted,
the control circuit being configured to control the converter circuit so as to allow power to be transmitted either in a first direction from the converter circuit toward the inverter circuit, or in a second direction opposite from the first direction, in a second period different from the first period, wherein
the second connection terminal includes a plurality of terminals associated with the plurality of bidirectional switch units, respectively,
each of the plurality of bidirectional switch units includes a first bidirectional switch unit which is connected to the first terminal of the secondary winding and a second bidirectional switch unit which is connected between the first bidirectional switch unit and the second terminal of the secondary winding,
a node of the first bidirectional switch unit and the second bidirectional switch unit which are included in each of the plurality of bidirectional switch units is connected to one of the plurality of terminals associated with the each of the plurality of bidirectional switch units,
the control circuit is configured to control amplitude of at least one of an output voltage or an output current of the second connection terminal by shifting a first timing and a second timing,
the first timing is a timing when, in a positive polarity period during which the secondary winding has a positive voltage, the converter circuit changes from a first state where a first current flows through the second bidirectional switch units into a second state where a second current flows through the first bidirectional switch units, the second timing is a timing when, in a negative polarity period which follows the positive polarity period and during which the secondary winding has a negative voltage, the converter circuit changes from the second state where the second current flows through the first bidirectional switch units into the first state where the first current flows through the second bidirectional switch units, the first bidirectional switch units and the second bidirectional switch units each include a first switch unit and a second switch unit connected to the first switch unit in series, the control circuit is configured to:

turn the first switch unit of any one of the second bidirectional switch units from ON to OFF when a first predetermined period passes, during the positive polarity period, since the control circuit has turned the first switch unit of a corresponding one of the first bidirectional switch units from OFF to ON;

turn the second switch unit of the second bidirectional switch unit from ON to OFF when a second predetermined period passes, during the positive polarity period, since the control circuit has turned the second switch unit of the first bidirectional switch unit from OFF to ON;

turn the first switch unit of the first bidirectional switch unit from ON to OFF when a third predetermined period passes, during the negative polarity period, since the control circuit has turned the first switch unit of the second bidirectional switch unit from OFF to ON; and turn the second switch unit of the first bidirectional switch unit from ON to OFF when a fourth predetermined period passes, during the negative polarity period, since the control circuit has turned the second switch unit of the second bidirectional switch unit from OFF to ON.

2. The power conversion system of claim 1, wherein when turned ON, the first switch unit is electrically conductive in a first current direction from the secondary winding toward the second connection terminal and in a second current direction from the second connection terminal toward the secondary winding, when turned OFF, the first switch unit is electrically non-conductive in the first current direction and is electrically conductive in the second current direction, when turned ON, the second switch unit is electrically conductive in the first current direction and in the second current direction, and when turned OFF, the second switch unit is electrically conductive in the first current direction and is electrically non-conductive in the second current direction.

3. The power conversion system of claim 2, wherein the control circuit is configured to shift the first timing and the second timing by shifting a first phase of a drive signal for turning ON and OFF the first switch unit of any one of the first bidirectional switch units, a second phase of the drive signal for turning ON and OFF the second switch unit of the first bidirectional switch unit, a third phase of the drive signal for turning ON and OFF the first switch unit of a corresponding one of the second bidirectional switch units, and a fourth phase of the drive signal for turning ON and OFF the second switch unit of the second bidirectional switch unit.

4. The power conversion system of claim 2, wherein the control circuit is configured to:

turn the first switch unit of any one of the first bidirectional switch units from OFF to ON when a fifth predetermined period passes, during the positive polarity period, since the control circuit has turned the second switch unit of a corresponding one of the second bidirectional switch units from ON to OFF; and turn the first switch unit of the second bidirectional switch unit from OFF to ON when a sixth predetermined period passes, during the negative polarity period, since the control circuit has turned the second switch unit of the first bidirectional switch unit from ON to OFF.

5. The power conversion system of claim 1, wherein the control circuit is configured to shift the first timing and the second timing by shifting a first phase of a drive signal for turning ON and OFF the first switch unit of any one of the first bidirectional switch units, a second phase of the drive signal for turning ON and OFF the second switch unit of the first bidirectional switch unit, a third phase of the drive signal for turning ON and OFF the first switch unit of a corresponding one of the second bidirectional switch units, and a fourth phase of the drive signal for turning ON and OFF the second switch unit of the second bidirectional switch unit.

6. The power conversion system of claim 5, wherein the control circuit is configured to:

turn the first switch unit of any one of the first bidirectional switch units from OFF to ON when a fifth predetermined period passes, during the positive polarity period, since the control circuit has turned the second switch unit of a corresponding one of the second bidirectional switch units from ON to OFF; and turn the first switch unit of the second bidirectional switch unit from OFF to ON when a sixth predetermined period passes, during the negative polarity period, since the control circuit has turned the second switch unit of the first bidirectional switch unit from ON to OFF.

7. The power conversion system of claim 1, wherein the control circuit is configured to:

turn the first switch unit of the first bidirectional switch unit from OFF to ON when a fifth predetermined period passes, during the positive polarity period, since the control circuit has turned the second switch unit of the second bidirectional switch unit from ON to OFF; and turn the first switch unit of the second bidirectional switch unit from OFF to ON when a sixth predetermined period passes, during the negative polarity period, since the control circuit has turned the second switch unit of the first bidirectional switch unit from ON to OFF.

8. The power conversion system of claim 1, wherein the control circuit is configured to, when no current flows through the primary winding, perform either control of turning ON the first switch unit and the second switch unit of each of the first bidirectional switch units and turning OFF the first switch unit and the second switch unit of each of the second bidirectional switch units or control of turning OFF the first switch unit and the second switch unit of each of the first bidirectional switch units and turning ON the first switch unit and the second switch unit of each of the second bidirectional switch units.

9. The power conversion system of claim 1, further comprising a reactor connected between the converter circuit and the second connection terminal, wherein the control circuit is configured to control the converter circuit such that when the second connection terminal is opened, energy stored in the reactor is regenerated on a circuit section, located closer to the primary winding, of the power conversion system.

10. The power conversion system of claim 9, wherein
the control circuit is configured to control the converter circuit such that when the second connection terminal is opened, the entire energy stored in the reactor is regenerated on the circuit section located closer to the primary winding during a regeneration operation period which includes regeneration periods during each of which part of the energy stored in the reactor is regenerated on the circuit section located closer to the primary winding such that the regeneration periods are provided intermittently.

11. The power conversion system of claim 10, wherein the control circuit is configured to, when the regeneration operation period ends, deactivate the inverter circuit and the converter circuit.

12. The power conversion system of claim 10, wherein the control circuit is configured to control the converter circuit such that in the regeneration period, a third current flows from the converter circuit into one terminal, located on a positive end with respect to a second voltage generated on the secondary winding by operation of the inverter circuit, out of the first terminal and the second terminal of the secondary winding.

13. A power conversion system comprising:
a first connection terminal to which a first connection target is connected;
a second connection terminal to which a second connection target is connected;
a primary winding and a secondary winding magnetically coupled to the primary winding;
an inverter circuit connected between the first connection terminal and the primary winding and configured to perform power conversion;
a converter circuit including a plurality of bidirectional switch units; and
a control circuit configured to control the inverter circuit such that polarity of a first voltage across the primary winding alternately inverts,
the secondary winding having a first terminal and a second terminal,
the plurality of bidirectional switch units being bridge-connected between the first terminal and the second terminal of the secondary winding,
the control circuit being configured to control the converter circuit so as to allow no power to be transmitted between the converter circuit and the inverter circuit in a first period including an inversion period during which the first voltage across the primary winding has its polarity inverted, the control circuit being configured to control the converter circuit so as to allow power to be transmitted either in a first direction from the converter circuit toward the inverter circuit, or in a second direction opposite from the first direction, in a second period different from the first period,
a reactor connected between the converter circuit and the second connection terminal, wherein
the control circuit is configured to control the converter circuit such that when the second connection terminal is opened, energy stored in the reactor is regenerated on a circuit section, located closer to the primary winding, of the power conversion system,
the control circuit is configured to control the converter circuit such that when the second connection terminal is opened, the entire energy stored in the reactor is regenerated on the circuit section located closer to the primary winding during a regeneration operation period which includes regeneration periods during each of which part of the energy stored in the reactor is regenerated on the circuit section located closer to the primary winding such that the regeneration periods are provided intermittently,
the control circuit is configured to control the converter circuit such that the regeneration operation period includes, during the inversion period, a freewheeling period in which a freewheeling path, allowing a current to flow through the converter circuit without passing through the secondary winding, is formed.

14. The power conversion system of claim 13, wherein the control circuit is configured to provide a freewheeling switching period in which the control circuit controls the converter circuit so as to form the freewheeling path with a regeneration path, through which another current flows during the regeneration period, maintained while a transition is made from the regeneration period to the freewheeling period.

15. The power conversion system of claim 13, wherein the control circuit is configured to provide a regeneration switching period in which the control circuit controls the converter circuit so as to regenerate the energy stored in the reactor on the circuit section located closer to the primary winding with the freewheeling path maintained while a transition is made from the freewheeling period to the regeneration period.

* * * * *